US 6,678,076 B1

(12) United States Patent
Hasegawa et al.

(10) Patent No.: US 6,678,076 B1
(45) Date of Patent: Jan. 13, 2004

(54) IMAGE READING APPARATUS

(75) Inventors: Kazuhiko Hasegawa, Abiko (JP); Junichi Suzuki, Yokohama (JP); Hirohisa Sawada, Abiko (JP); Norio Kajiwara, Ichikawa (JP); Toshiyuki Takano, Toride (JP); Akihiro Tomoda, Toride (JP); Masahiko Yokota, Abiko (JP); Tsuyoshi Yoshida, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/265,875

(22) Filed: Mar. 11, 1999

(30) Foreign Application Priority Data

| Mar. 13, 1998 | (JP) | 10-062579 |
| Jul. 31, 1998 | (JP) | 10-216724 |
| Oct. 26, 1998 | (JP) | 10-304187 |
| Oct. 26, 1998 | (JP) | 10-304188 |

(51) Int. Cl.⁷ .............................. H04N 1/04; H04N 1/00
(52) U.S. Cl. ..................... 358/496; 358/498; 358/408
(58) Field of Search ................. 358/408, 474, 358/496, 498, 497, 403, 444, 404, 483, 486; 250/208.1, 234–236; 399/367, 374

(56) References Cited

U.S. PATENT DOCUMENTS

| 4,949,189 | A | * | 8/1990 | Ohmori | 358/474 |
| 5,136,665 | A | * | 8/1992 | Inoue | 358/408 |
| 5,280,545 | A | * | 1/1994 | Masuda | 358/474 |
| 5,689,347 | A | * | 11/1997 | Naoi | 358/444 |
| 5,699,165 | A | * | 12/1997 | Suzuki et al. | 358/296 |
| 5,715,071 | A | * | 2/1998 | Takashimizu et al. | 358/498 |
| 5,732,165 | A | * | 3/1998 | Suzuki | 382/305 |
| 5,956,161 | A | * | 9/1999 | Takashimizu et al. | 358/496 |
| 6,160,640 | A | * | 12/2000 | Ohmori | 358/474 |
| 6,400,472 | B1 | * | 6/2002 | Yoshimizu | 358/498 |

* cited by examiner

Primary Examiner—Cheukfan Lee
(74) Attorney, Agent, or Firm—Fitzpatrick, Cella, Harper & Scinto

(57) ABSTRACT

The present invention relates to an image reading apparatus which has first reading means for reading image information on one side of an original document; second reading means for reading image information on the other side of the original document; image processing means for processing the image information read by the first reading means and the second reading means; and switching means for switching, to either of the first reading means and the second reading means, an input source of the image information to be transmitted to the image processing means.

20 Claims, 40 Drawing Sheets

IMAGE READING APPARATUS

BACKGROUND OF THE INVENTION

1. Field of the Invention

This invention relates to an original document reading apparatus, and an image copying apparatus, facsimile machine, and hybrid apparatus incorporating those apparatuses using the original document reading apparatus and, more particularly; to an apparatus having a means for reading double sides of the original document.

2. Description of Related Art

As an image reading apparatus capable of reading image information on double sides of original documents, the following apparatus has been known.

First, as disclosed in Japanese Unexamined Patent Publication No. Showa 60-96,069, Japanese Unexamined Patent Publication No. Showa 60-126,964, Japanese Unexamined Patent Publication No. Showa 62-51,367, Japanese Unexamined Patent Publication No. Showa 62-258,552, Japanese Unexamined Patent Publication No. Heisei 1-180,576, Japanese Unexamined Patent Publication No. Heisei 2-121,564, Japanese Unexamined Patent Publication No. 3-240,361, Japanese Unexamined Patent Publication No. 3-256,447 (hereinafter, referred to as "prior art No. 1"), an image reading apparatus reads image information on double sides of original documents at the same time by passing a document sheet between two reading means placed in opposition to each other with respect to the conveyance route of the original documents.

As disclosed in Japanese Unexamined Patent Publication No. Heisei 1-194,658 (hereinafter referred to as "prior art No. 2"), another image reading apparatus can read image information on double sides of original documents at the same time by passing a document sheet between two reading means placed in opposition to each other with respect to the conveyance route of the original documents and can select one side as the first page.

As disclosed in Japanese Unexamined Patent Publication No. Heisei 1-126,870 (hereinafter referred to as "prior art No. 3"), another image reading apparatus reads image information on an original document on one side basis with two reading means placed in opposition to each other with respect to an original document contact roller by turning the original document around or making a switchback movement of the original document.

As disclosed in Japanese Unexamined Patent Publication No. Heisei 3-265,355 (hereinafter referred to as "prior art No. 4"), another image reading apparatus includes reading means provided on upper and lower sides of a U-turn path and can read image information on double sides of the original document separately by each reading means by looping the original document in the U-turn path.

Those conventional image reading apparatuses raise the following problems. With the prior art No. 1 and No. 2, respective (or two) image processing means are required for processing the image information read by the respective reading means to operate the two reading means at the same time, thereby increasing the costs. Where an apparatus having a single side reading function as a standard function and a double side reading function as an option is to be developed, a standard type apparatus having the single side reading function requires two image processing means in advance, so that the apparatus likely loses a merit on costs for the apparatus for reading the single side.

In the prior art No. 3, the original document returned by the switchback is read from the rear end of the original document sheet. When images are transmitted as fax images, information on the page basis is transmitted in having different vertical directions alternatively. To avoid this inconvenience, an image reversing means for reversing the up and down of the images or an original document reversing means for reversing the up and down of the original document is required, thereby rendering this apparatus complicated.

Because the original document to be turned around is held only at the rear end of the original document by sandwiching the document with rollers when the front end of the original document most goes out of the apparatus, almost all area on the original document goes out of the original document conveyance route, thereby making the original document feed obliquely and possibly causing paper jamming. To prevent such a problem, a large original document conveyance route entirely holding the turned original document is required, but such a large conveyance route makes the apparatus larger.

SUMMARY OF THE INVENTION

It is an object of the invention to provide an apparatus smaller in size, inexpensive, and simple with improved reliability (conveyance stability) and improved throughput.

To solve the above problems, the image reading apparatus has the following structure. An image reading apparatus includes: first reading means for reading image information on one side of an original document; second reading means for reading image information on the other side of the original document;image processing means for processing the image information read by the first reading means and the second reading means; switching means for switching, to either of the first reading means and the second reading means, an input source of the image information to be transmitted to the image processing means.

With this structure, image information can be transmitted to the single image processing means by switching the two reading means, so that plural image processing means will be unnecessary, so that an electric circuit board can be made smaller, and so that the production costs can be reduced.

The image reading apparatus according to the invention may have the following structure. The image reading apparatus includes: first reading means for reading image information on one side of an original document; second reading means for reading image information on the other side of the original document; image processing means for processing the image information read by the first reading means and the second reading means; switching means for switching, to either of the first reading means and the second reading means, an input source of the image information to be transmitted to the image processing means; original document conveying means having a first conveying rotary body disposed at least on a downstream side of the first reading means and a second conveying rotary body disposed at least on an upstream side of the second reading means; original document length detecting means for detecting an original document length from the second conveying rotary body to a rear end of the original document which is being conveyed; conveying drive controlling means for driving and stopping the second conveying rotary body; conveyance route opening means for opening an conveyance route by widening a space in the conveyance route located between the first conveying rotary body and the second conveying rotary body; and operation controlling means for resuming by the conveyance route opening means the space in the conveyance route located between the first conveying rotary body and the second conveying rotary body to an original state when the original document length detecting means detects that the original document length from the second conveying rotary body to the rear end of the original document which is being conveyed is shorter than a length of the original document conveyance route between the first conveying rotary body and the second conveying rotary body.

With the above structure, the front end of the original document is received by the second conveying rotary body before the image information of the original document is read by the second reading means; looseness in the original document can be permitted which occurs as a result of conveyance of the read end of the original document by opening the original document conveyance route located between the first conveying rotary body and the second conveying rotary body; and the first reading means can read the image information on the rear end side of the original document as the front end of the original document is stopped. Therefore, the distance between the first reading means and the second reading means can be made shorter, thereby reducing the apparatus to a smaller size.

After the front end of the original document was held at the second conveying rotary body, the original document conveyance route located between the first conveying rotary body and the second conveying rotary body can be opened, and the original document conveyance route can be closed right after the looseness of the original document is gone, so that conveyance stability can be improved.

The image reading apparatus according to the invention can have the following structure. The image forming apparatus includes: the first reading means, the second reading means, the image processing me, switching means, the original document conveying means having a first conveying rotary body and a second conveying rotary body, drive controlling means for driving and stopping the second conveying rotary body; an original document conveyance route for conveying the original document by turning the original document around between the first conveying rotary body and the second conveying rotary body; and conveyance route opening and closing means for opening and closing an openable cover which constitutes a portion of the original document conveyance route. The original document is delivered from or placed on the original document conveyance route which is opened by opening the cover when image information of the original document is read by the first reading means or the second reading means.

According to the above structure, when the image information of the original document is read by the first reading means or the second reading means, the original document is delivered from or placed on the original document conveyance route which is opened by opening the cover, so that the original document is conveyed in substantially a linear manner, or reading can be done upon manual feeding sheet by sheet from the opened cover. Therefore, the conveyance route of the original document can be selected according to the kind of the original documents.

Moreover, The image reading apparatus according to the invention can have the following structure. The image forming apparatus includes: the first reading means, the second reading means, the original document feeding means, the image processing means, the switching means, the feeding drive controlling means for driving and stopping the original document feeding means, the original document conveying means having a first conveying rotary body and a second conveying rotary body, the conveying drive controlling means for driving and stopping the second conveying rotary body, the conveyance route opening means, and operation controlling means. The operation controlling means switches by the switching means to the first reading means, the input source of the image information to be transmitted to the image processing means so as to start reading image information on the subsequent original document by the first reading means at substantially the same time as completion of reading the image information of the previous original document by the second reading means, and for controlling the drive of the original document feeding means by the feeding drive controlling means.

According to the above structure, since the switching means switches to the first reading means, the input source of the image information to be transmitted to the image processing means so as to start reading image information on the subsequent original document by the first reading means at substantially the same time as completion of reading the image information of the previous original document by the second reading means, and controls the drive of the original document feeding means by the feeding drive controlling means, time required for conveying the original document other than reading time would be shortened, thereby shortening the total time for reading plural sheets of the original documents successively.

DETAILED DESCRIPTION OF THE PREFERRED EMBODIMENTS

Figure 1:
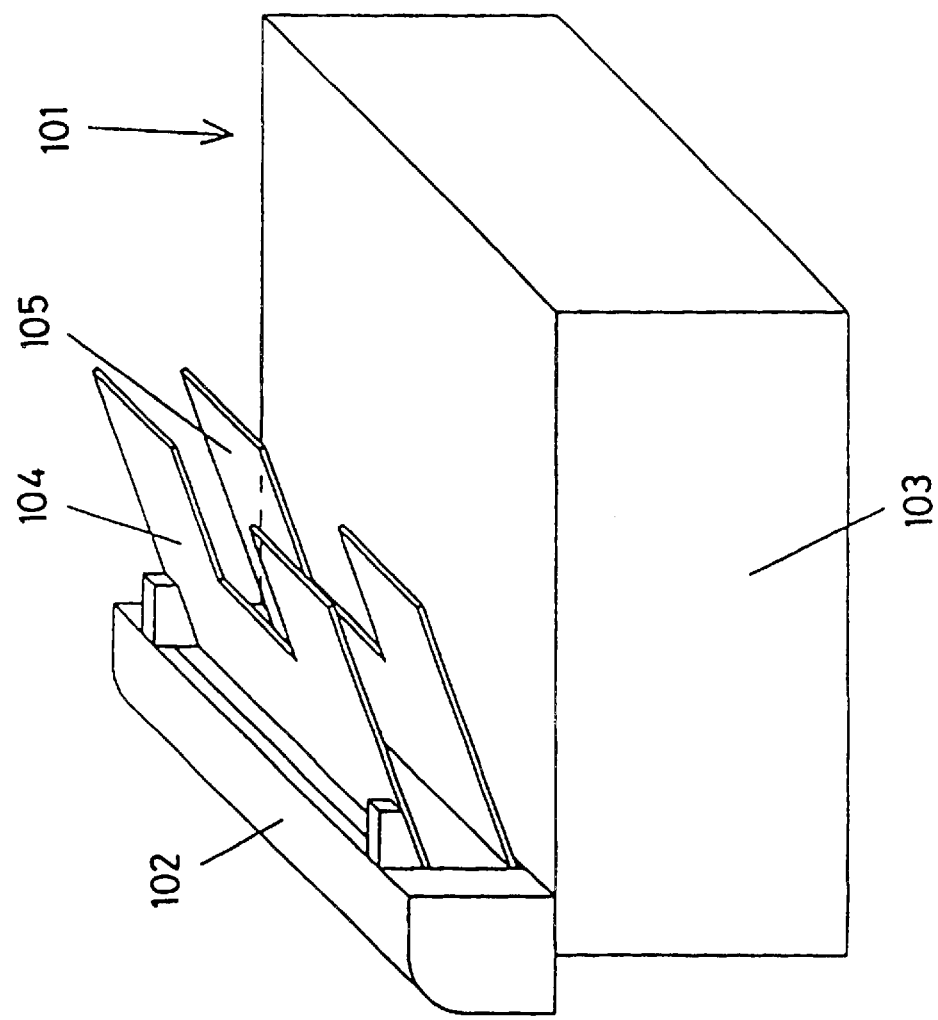
FIG. 1 is a perspective view showing an image reading apparatus according to an embodiment.
Figure 2:
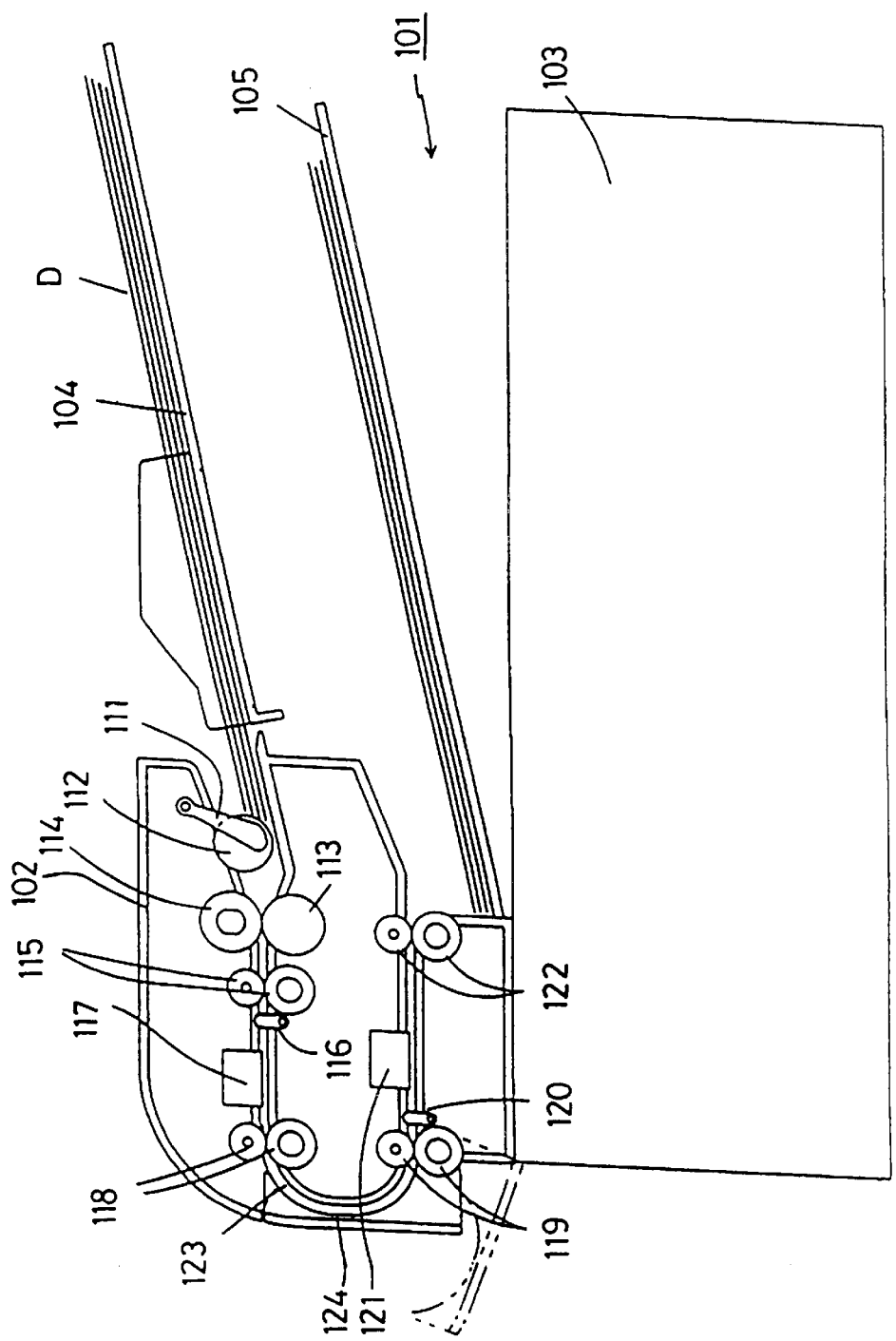
FIG. 2 is a cross section showing an image reading apparatus according to the embodiment.
Figure 3:
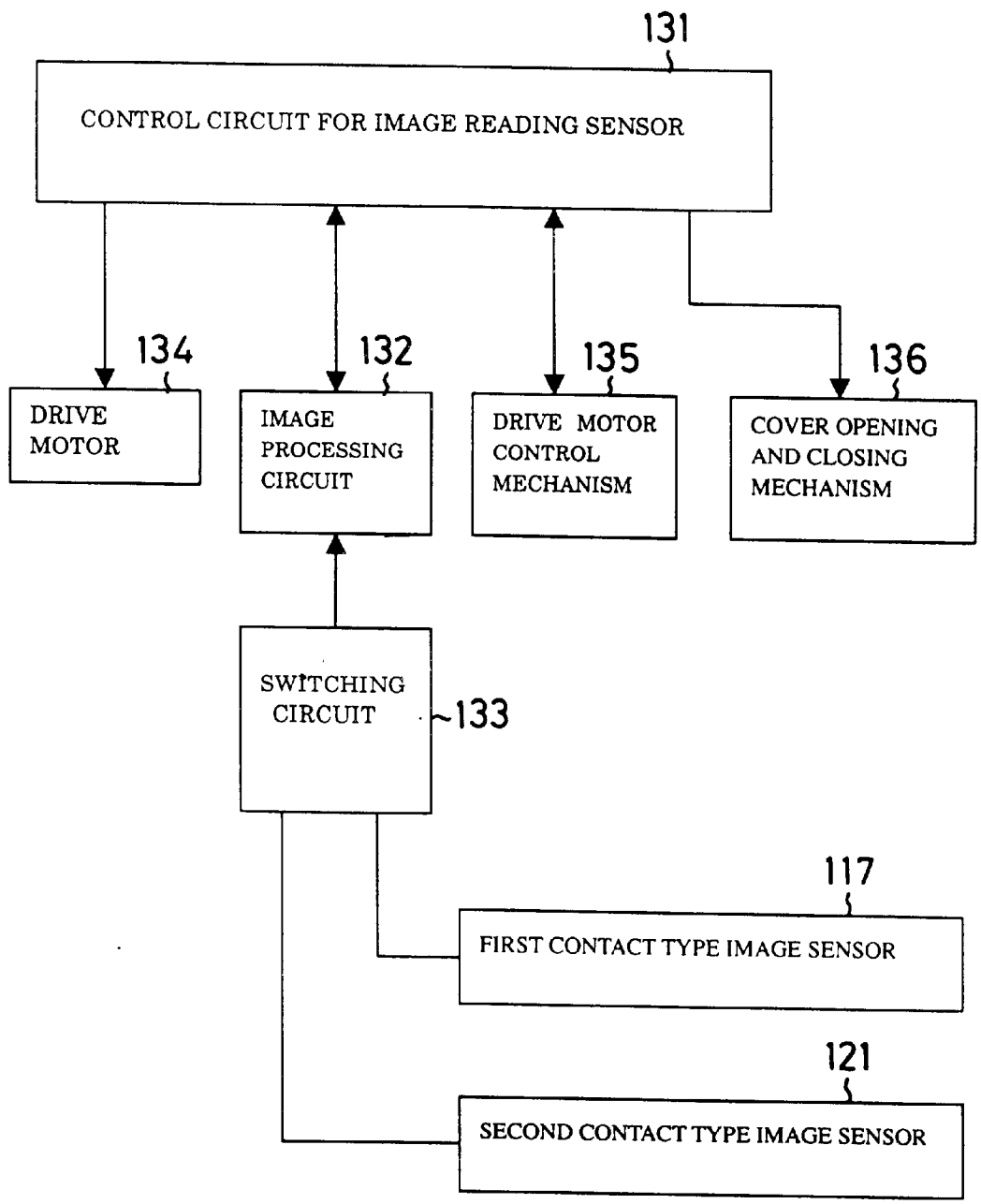
FIG. 3 is a block diagram showing a control structure of the image reading apparatus.
Figure 4:
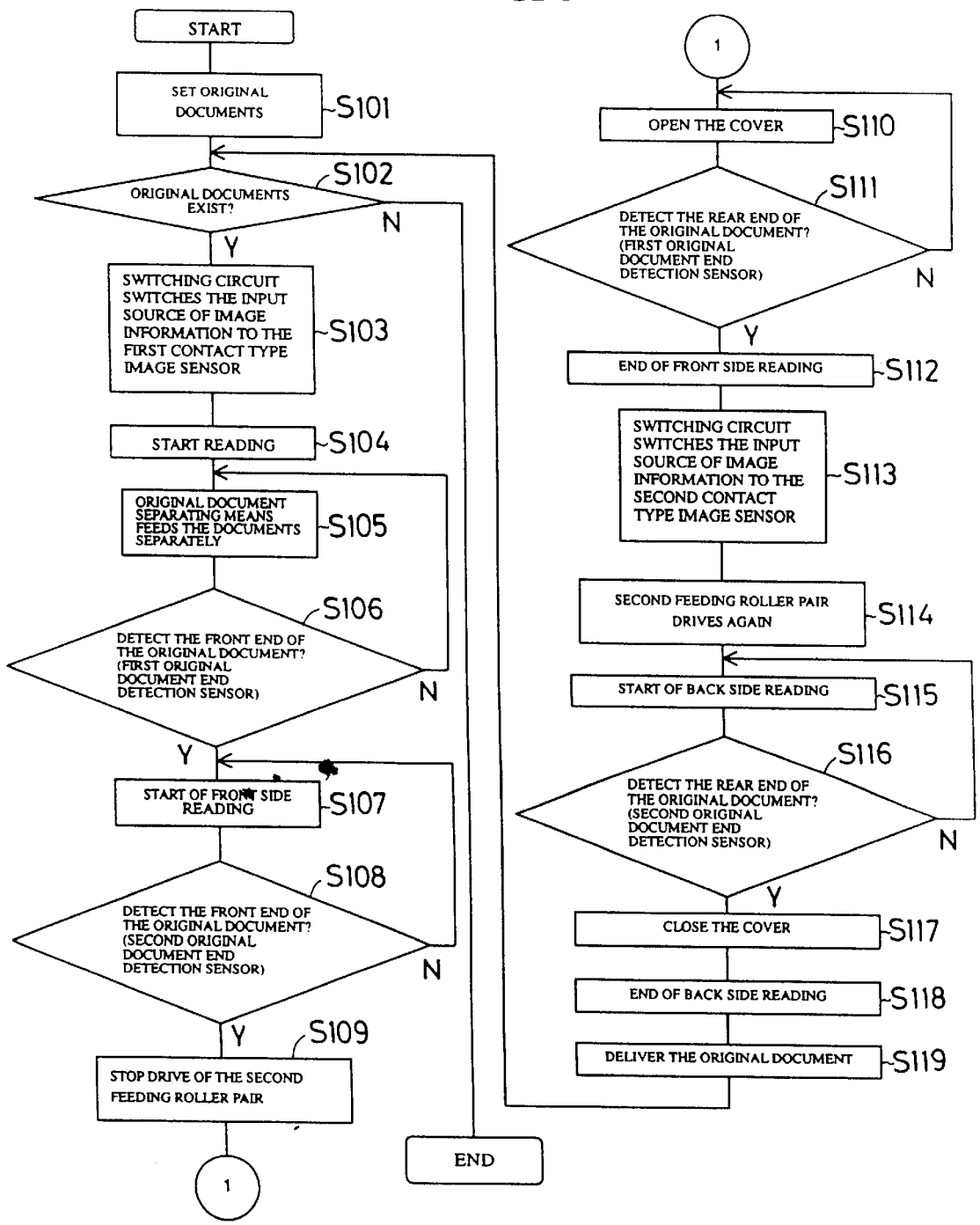
FIG. 4 is a flow chart showing operation of the image reading apparatus.

Referring to the drawings, an embodiment of an image reading apparatus according to the invention is described. In this embodiment, a facsimile machine is used as an example of an image reading apparatus. FIG. 1 is a perspective view showing the facsimile machine; FIG. 2 is a cross section showing the facsimile machine; FIG. 3 is a block diagram showing an example of a control structure; FIG. 4 is a flow chart showing operation; FIGS. 5 to 9 are cross sections of the facsimile machine showing operation.

In FIG. 1, an apparatus body 101 is constituted of an image reading section 102, and a recording section 103 made of a laser beam printer. The image reading section 102 includes an original document tray 104 capable of stacking plural original documents D to be read in the image reading section 102, and an original document delivery tray 105 for stacking the delivered original documents.

As shown in FIG. 2, the original document tray 104 has an original document existence detection sensor 111 for detecting whether the original document D is set, and a pickup roller 112 for feeding the set original document D into the image reading section 102. The reverse roller 113 and separation roller 114 are disposed on a downstream side of the pickup roller 112, thereby separating the original documents D sheet by sheet.

The separated original document D is conveyed by a feeding roller pair 115 and a first roller pair 118 serving as a first conveying means, and the image information on the surface is read by a first contact type image sensor 117 serving as a first reading means provided between the pairs 115, 118. On a downstream side of the feeding roller pair 115, a first original document end detection sensor 116 is placed for detecting front and rear ends of the original document D.

The original document D passes by a U-turn portion 123 of the original document conveyance route and is conveyed to a second conveyance roller pair 119 serving as a second conveying means. A cover 124 as an opening means for conveyance route constitutes an outer side of the U-turn portion 123 and has an openable structure.

As the original document D is conveyed by the second conveying roller pair 119 and a delivery roller 122, the image information on the back side of the document is read by a second contact image sensor 121 as a second reading means. A second original document end detection sensor 120 is disposed on a downstream side of the second conveyance roller 119 for detection of the front and rear ends of the original documents D. The original document D, after the image information on the document is read, is delivered by the delivery roller 122 and stacked on an original document delivery tray 105.

As shown in a block diagram of FIG. 3, a control circuit 131 for controlling an image reading section 102 is connected to an image processing circuit 132 for processing the image information on the original documents D. Image information read by the first contact type image sensor 117 or the second contact type image sensor 121 is selectively inputted by a switching circuit 133 to the image processing circuit 132.

A drive motor 134 is connected to the control circuit 131, thereby controlling rotations in the feeding roller pair 115, the first conveyance roller 118, the second conveyance roller pair 119, and the delivery roller pair 122. The control circuit 131 is also connected to a drive control mechanism 135 serving as a drive controlling means constituted of a clutch, a solenoid, and the like for rotating and stopping the second conveyance roller 118, and to a cover opening and closing mechanism 136 serving as a conveyance route opening means constituted of a motor, a solenoid, a cam mechanism, and the like for opening and closing the cover 124.

In operation, as shown in FIG. 4, first, a user places original documents D on the original document tray 104 as the front side of the original documents is up (S101), and the original documents D are detected by the original document existence detection sensor 111 (S102).

Where the input source of the image information to be transmitted to the image processing circuit 132 is not the first contact type image sensor 117, the switching circuit 133 switches the source to the first contact type image sensor 117

(S103). Where the user sets some reading conditions (e.g., density, and resolution), the apparatus starts reading (S104). The original documents D stacked on the original document tray 104 are fed by the pickup roller 112 and separated to each sheet by the reverse roller 113 and the separation roller 114 in contact with the reverse roller 113 (S105).

When the original document D reaches the feeding roller pair 115, and when the front end is detected by the first original document end detection sensor 116 (S106), the first contact type image sensor 117 starts reading of the image information on the front side of the original document D after prescribed time that a reading start position on the original document D reaches a reading reference position of the first contact type image sensor 117 passes (S107). The original document D is further conveyed by the first conveyance roller 118 and reaches the second conveyance roller pair 119 by passing the U-turn portion 123 in the original document conveyance route.

Figure 5:
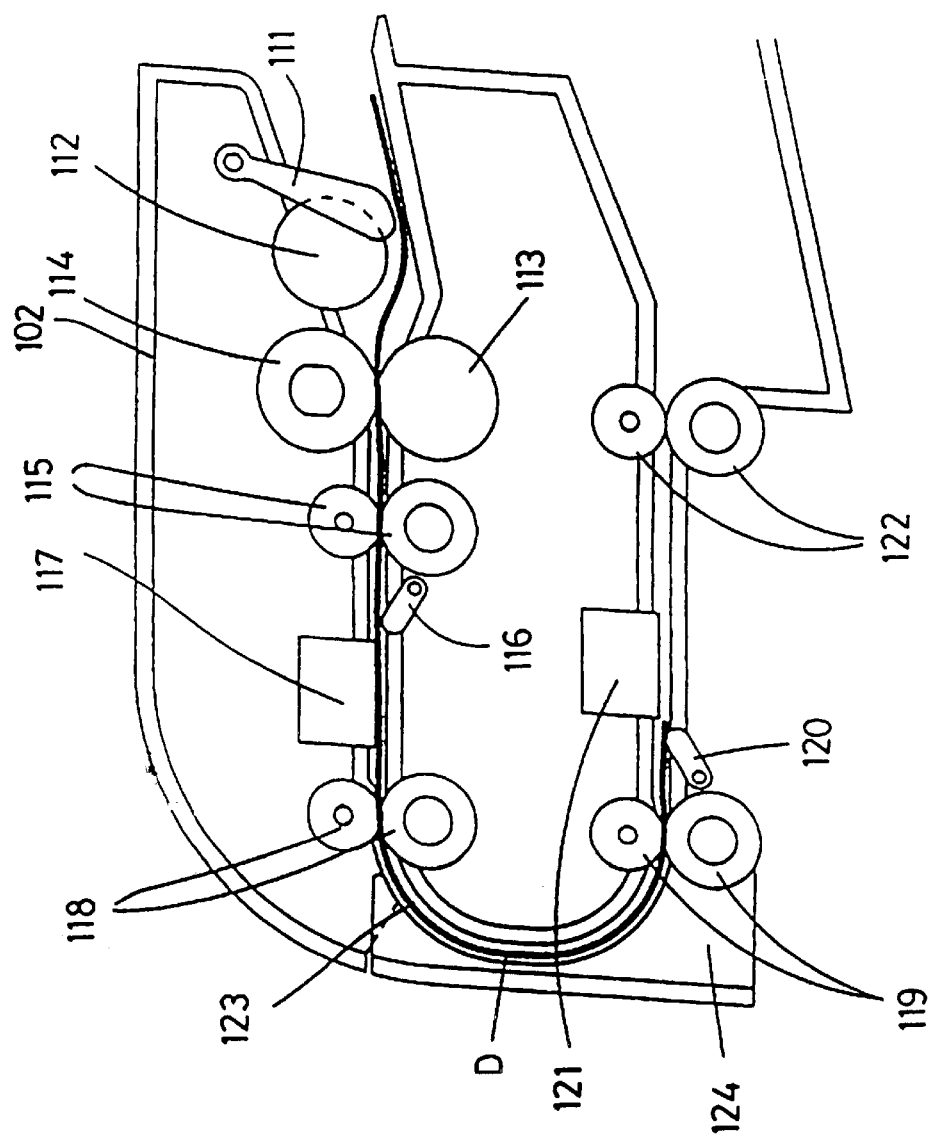
FIG. 5 is a cross section showing operation of the image reading apparatus.
Figure 6:
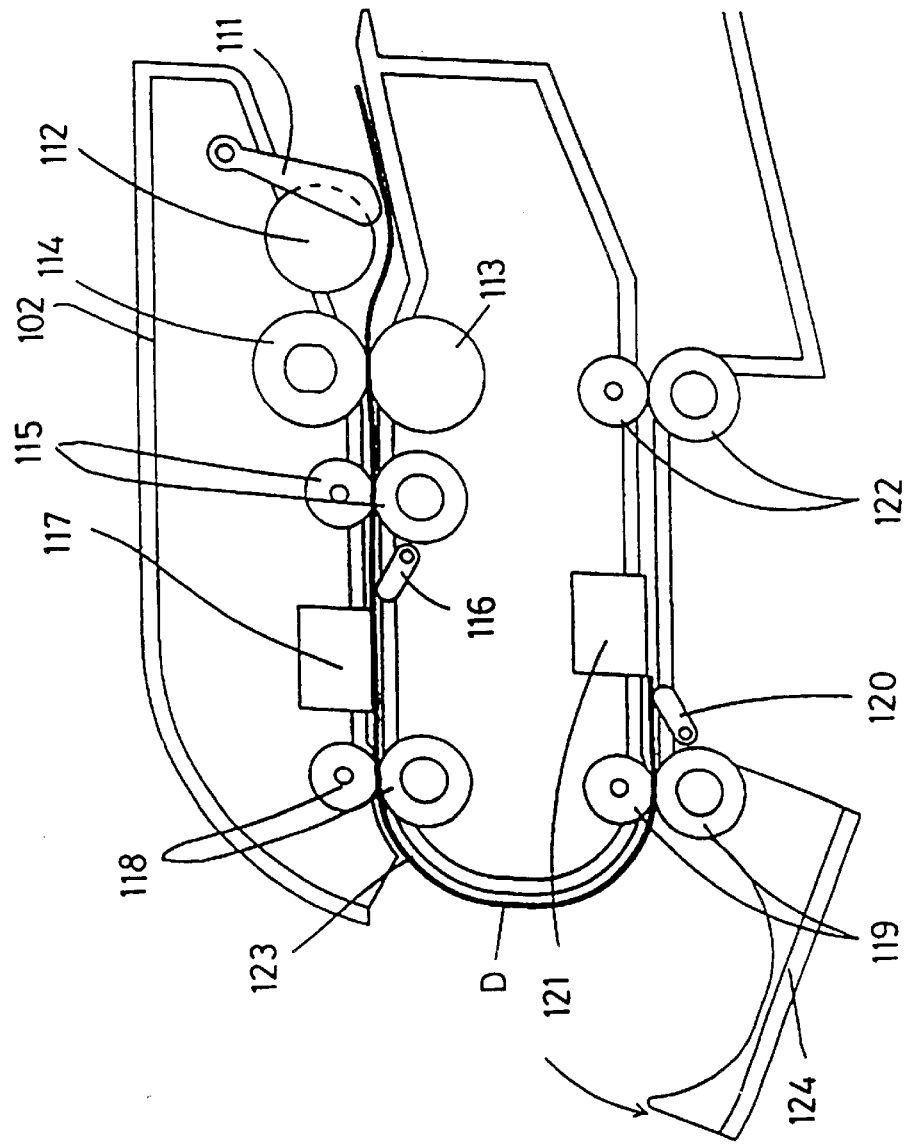
FIG. 6 is a cross section showing operation of the image reading apparatus.
Figure 7:
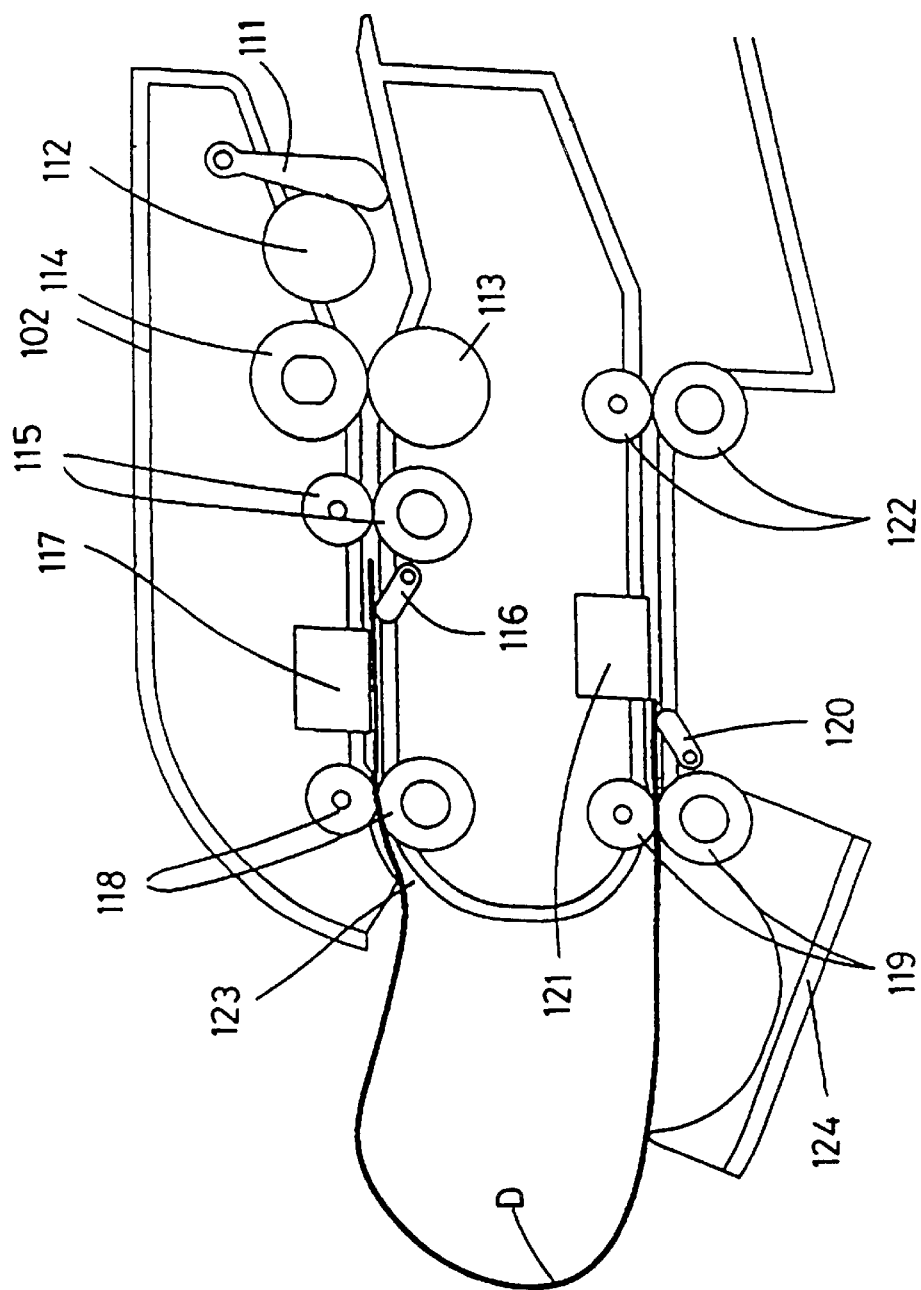
FIG. 7 is a cross section showing operation of the image reading apparatus.

As shown in FIG. 5, when the second original document end detection sensor 120 detects the front end of the original document D (S108), the drive control mechanism 135 stops the rotation of the second conveyance roller pair 119 (S109), and as shown in FIG. 6, the cover opening and closing mechanism 136 makes the cover 124 open (S110).

When the second conveyance roller pair 119 stops the rotation, the front end of the original document D is sandwiched by the second conveyance roller pair 119, but a looseness occurs in the original document D between the first conveyance roller pair 118 and the second conveyance roller pair 119 because the first conveyance roller pair 118 located on the upstream side continuously conveys the original document D. Here, since the cover 124 is made open, the original document D goes out of the apparatus, and therefore, the original document D will not be jammed in the original document conveyance route.

Subsequently, the first original document end detection sensor 116 detects the rear end of the original document D (S111), and after prescribed time that the reading position on the original document D reaches the reading reference position of the first contact type image sensor 117 passes, the first contact type image sensor 117 finishes reading of the image information on the front side of the original document D (S112).

Figure 8:
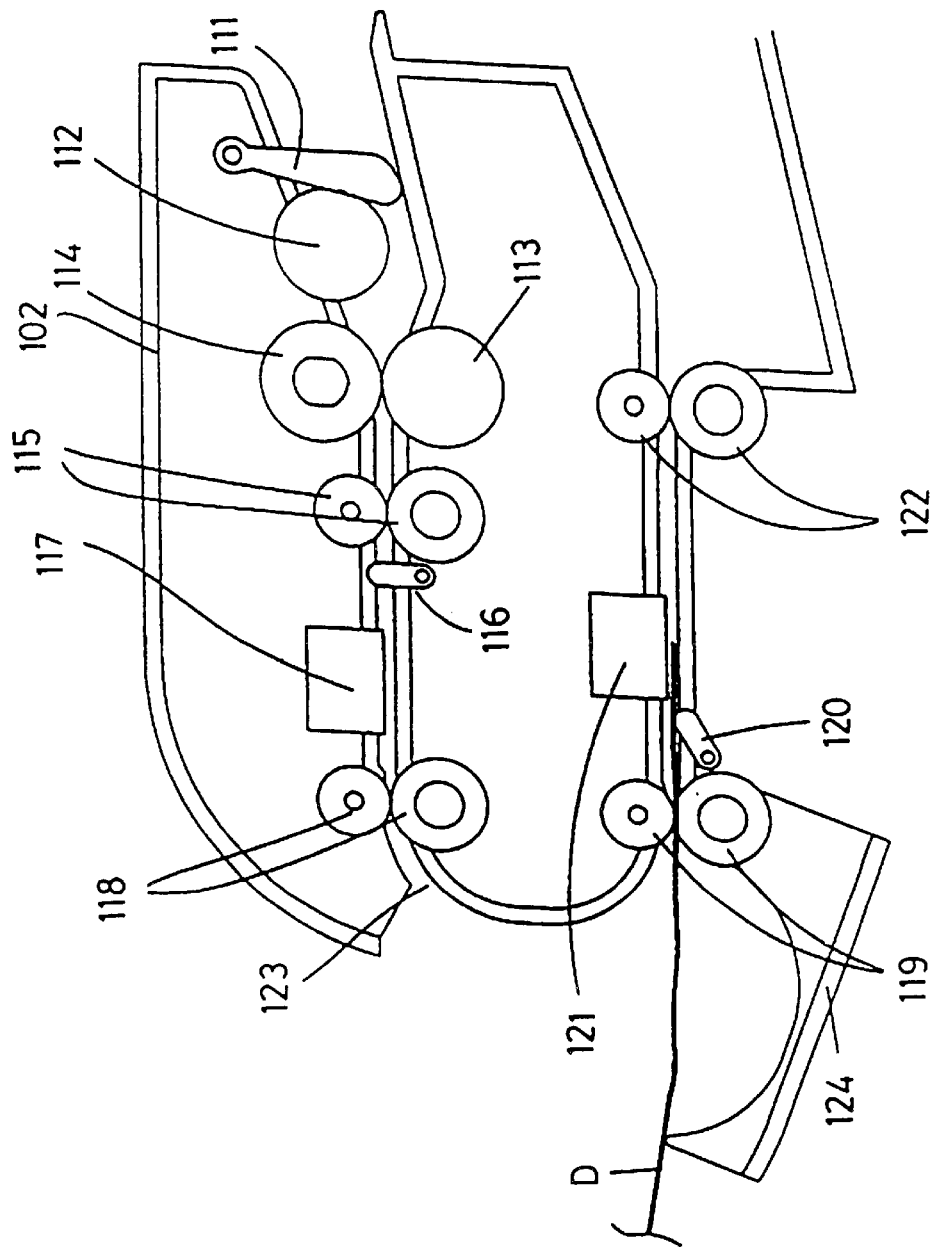
FIG. 8 is a cross section showing operation of the image reading apparatus.

The switching circuit 133 switches to the second contact type image sensor 121 the input source of the image information to be transmitted to the image processing circuit 132 (S113), and the drive control mechanism 135 resumes the second conveyance roller pair 119 (S114). As shown in FIG. 8, after prescribed time that the reading position on the original document D reaches the reading reference position of the second contact type image sensor 119 passes, the second contact type image sensor 121 starts reading of the image information on the back side of the original document D (S115).

Figure 9:
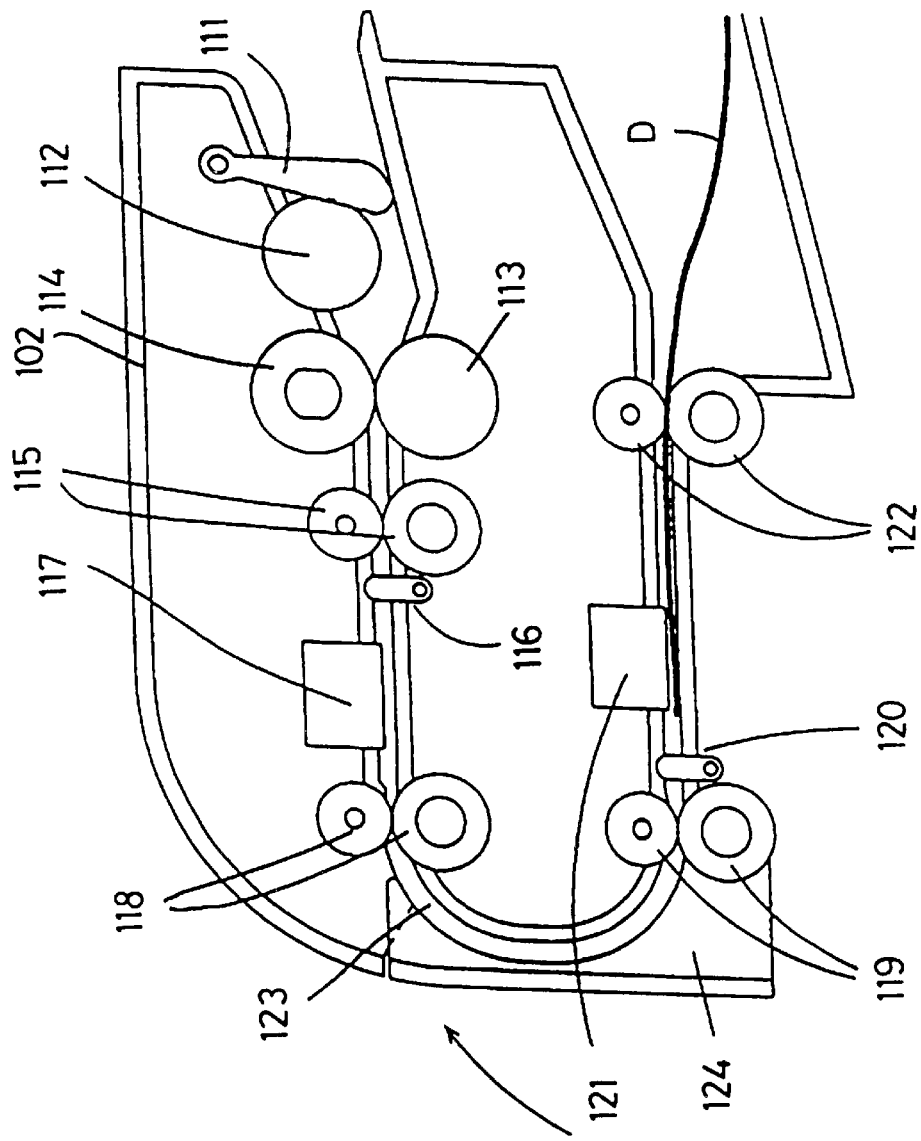
FIG. 9 is a cross section showing operation of the image reading apparatus.

As shown in FIG. 9, when the second original document end detection sensor 120 detects the rear end of the original document D (S116), the cover opening and closing mechanism 136 closes the cover 124 (S117). After prescribed time that the reading position on the original document D reaches the reading reference position of the second contact type image sensor 119 passes, the second contact type image sensor 121 finishes reading of the image information on the back side of the original document D (S118). The original document D is then delivered to and stacked on the original document delivery tray 105 by the delivery roller pair 122 (S119).

The above operation of S102 to S119 is repeated until non-existence of the original document by the original document existence detection sensor 111, and when detecting non-existence of the original document (S102), the apparatus ends entire reading operation.

As described above, with the image reading apparatus according to this embodiment, image information can be transmitted to a single image processing means by switching the two reading means, so that plurality of the image processing means is unnecessary, so that the electric circuit board can be made smaller, and so that the production costs will be reduced so much.

Where an apparatus having the reading function on one side as a standard function and the reading function on the double sides as an option is to be developed, one image processing means can realize a standard form and an optional extra installation form, and therefore, the apparatus can be produced with lower costs in comparison with the structure having two image processing means.

Because this apparatus has a structure that the original document conveyance route is opened when the conveyance of the original document is stopped before the original document is read by the second reading means, this apparatus can allow the looseness of the original document occurring as a consequence that the rear end of the original document is conveyed and can read the remaining side of the original document rear end by the first reading means as the front end of the original document is stopped. Therefore, the distance between the first reading means and the second reading means can be made smaller, so that the apparatus can be made smaller in size.

Since this apparatus has a structure that the original document conveyance route is opened after the front end of the original document is sandwiched by the conveyance rollers, the original document can avoid improper conveyance such as fed obliquely due to looseness, and the apparatus can convey the original documents stably.

In addition, this apparatus has a structure that the looseness of the original document may go out of the apparatus as to escape from the apparatus, so that the apparatus can be made smaller in size.

The apparatus also can read the original document from the front end of the front and back side of the original document, so that any extra image reversing means or original document reversing means would be unnecessary, and this apparatus has faster reading throughput of the original documents in comparison with the apparatus having such an original document reversing means, can reduce the apparatus costs, and can make the structure of the apparatus simpler.

Second Embodiment

Hereinafter, referring to the drawings, an image reading apparatus of the second embodiment to which this invention applies is described in detail.

Figure 10:
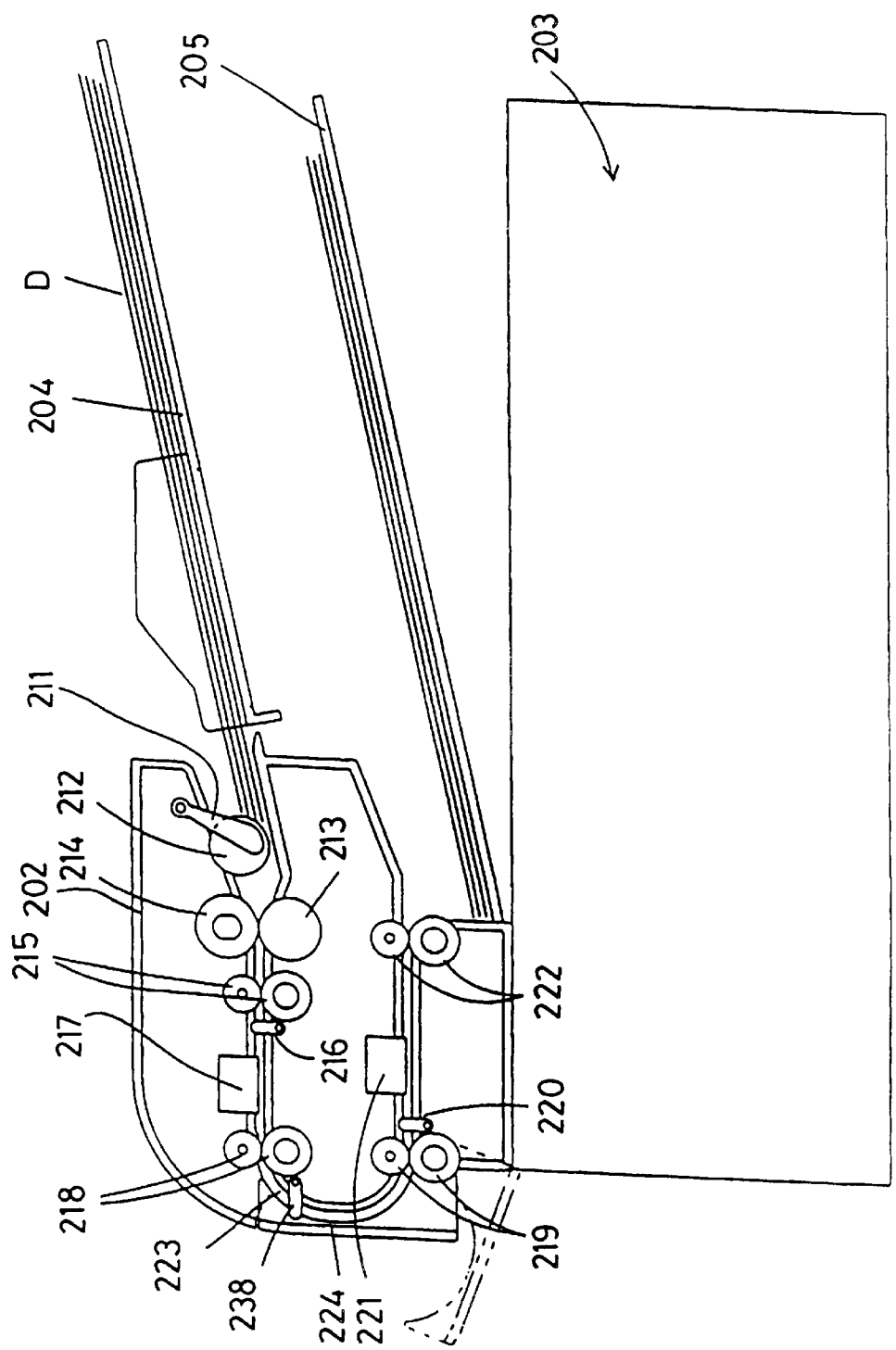
FIG. 10 is a schematic cross section showing an outline of an image reading section in a facsimile machine.

Referring to FIGS. 10 to 17, the image reading apparatus according to the second embodiment is described in detail. In this embodiment, a structure of the image reading apparatus used for a facsimile machine is exemplified The structure of the facsimile machine is substantially the same as the first embodiment, and its description is omitted (see, FIG. 1). FIG. 10 is a schematic cross section showing a structural outline of the image reading section 202 in the facsimile machine. In FIG. 10, 203 is a recording section made of a laser beam printer; numeral 211 is an original document existence detection sensor for detecting whether the original documents D are set on the original document tray 204; numeral 212 is a pickup roller for feeding the set original documents D into the image reading section 202; numerals 213, 214 are a reverse roller and a separation roller for separating the plural original documents D to each sheet in co-operation with each other; numeral 215 is a feeding roller pair for feeding the separated original document D; numeral 216 is a first original document end detection sensor for detecting front and rear ends of the original document; numeral 217 is a first contact type image sensor (first reading means) for reading image information on a front side of the original document D; numerals 218, 219 are first conveyance roller pair (first conveying rotary body) and second conveyance roller pair (second conveying rotary body) for conveying the original documents D by sandwiching the documents; numeral 220 is a second original document end detection sensor for detecting front and rear ends of the original document; numeral 221 is a second contact type image sensor (second reading means) for reading image information on a back side of the original document D; numeral 222 is a delivery roller pair for delivering the original documents D onto the original document tray 205; numeral 223 is a original document conveyance route; numeral 224 is an openable cover constituting a U-turn path portion of the original document conveyance route 223.

Figure 11:
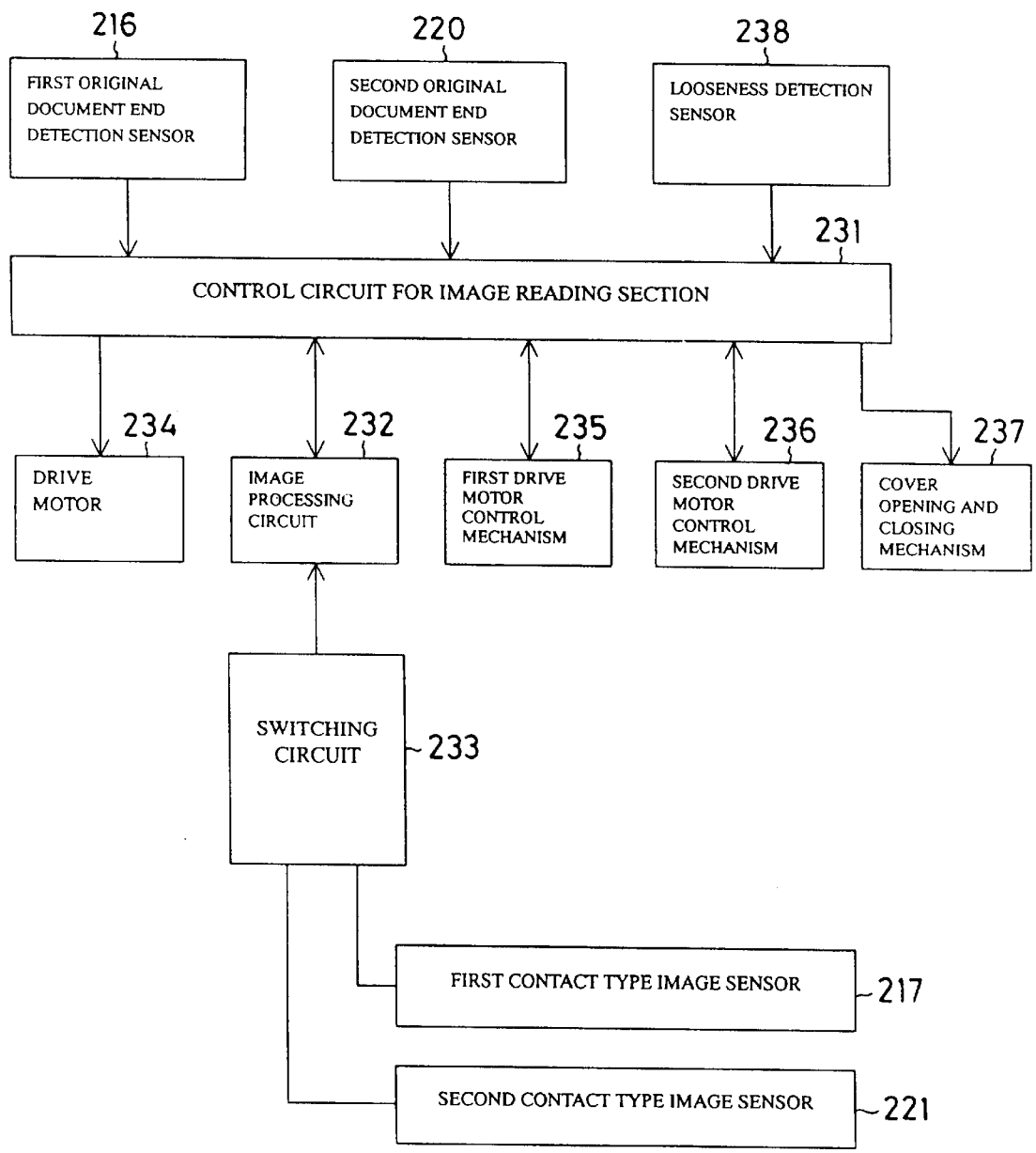
FIG. 11 is a block diagram showing an example of a control structure of the image reading section.

FIG. 11 is a block diagram showing an example of the controlling structure. In FIG. 11, numeral 231 is a control circuit for controlling the image reading section 202; numeral 232 is an image processing circuit (image processing means) for processing image information of the original documents D read by the first contact type image sensor 217 and the second contact type image sensor 221; numeral 233 is a switching circuit for switching to either of the first contact type image sensor 217 and the second contact type image sensor 221 the input source of the image information to be transmitted to the image processing circuit; numeral 234 is a drive motor for rotatively driving the feeding roller pair 215, the first conveyance roller pair 218, the second conveyance roller pair 219, and the delivery roller 222, which are constituting the original document feeding means; numeral 235 is a first drive controlling mechanism (first drive control means) constituted of a clutch and a solenoid and the like for rotating and stopping the first conveyance roller pair 219; numeral 236 is a second drive controlling mechanism (second drive control means) constituted of a clutch and a solenoid and the like for rotating and stopping the second conveyance roller pair 219; numeral 237 is a cover opening and closing mechanism (conveyance route opening means) constituted of a motor, a solenoid, a cam mechanism, and so on for opening and closing the cover 224; numeral 238 is a looseness detection sensor 238 for detecting looseness of the original document D between the first conveyance roller pair 218 and the second conveyance roller pair 219. It is to be noted that numeral 216 is a first original document end detection sensor; numeral 220 is a second original document end detection sensor.

Figure 12:
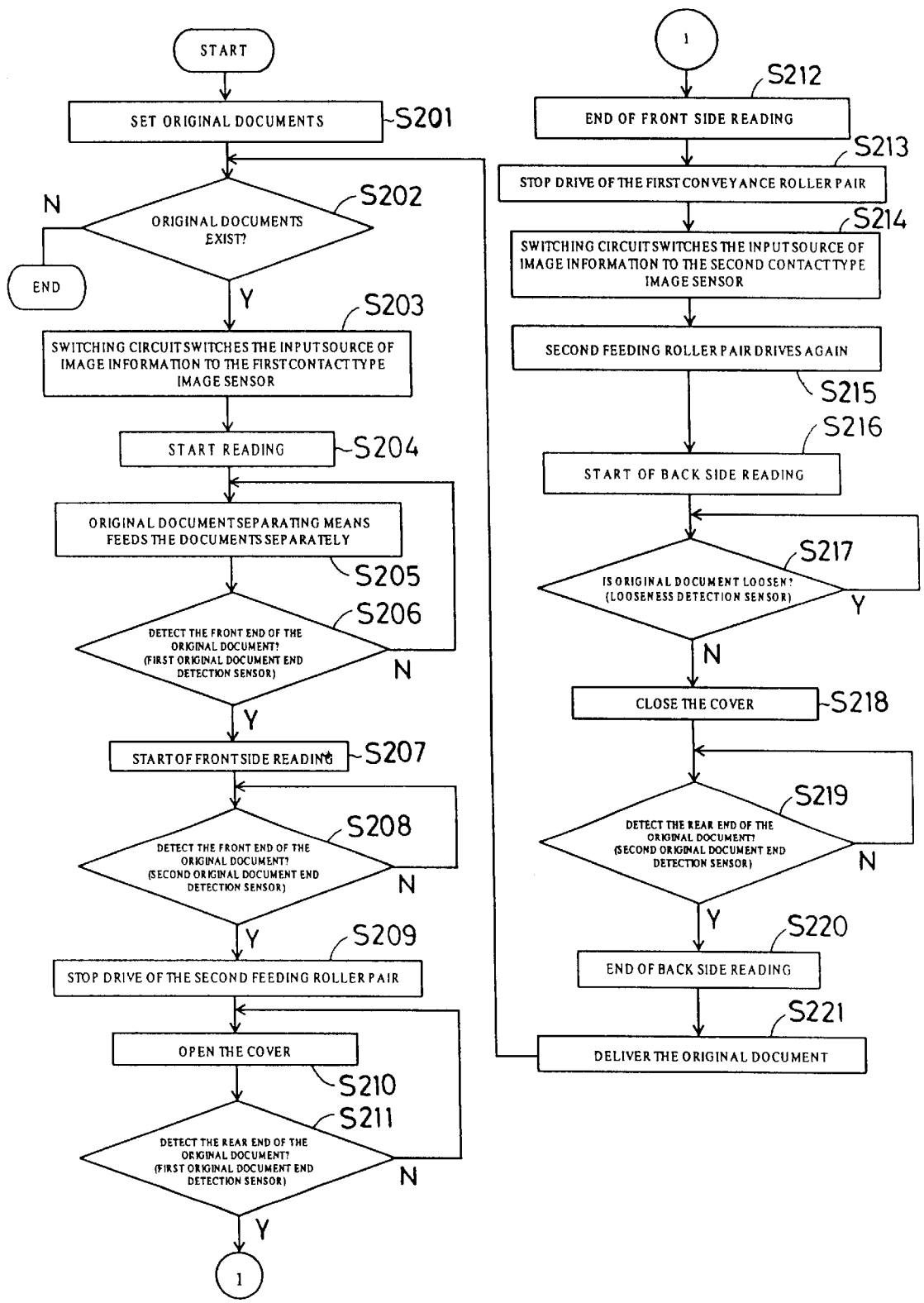
FIG. 12 is a flow chart showing an operation flow in the image reading section.
Figure 13:
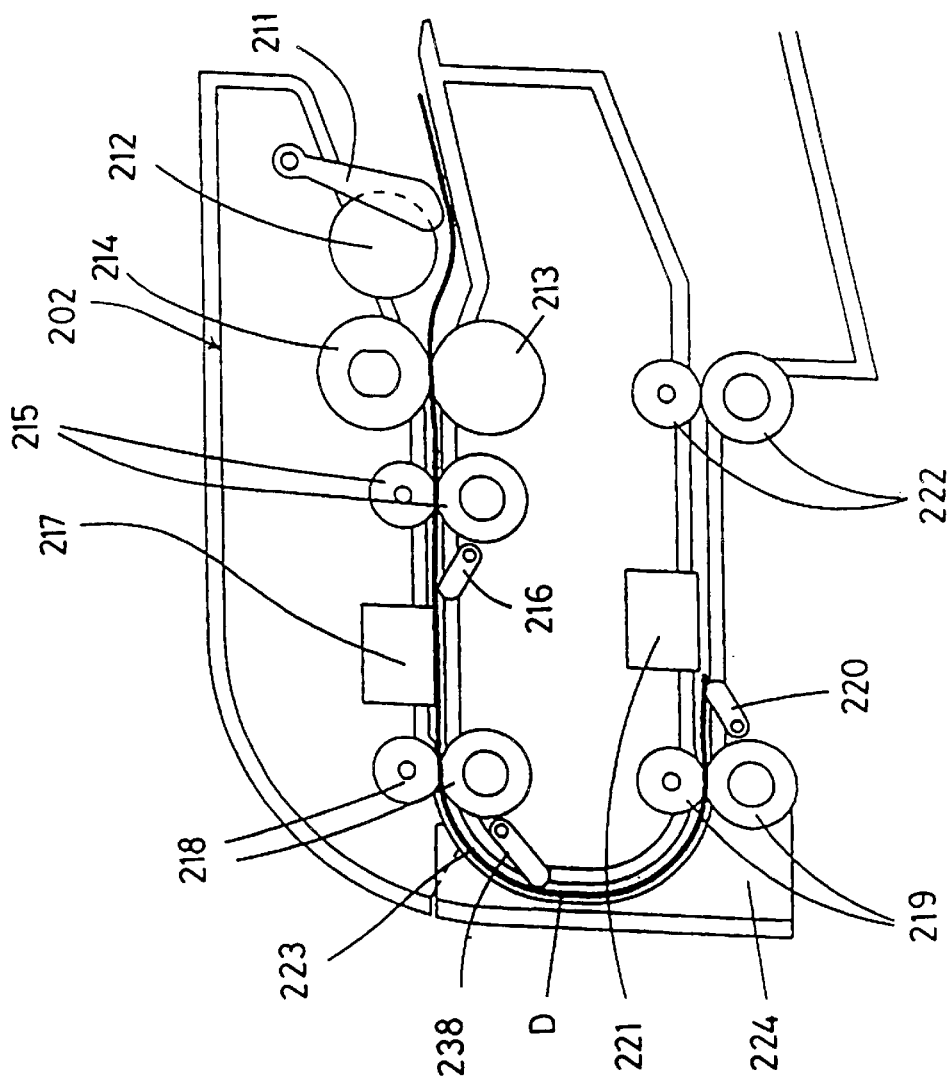
FIG. 13 is a cross section describing original document conveying operation in the image reading section.
Figure 14:
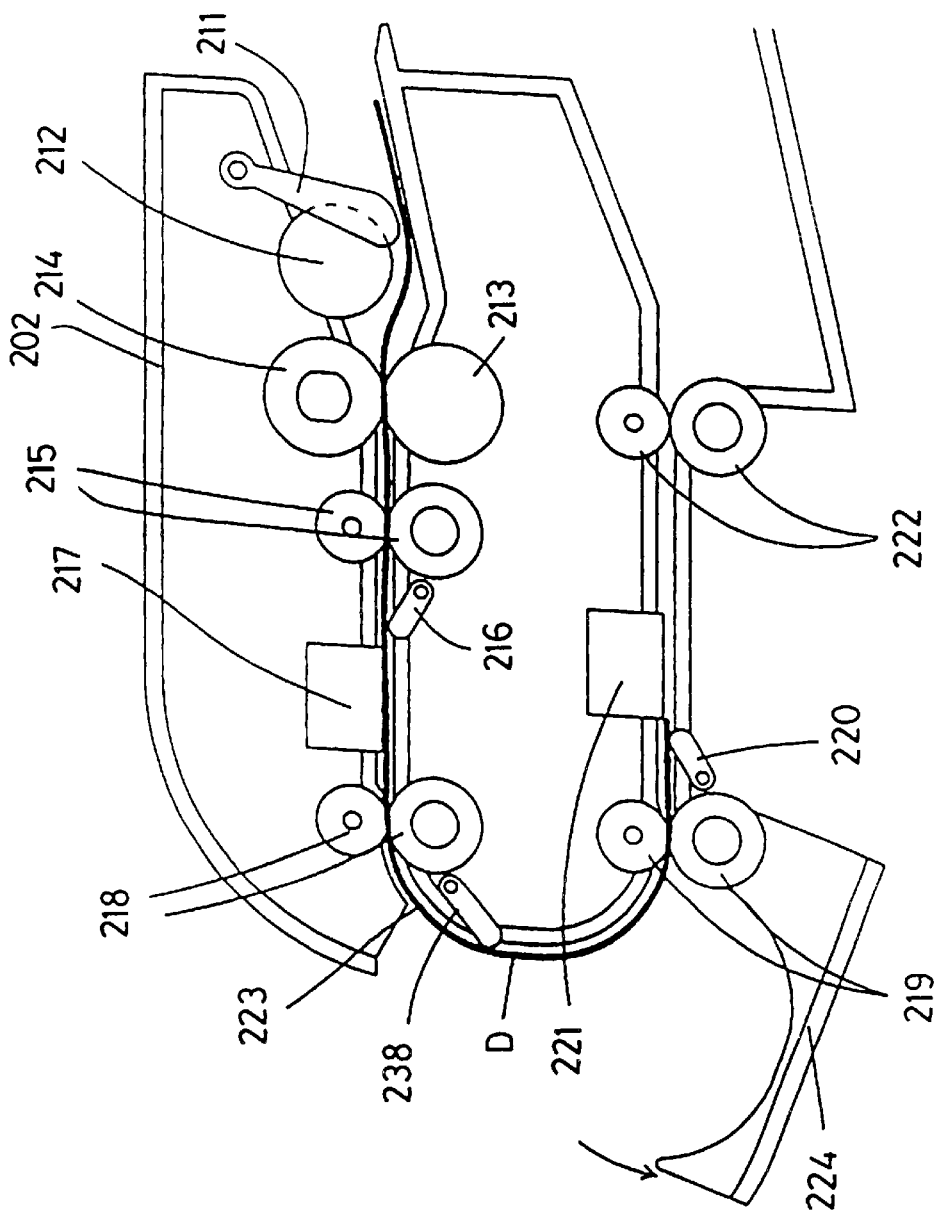
FIG. 14 is a cross section describing original document conveying operation in the image reading section.
Figure 15:
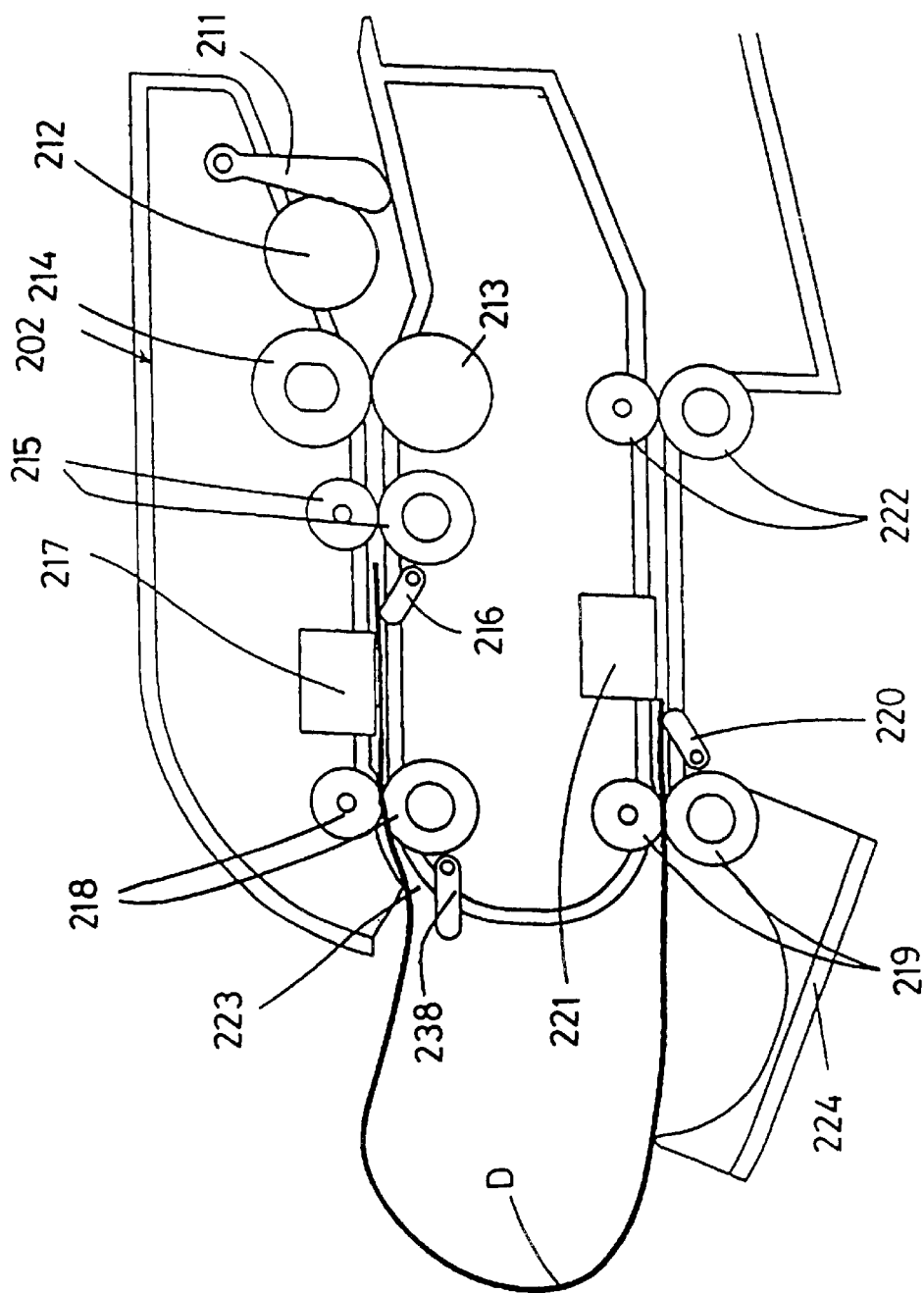
FIG. 15 is a cross section describing original document conveying operation in the image reading section.

Referring to FIGS. 13 to 17, operation of the image reading apparatus 202 is described based on a flowchart shown in FIG. 12.

A user places original documents D on the original document tray 204 as the front side of the original documents is up (S201), and the original documents D are detected by the original document existence detection sensor 211 (S202).

Where the input source of the image information to be transmitted to the image processing circuit 232 is not the first contact type image sensor 217, the switching circuit 233 switches the source to the first contact type image sensor 217 (S203). Where the user sets some reading conditions (e.g., density, and resolution), the apparatus starts reading (S204).

The original documents D stacked on the original document tray 204 are fed by the pickup roller 212 and separated to each sheet by the reverse roller 213 and the separation roller 214 which are constituting the original document separation means (S205).

When the separated original document D reaches the feeding roller pair 215, and when the front end is detected by the first original document end detection sensor 216 (S206), the first contact type image sensor 217 starts reading of the image information on the front side of the original document D after prescribed time that a reading start position on the original document D reaches a reading reference position of the first contact type image sensor 217 passes (S207).

The original document D reaches the first conveyance roller 218 and reaches the second conveyance roller pair 219 after sent to the U-turn portion 223 in the original document conveyance route. When the second original document end detection sensor 220 detects the front end of the original document D (S208, see FIG. 13), the second drive control mechanism 236 stops the rotation of the second conveyance roller pair 219 (S209), and the cover opening and closing mechanism 237 makes the cover 224 open (S210 as shown in FIG. 6). That is, a space of the U-turn path portion of the original document conveyance route 223 between the first conveyance roller pair 218 and the second conveyance roller pair 219 is widened.

At that time, although the second conveyance roller pair 219 holds and sandwiches the vicinity of the front end of the original document D, a looseness occurs in the original document D between the first conveyance roller pair 218 and the second conveyance roller pair 219 because the more upstream side from that point is continuously conveyed by the first conveyance roller pair 218. However, since the cover 224 is made open, the original document D goes as to extend to the outer side of the image reading apparatus 202, and therefore, the original document D will not be jammed in the original document conveyance route.

Subsequently, the first original document end detection sensor 216 detects the rear end of the original document D (S221), and after prescribed time that the reading position on the original document D reaches the reading reference position of the first contact type image sensor 217 passes, the first contact type image sensor 217 finishes reading of the image information on the front side of the original document D (S212).

After reading on image information on the front side finishes, the first drive control mechanism 235 stops the rotation of the first conveyance roller pair 218 while the original document D is sandwiched by the first conveyance roller pair 218 (S213).

The switching circuit 233 switches to the second contact type image sensor 221 the input source of the image information to be transmitted to the image processing circuit 232 (S214) and the second drive control mechanism 236 resumes the rotation of the second conveyance roller pair 219 (S215).

Figure 16:
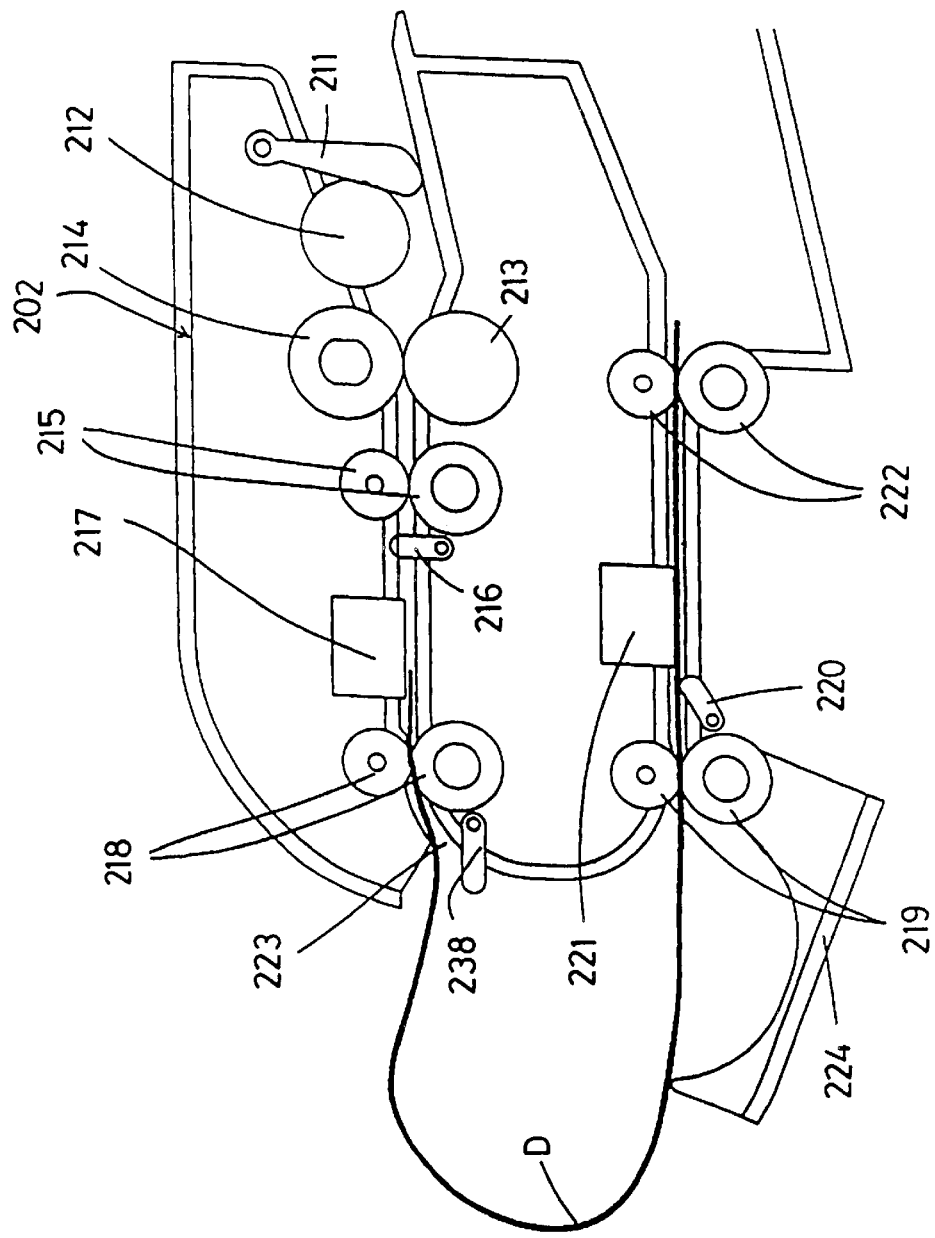
FIG. 16 is a cross section describing original document conveying operation in the image reading section.
Figure 17:
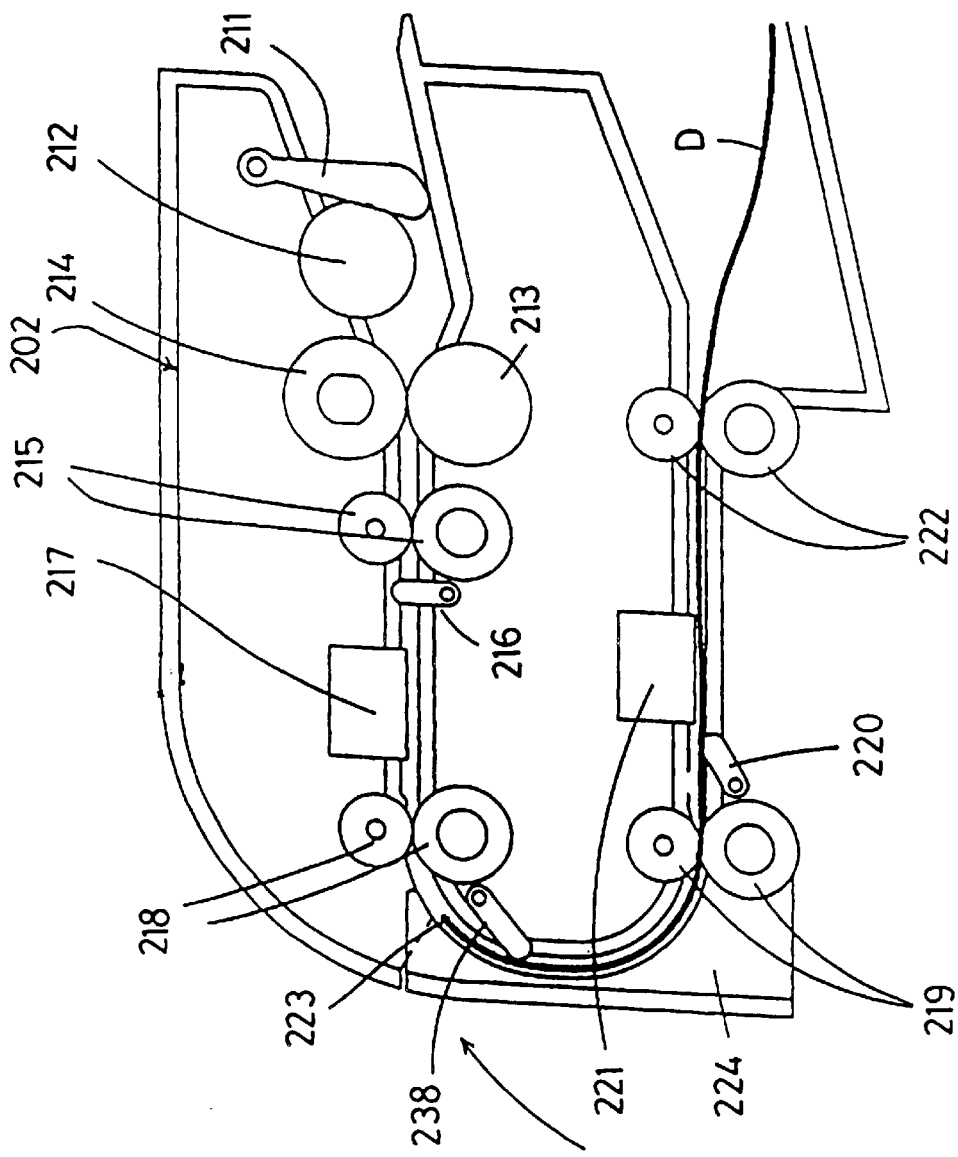
FIG. 17 is a cross section describing original document conveying operation in the image reading section.

After prescribed time that the reading position on the original document D reaches the reading reference position of the second contact type image sensor 219 passes, the second contact type image sensor 221 starts reading of the image information on the back side of the original document D (S216, see FIG. 16).

The original document D is conveyed by the second conveyance roller pair 219, and as the looseness of the original document D is smaller, the first conveyance roller pair 218 idles by means of a one-way clutch, not shown. When the looseness detection sensor 239 detects the rear end side of the original document D, the cover opening and closing mechanism 237 closes the cover 224 (S217, S218, see FIG. 17).

When the second original document end detection sensor 220 detects the rear end of the original document D (S219), after prescribed time that the reading position on the original document D reaches the reading reference position of the second contact type image sensor 219 passes, the second contact type image sensor 221 finishes reading of the image information on the back side of the original document D (S220).

The original document D is then delivered to and stacked on the original document delivery tray 205 by the delivery roller pair 222 (S221).

The above operation of S205 to S221 is repeated until all the original documents D are gone, and when the original document existence detection sensor 211 detects nonexistence of the original document (S202), the apparatus ends entire reading operation.

As described above, with the image reading apparatus according to this embodiment, image information can be transmitted to a single image processing means by switching the two contact type image sensors 217, 221 at the switching circuit 233, so that plurality of the image processing means is unnecessary, so that the electric circuit board can be made smaller, and so that the production costs will be reduced so much.

Where an apparatus having the reading function on one side as a standard function while the reading function on the double sides is made as an option, one image processing circuit can realize a standard form and an optional extra installation form, and therefore, the apparatus can be produced with lower costs in comparison with the structure having two image processing circuits.

Because the front end of the original document is stopped by the second conveyance roller pair 219 before the image information on the original document D is read by the second contact type image sensor 221, and because the original document conveyance route is opened, this apparatus can allow the looseness of the original document D occurring as a consequence that the rear end of the original document D is conveyed. Moreover, the first contact type image sensor 217 can read the image information on the rear end side of the original document D while the front end of the original document is stopped, and therefore, the distance between the first contact type image sensor 217 and the second contact type image sensor 221 can be made smaller, so that the apparatus can be made smaller in size.

After the front end of the original document is held by the second conveyance roller pair 219, the original document conveyance route 223 is made open and can be made closed right after the looseness of the original document D is gone, so that the apparatus can avoid improper conveyance as shown in the prior art No. 3 and can improve conveyance stability.

The apparatus also can read the original document D from the front end of the front and back sides of the original document, so that an image reversing means for reversing read image information or an original document reversing means for reversing the up and down sides of the original document would be unnecessary. This apparatus has faster reading throughput of the original documents in comparison with the apparatus requiring such an original document reversing means, can reduce the apparatus costs, and can make the structure of the apparatus simpler.

In addition, this apparatus has a structure that the looseness of the original document may go out of the apparatus as to escape from the apparatus by opening the original document conveyance route 223, so that the apparatus can be made smaller in size.

Another Structural Example in the Second Embodiment

Figure 18:
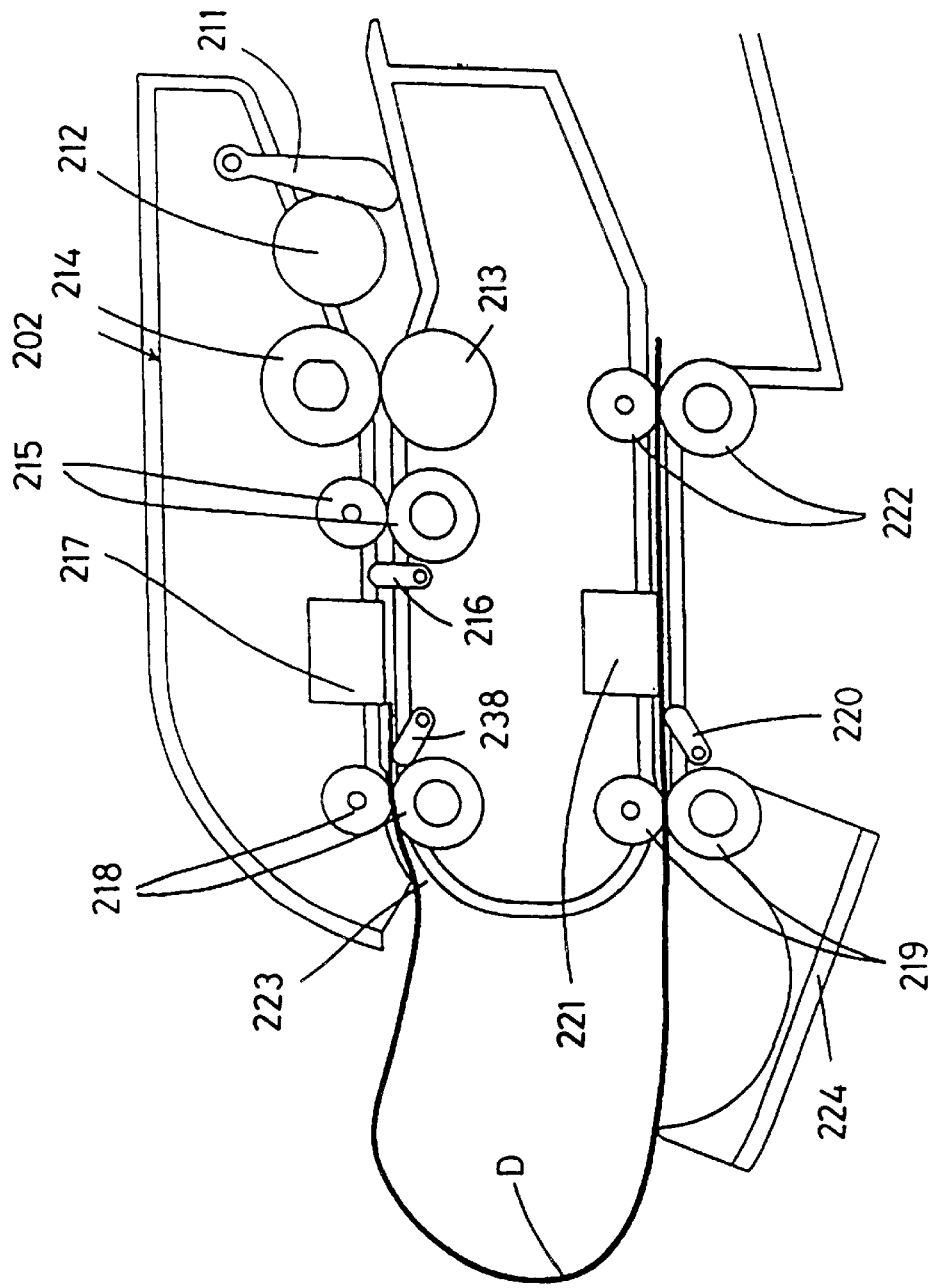
FIG. 18 is a schematic cross section showing an outline of an image reading section according to another embodiment.
Figure 19:
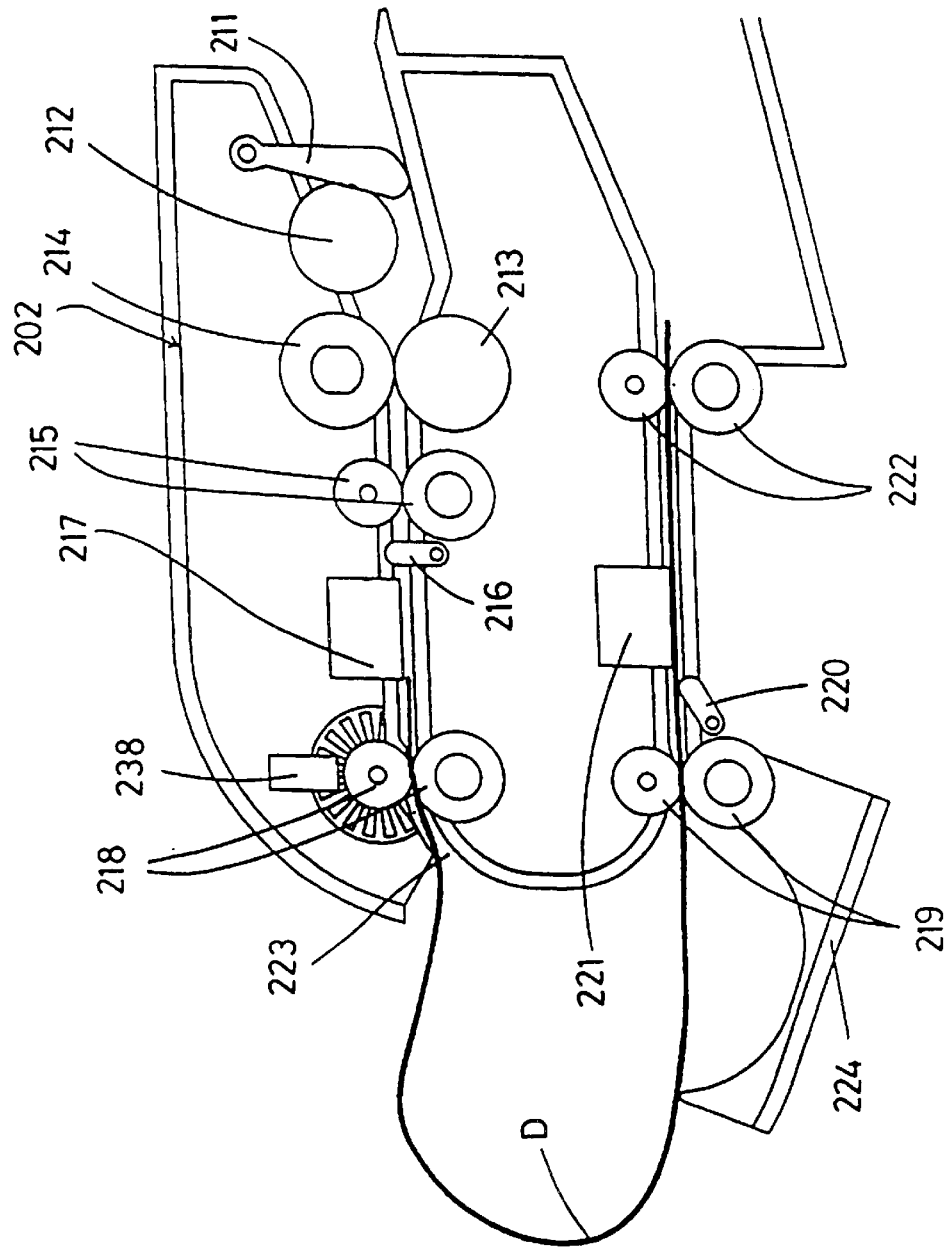
FIG. 19 is a schematic cross section showing an outline of an image reading section according to another embodiment.

Although in the embodiment above, the looseness detection sensor 238 is placed between the first conveyance roller pair 218 and the second conveyance roller pair 219, this invention is not limited to this structure and, for example, the sensor can be placed between the first contact type image sensor 217 and the first conveyance roller pair 218 to detect the rear end of the original document which begins to move upon elimination of the looseness of the original document D (see, FIG. 18), or a rotary detection sensor functioning as a looseness detection sensor 238 may be arranged on a roller axis of one roller of the first conveyance roller pair 218 to detect the associated rotation of the rollers after the looseness of the original document D is gone (see, FIG. 19).

The looseness detection sensor 238 may be not used where the first original document end detection sensor 216 counts the length in the conveyance direction of the original document D during reading of the image information on a front side, and where the original document conveyance amount of the second conveyance roller pair 219 up to that the looseness of the original document D is gone is calculated.

That is, the cover 224 is made closed right after the looseness of the original document D is gone, or more preferably, while the rear end of the original document D is sandwiched by the first conveyance route pair 218.

As described above, according to this embodiment, image information can be processed at a single image processing means by switching the two reading means at the switching means, so that the image processing means is not required to install at each of the reading means, so that the electric circuit board can be made smaller, and so that the production costs will be reduced so much.

Where an apparatus having the reading function on one side as a standard function while the reading function on the double sides is made as an option, one image processing means can realize a standard form and an optional extra installation form, and therefore, the apparatus can be produced with lower costs in comparison with the structure having two image processing means.

Because the front end of the original document is stopped by the second conveying rotary body before the image information on the original document is read by the second reading means, and because the original document conveyance route is opened, this apparatus can allow the looseness of the original document occurring as a consequence that the rear end of the original document is conveyed. Moreover, the first reading means can read the image information on the rear end side of the original document while the front end of the original document is stopped, and therefore, the distance between the first reading means and the second reading means can be made smaller, so that the apparatus can be made smaller in size.

After the front end of the original document is held by the second conveying rotary body, the original document conveyance route is made open between the first conveying rotary body and the second conveying rotary body and can be made closed right after the looseness of the original document is gone, so that the apparatus can improve conveyance stability.

The apparatus also can read the original document from the front end of the front and back sides of the original document, so that an image reversing means for reversing read image information or an original document reversing means for reversing the up and down sides of the original document would be unnecessary. This apparatus has faster reading throughput of the original documents in comparison with the apparatus requiring such an original document reversing means, can reduce the apparatus costs, and can make the structure of the apparatus simpler.

In addition, this apparatus has a structure that the looseness of the original document may go out of the apparatus as to escape from the apparatus by opening the original document conveyance route 223, so that the apparatus can be made smaller in size.

Third Embodiment

Hereinafter, referring to the drawings, a third embodiment of the image reading apparatus to which this invention applies is described in detail.

Referring to FIGS. 19 to 27, an image reading apparatus according to the third embodiment is described in detail. In this embodiment, a structure of the image reading apparatus used for a facsimile machine is exemplified.

Description of Apparatus Structure

Figure 20:
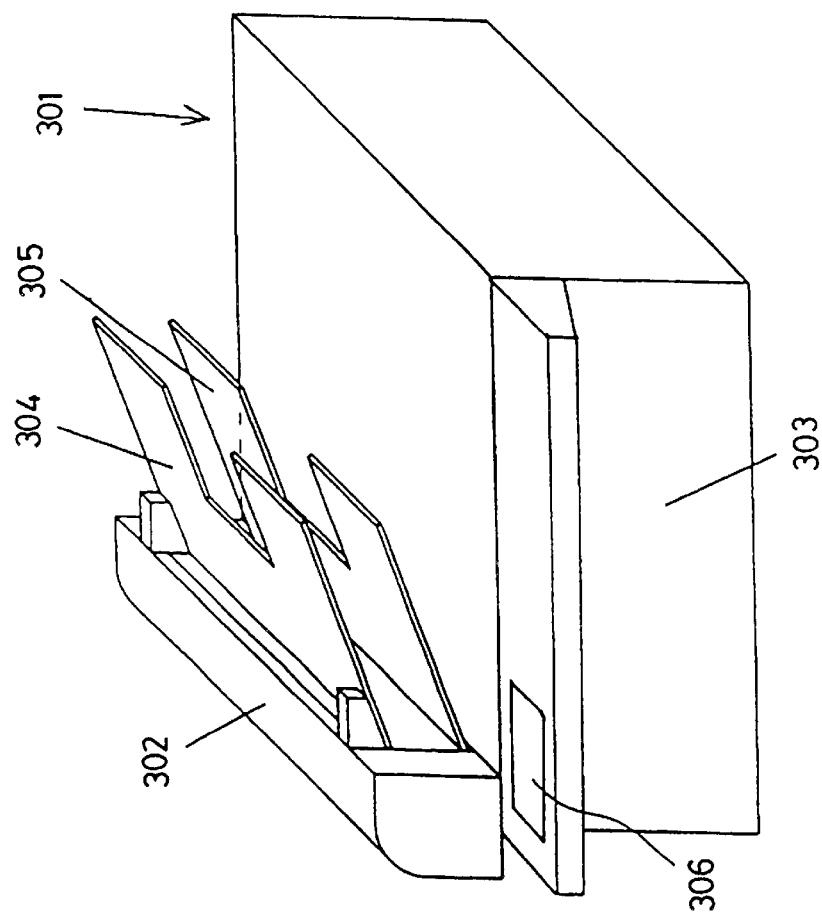
FIG. 20 is a perspective view showing an appearance of a facsimile machine.

FIG. 20 is a perspective view showing the appearance of the facsimile machine. Numeral 301 is an apparatus body: numeral 302 is an image reading section according to the invention; numeral 303 is a recording section made of a laser beam printer; numeral 304 is an original document tray 304 constituted as to stack plural sheets of the original documents D; numeral 305 is an original document delivery tray; and numeral 306 is a display portion for displaying information for guiding and giving instructions to a user.

Figure 21:
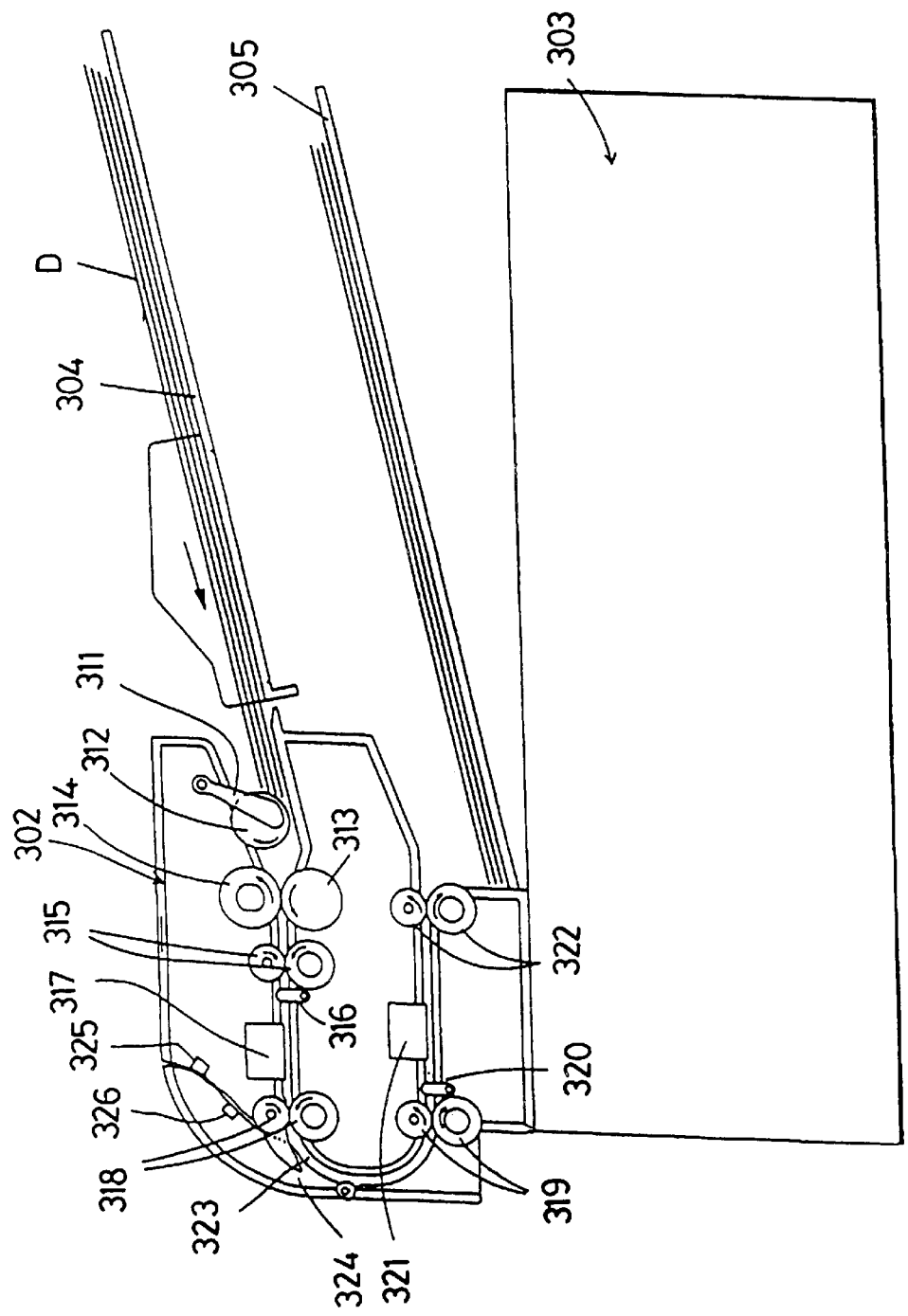
FIG. 21 is a schematic cross section showing an outline of an image reading section in the facsimile machine.

FIG. 21 is a schematic cross section showing a structural outline of the image reading section in the facsimile machine. In FIG. 21, numeral 311 is an original document existence detection sensor for detecting whether the original documents D are set on the original document tray 304; numeral 312 is a pickup roller for feeding the set original documents D into the image reading section 302; numerals 313, 314 are a reverse roller and a separation roller for separating the plural original documents D to each sheet in co-operation with each other; numeral 315 is a feeding roller pair for feeding the separated original document D; numeral 316 is a first original document end detection sensor for detecting front and rear ends of the original document; numeral 317 is a first contact type image sensor (first reading means) for reading image information on a front side of the original document D; numerals 318, 319 are first conveyance roller pair (first conveying rotary body) and second conveyance roller pair (second conveying rotary body) for conveying the original documents D by sandwiching the documents; numeral 320 is a second original document end detection sensor for detecting front and rear ends of the original document; numeral 321 is a second contact type image sensor (second reading means) for reading image information on a back side of the original document D; numeral 322 is a delivery roller pair for delivering the original documents D onto the original document tray 305; numeral 323 is a original document conveyance route; numeral 324 is an openable cover constituting a U-turn path portion of the original document conveyance route 323; numeral 325 is a cover sensor (conveyance route opening and closing detection means) for detecting whether the original document conveyance route is open (or the cover is opened); numeral 326 is a second original document existence detection sensor for detecting existence of the original documents when the original documents D are stacked on the opened cover 324.

Figure 22:
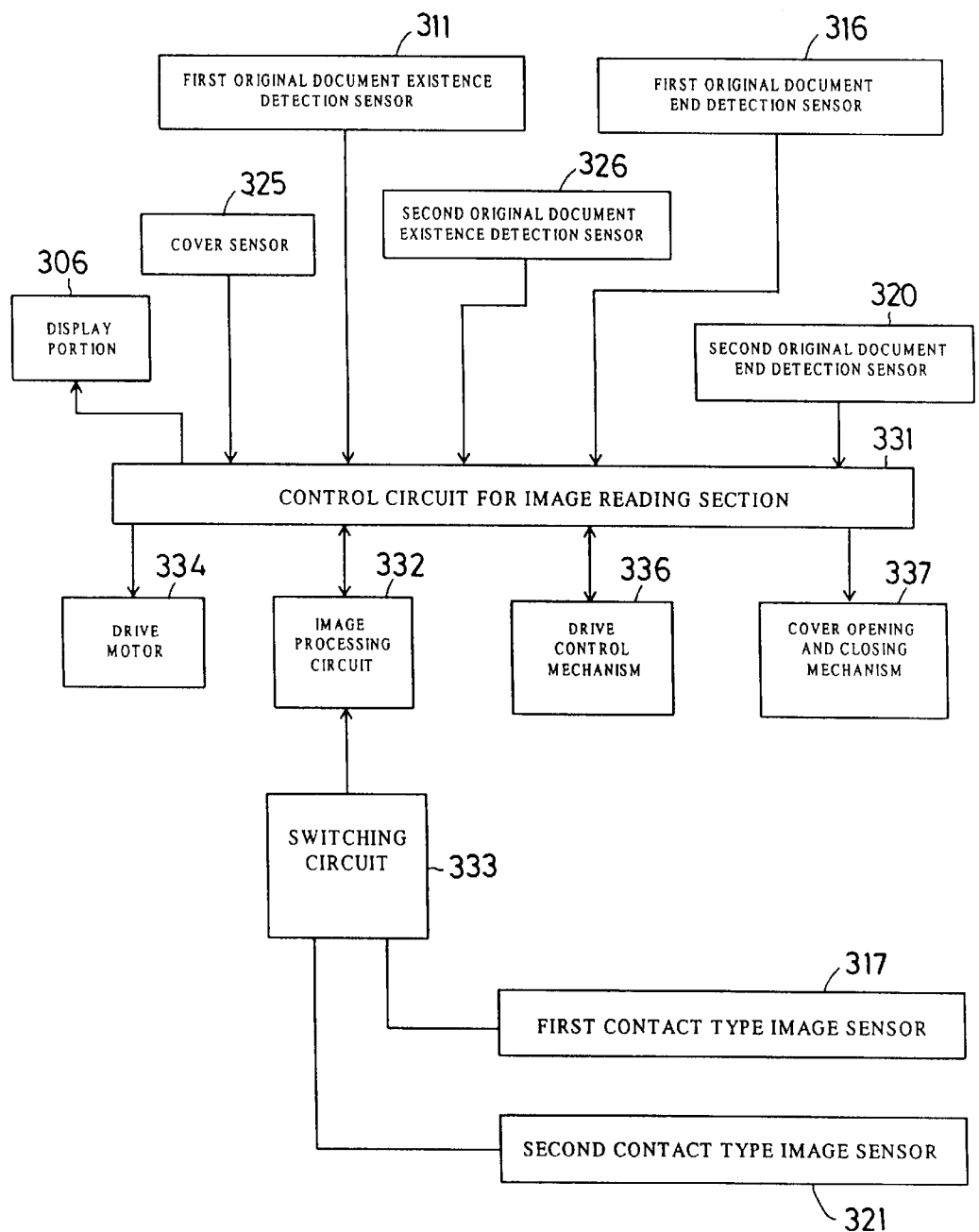
FIG. 22 is a block diagram showing an example of a control structure in the image reading section.

FIG. 22 is a block diagram showing an example of the controlling structure. In FIG. 22, numeral 331 is a control circuit for controlling the image reading section 302; numeral 332 is an image processing circuit (image processing means) for processing image information of the original documents D read by the first contact type image sensor 317 and the second contact type image sensor 321; numeral 333 is a switching circuit for switching to either of the first contact type image sensor 317 and the second contact type image sensor 321 the input source of the image information to be transmitted to the image processing circuit; numeral 334 is a drive motor for rotatively driving the feeding roller pair 315, the first conveyance roller pair 318, the second conveyance roller pair 319, and the delivery roller pair 322, which are constituting the original document feeding means; numeral 336 is a drive controlling mechanism (drive control means) constituted of a clutch and a solenoid and the like for rotating and stopping the second conveyance roller pair 319; numeral 337 is a cover opening and closing mechanism (conveyance route opening means) constituted of a motor, a solenoid, a cam mechanism, and so on for opening and closing the cover 324.

It is to be noted that numeral 306 is the display mentioned above; numeral 325 is the cover sensor described above; numeral 311 is the first original document described above; numeral 326 is the second original document existence detection sensor; numeral 316 is the first original document end detection sensor; and numeral 320 is the second original document end detection sensor.

Operation of the Apparatus According to the Third Embodiment

Figure 23:
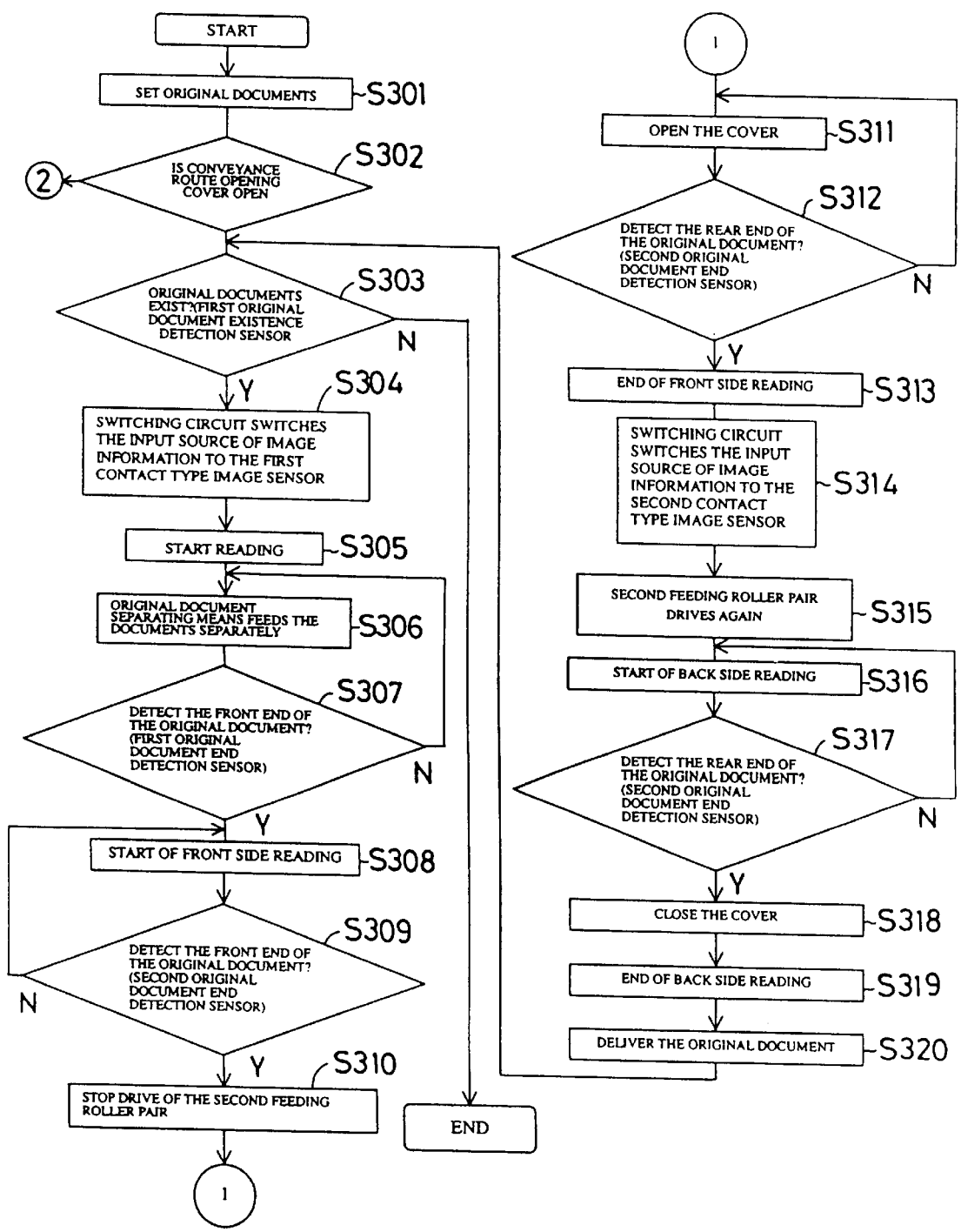
FIG. 23 is a flow chart showing operation flow in the image reading section.
Figure 24:
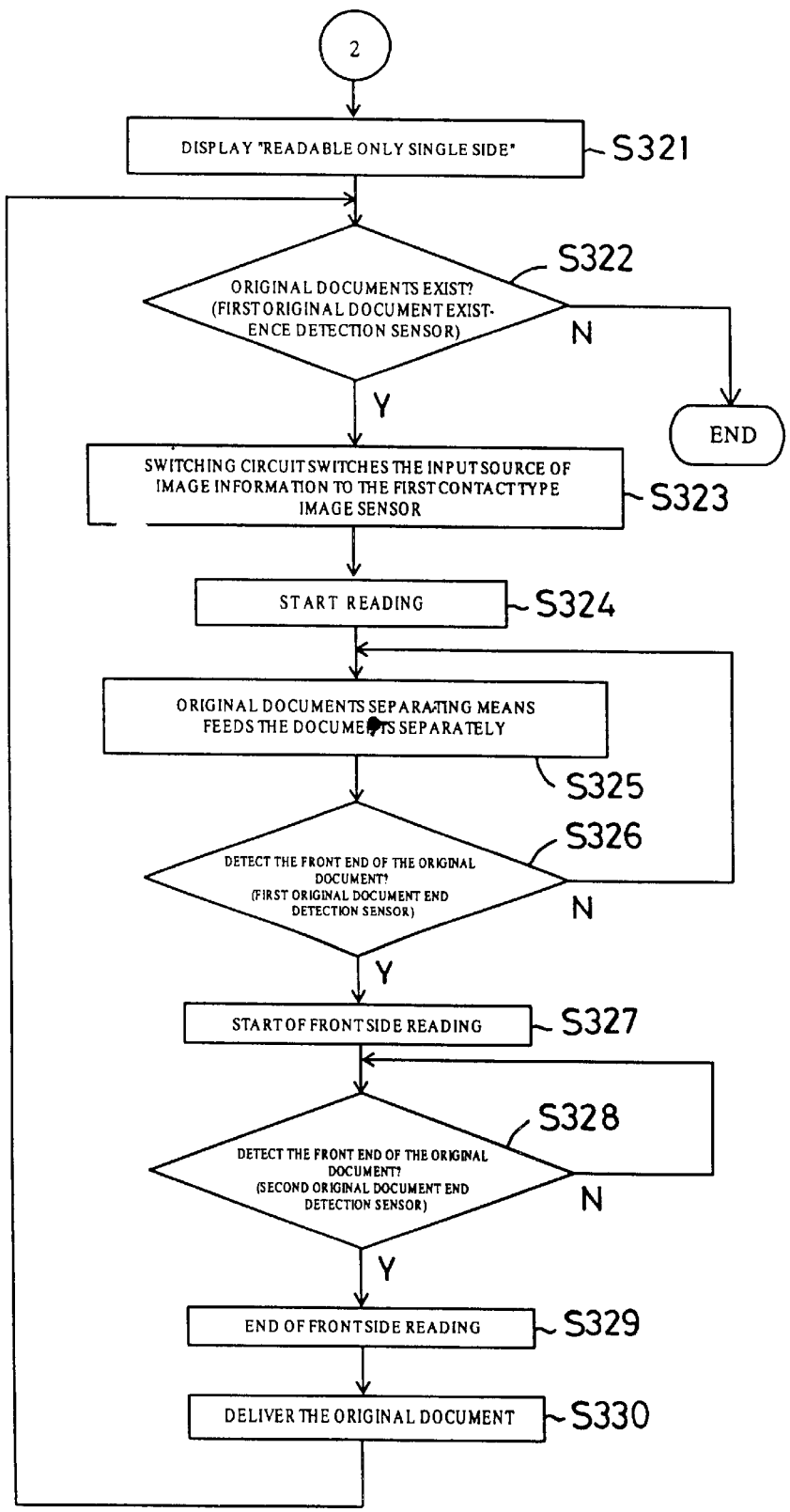
FIG. 24 is a flow chart showing operation flow in the image reading section.
Figure 25:
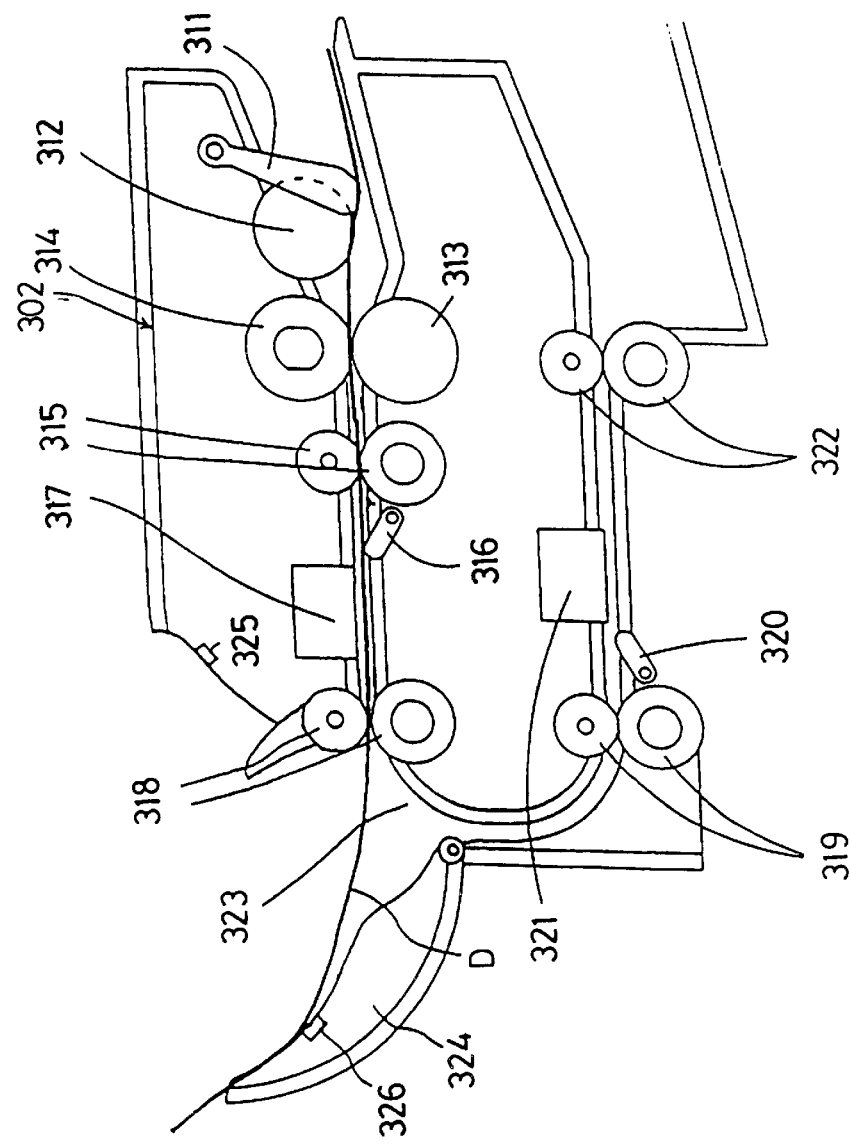
FIG. 25 is a cross section describing original document conveying operation in the image reading section.
Figure 26:
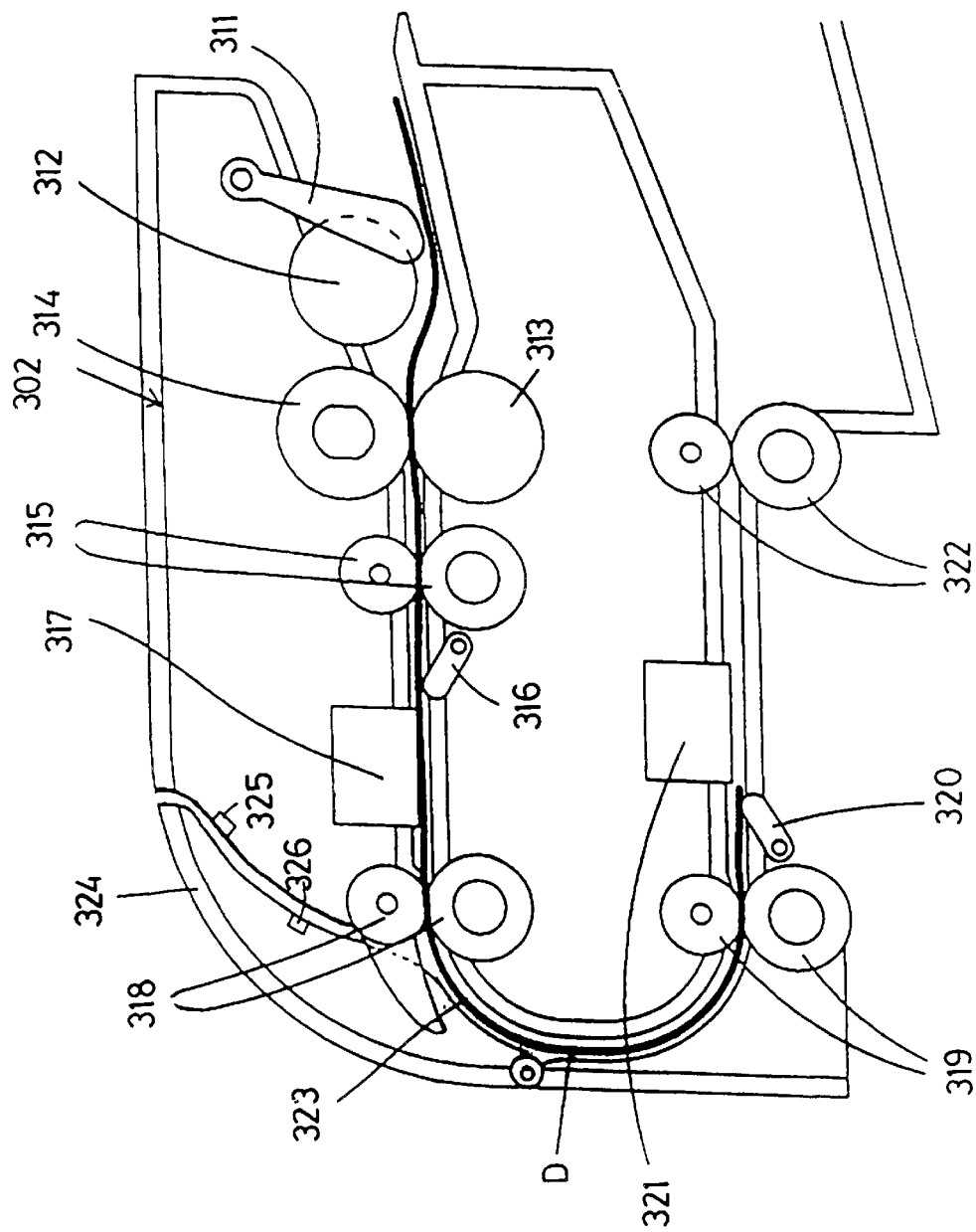
FIG. 26 is a cross section describing original document conveying operation in the image reading section.

Referring to FIGS. 25, 26, based on the flowcharts shown in FIGS. 23, 24, operation of the image reading section 302 is described.

Where the Cover is Opened Before Reading Start

A user sets original documents D on the original document tray 304 so that the front side is up (S301). When the U-turn path portion of the original document conveyance route 323 is opened in step S302 in FIG. 23 (or when the cover 324 is opened as detected by the cover sensor 325), the step goes to S321, to display a meaning of "readable only one side" at the display portion 306. The original documents D are detected by the first original document existence detection sensor 311.

Where the input source of the image information to be transmitted to the image processing circuit 332 is not the first contact type image sensor 317, the switching circuit 233 switches the source to the first contact type image sensor 317 (S323). Where the user sets some reading conditions (e.g., density, and resolution), the apparatus starts reading (S324).

The original documents D stacked on the original document tray 304 are fed by the pickup roller 312 and separated to each sheet by the reverse roller 313 and the separation roller 314 which are constituting the original document separation means (S325).

When the separated original document D reaches the feeding roller pair 315, and when the front end is detected by the first original document end detection sensor 316 (S326), the first contact type image sensor 317 starts reading of the image information on the front side of the original document D after prescribed time that a reading start position on the original document D reaches a reading reference position of the first contact type image sensor 317 passes (S327).

Subsequently, the first original document end detection sensor 316 detects the rear end of the original document D (S328), and after prescribed time that the reading position on the original document D reaches the reading reference position of the first contact type image sensor 317 passes, the first contact type image sensor 317 finishes reading of the image information on the front side of the original document D (S329).

Subsequently, the original document D is delivered onto the cover 324 from the original document conveyance route 323 opened by the first conveyance roller pair 318 (S330, see, FIG. 25).

The above operation of S322 to S330 is repeated until that the original documents D on the original document tray 304 are gone, and when the first original document existence detection sensor 311 detects non-existence of the original document, the apparatus ends reading operation of image information on one sides (single side) of all the original documents.

It is to be noted that the cover 324 is structured to keep an angle between 0° or more and 70° or less with respect to the horizon to convey the original documents D in substantially in a linear manner.

Where the Cover is Closed Before Reading Start

When the cover 324 constituting the U-turn path portion of the original document conveyance route 323 is made closed in step S302 in FIG. 23, after the original documents D are detected by the first original document existence detection sensor 311 (S303), the switching circuit 233 switches the source to the first contact type image sensor 317 (S304), where the input source of the image information to be transmitted to the image processing circuit 332 is not the first contact type image sensor 317. Where the user sets some reading conditions (e.g., density, and resolution), the apparatus starts reading (S305).

The original documents D stacked on the original document tray 304 are fed by the pickup roller 312 and separated to each sheet by the reverse roller 313 and the separation roller 314 which are constituting the original document separation means (S306).

When the separated original document D reaches the feeding roller pair 315, and when the front end is detected by the first original document end detection sensor 316 (S307), the first contact type image sensor 317 starts reading of the image information on the front side of the original document D after prescribed time that a reading start position on the original document D reaches a reading reference position of the first contact type image sensor 317 passes (S308).

Figure 27:
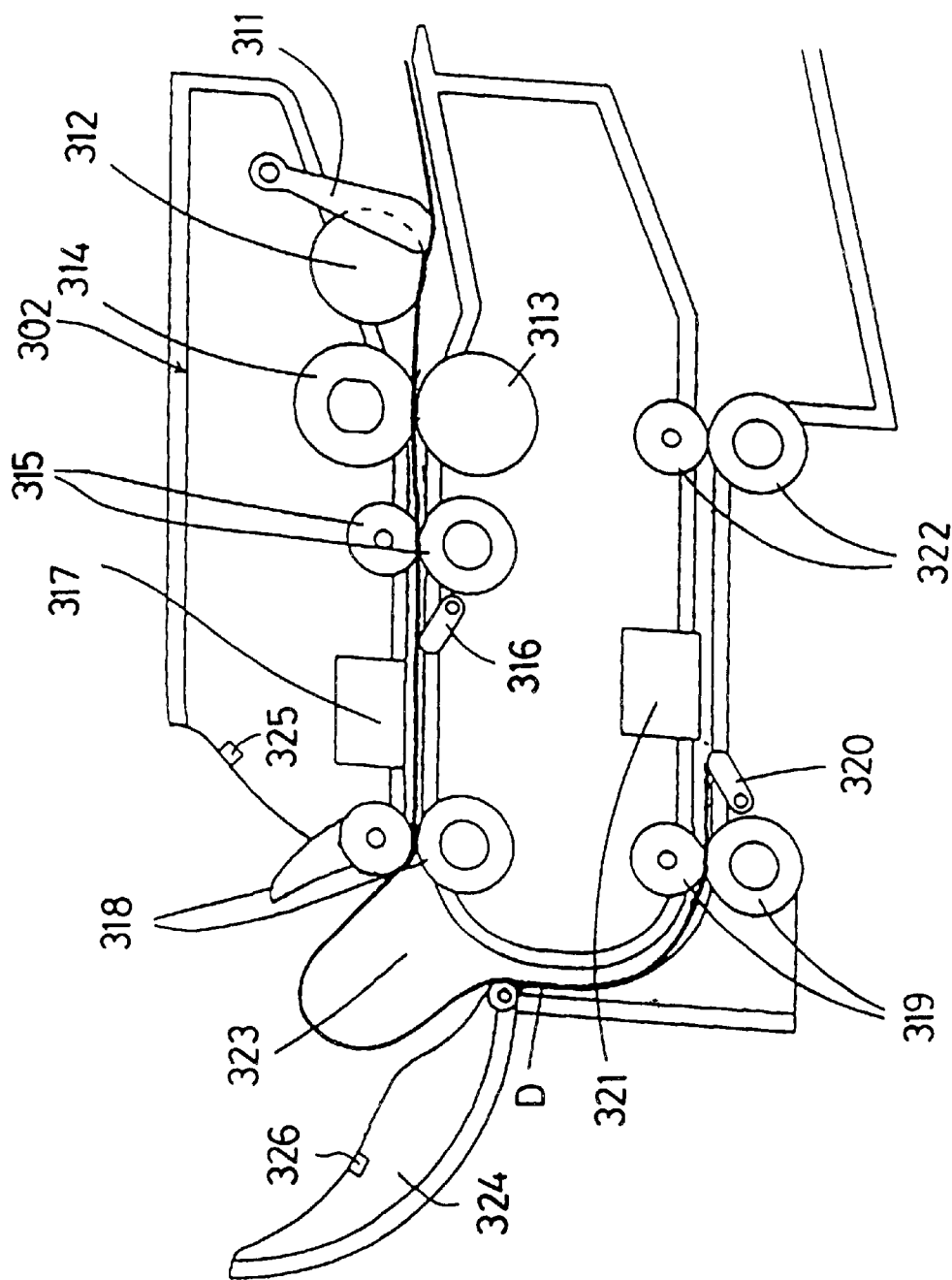
FIG. 27 is a cross section describing original document conveying operation in the image reading section.

The original document D reaches the first conveyance roller 318 and reaches the second conveyance roller pair 319 after sent to the U-turn portion 323 in the original document conveyance route. When the second original document end detection sensor 320 detects the front end of the original document D (S309, see FIG. 26), the second drive control mechanism 336 stops the rotation of the second conveyance roller pair 319 (S310), and the cover opening and closing mechanism 337 makes the cover 324 open (S311 as shown in FIG. 27). That is, a space of the U-turn path portion of the original document conveyance route 323 between the first conveyance roller pair 318 and the second conveyance roller pair 319 is widened.

At that time, although the second conveyance roller pair 319 holds and sandwiches the vicinity of the front end of the original document D, a looseness occurs in the original document D between the first conveyance roller pair 318 and the second conveyance roller pair 319 because the more upstream side from that point is continuously conveyed by the first conveyance roller pair 318. However, since the cover 324 is made open, the original document D goes as to extend to the outer side of the image reading apparatus 302 as shown in FIG. 27, and therefore, the original document D will not be jammed in the original document conveyance route.

Subsequently, the first original document end detection sensor 316 detects the rear end of the original document D (S321), and after prescribed time that the reading position on the original document D reaches the reading reference position of the first contact type image sensor 317 passes, the first contact type image sensor 317 finishes reading of the image information on the front side of the original document D (S313).

The switching circuit 333 switches to the second contact type image sensor 321 the input source of the image information to be transmitted to the image processing circuit 332 (S314) and the drive control mechanism 336 resumes the rotation of the second conveyance roller pair 319 (S315).

After prescribed time that the reading position on the original document D reaches the reading reference position of the second contact type image sensor 319 passes, the second contact type image sensor 321 starts reading of the image information on the back side of the original document D (S316).

When the second original document end detection sensor 320 detects the rear end of the original document D (S317), after prescribed time that the reading position on the original document D reaches the reading reference position of the second contact type image sensor 319 passes, the second contact type image sensor 321 finishes reading of the image information on the back side of the original document D (S318).

After prescribed time that the reading position on the original document D reaches the reading reference position of the second contact type image sensor 321 passes, the second contact type image sensor 321 finishes reading of the image information on the back side of the original document D (S319).

The original document D is then delivered to and stacked on the original document delivery tray 305 by the delivery roller pair 322 (S320).

It is to be noted that when the second contact type image sensor 321 starts reading of the image information on the back side of the previous original document D, the first original document existence detection sensor 311 monitors existence of the subsequent original document D.

While the first original document existence detection sensor 311 detects the subsequent original document D, the subsequent original document D is separately fed sheet by sheet with the pickup roller 312 and the reverse roller 313 concurrently with reading operation of the previous original document D.

Then, the subsequent original document D reaches the feeding roller pair 315, and when the first original document end detection sensor 316 detects the front end of the subsequent original document D, the feeding drive control mechanism, not shown, constituted of a clutch, a solenoid, and the like for rotating and stopping the pickup roller 312, the reverse roller 313, the separation roller 314, and the feeding roller pair 315, enters in a drive cutoff state (OFF state), thereby stopping the rotations of the pickup roller 312, the reverse roller 313, the separation roller 314, and the feeding roller pair 315.

As described above, when the second original document end detection sensor 320 detects the rear end of the original document D, the cover 324 is closed by the cover opening and closing mechanism 337, and at the same time, the switching circuit 333 switches to the first contact type image sensor 317 the input source of the image information to be transmitted to the image processing circuit 332. The feeding drive control mechanism, not shown, as described above, turns into a drive transmission state (ON state), and the pickup roller 312; the reverse roller 313, the separation roller 314, and the feeding roller pair 315 are rotated again, thereby starting reading of the image information on the front side of the subsequent original document D. This makes shorter the time for original document conveyance other than the reading time, thereby reducing the total time for reading the plural original documents D.

The above operation is repeated until all the original documents D on the original document tray 304 are gone, and when the original document existence detection sensor 311 detects non-existence of the original document, the apparatus ends entire reading operation.

As described above, according to the embodiment, when the image information of the original document D is read by the first contact type image sensor 317 or the second contact type image sensor 321, the original document D is delivered from or inserted in the original document conveyance route 323 opened by opening the cover 324, and therefore, original document conveyance in substantially a linear manner and reading done by manual feedings sheet by sheet can realized selectively in accordance with kinds of the original documents.

The cover 324 is made still in keeping the angle between 0° or more and 70° or less with respect to the horizon, so that there is an advantage that the cover 324 is used for the stacking tray for delivered original documents or staking tray for inserted original documents.

More specifically, the original documents D delivered from the opened original document conveyance route 323 are staked on the opened cover 324, and the original document having a relatively high rigidity (e.g., thick original document) can be conveyed easily.

The cover sensor 325 is provided for detecting as to whether the cover 324 is open, and when the sensor detects that the cover 324 is open before the start of reading on the original document, the apparatus prohibits the double side reading and displays information of allowance of single side reading (or prohibition of double side reading), so that the apparatus has an advantages to inform the user that the apparatus implements reading operation on only one side.

Image information can be transmitted to a single image processing circuit 323 by switching the two contact type image sensors 317, 321 at the switching circuit 333, so that plurality of the image processing means is unnecessary, so that the electric circuit board can be made smaller, and so that the production costs will be reduced so much.

Where an apparatus having the reading function on one side as a standard function while the reading function on the double sides is made as an option, one image processing circuit can realize a standard form and an optional extra installation form, and therefore, the apparatus can be produced with lower costs in comparison with the structure having two image processing circuits.

Because the front end of the original document is stopped by the second conveyance roller pair 319 before the image information on the original document D is read by the second contact type image sensor 321, and because the original document conveyance route is opened, this apparatus can allow the looseness of the original document D occurring as a consequence that the rear end of the original document D is conveyed. Moreover, the first contact type image sensor 317 can read the image information on the rear end side of the original document D while the front end of the original document is stopped, and therefore, the distance between the first contact type image sensor 317 and the second contact type image sensor 321 can be made smaller, so that the apparatus can be made smaller in size.

After the front end of the original document is held by the second conveyance roller pair 319, the original document conveyance route 323 is made open and can be made closed right after the looseness of the original document D is gone, so that the apparatus can avoid improper conveyance as shown in the prior art No. 3 and can improve conveyance stability.

The apparatus also can read the original document D from the front end of the front and back sides of the original document, so that an image reversing means for reversing read image information or an original document reversing means for reversing the up and down sides of the original document would be unnecessary. This apparatus has faster reading throughput of the original documents in comparison with the apparatus requiring such an original document reversing means, can reduce the apparatus costs, and can make the structure of the apparatus simpler.

In addition, this apparatus has a structure that the looseness of the original document may go out of the apparatus as to escape from the apparatus by opening the original document conveyance route 323, so that the apparatus an be made smaller in size.

Fourth Embodiment

Figure 28:
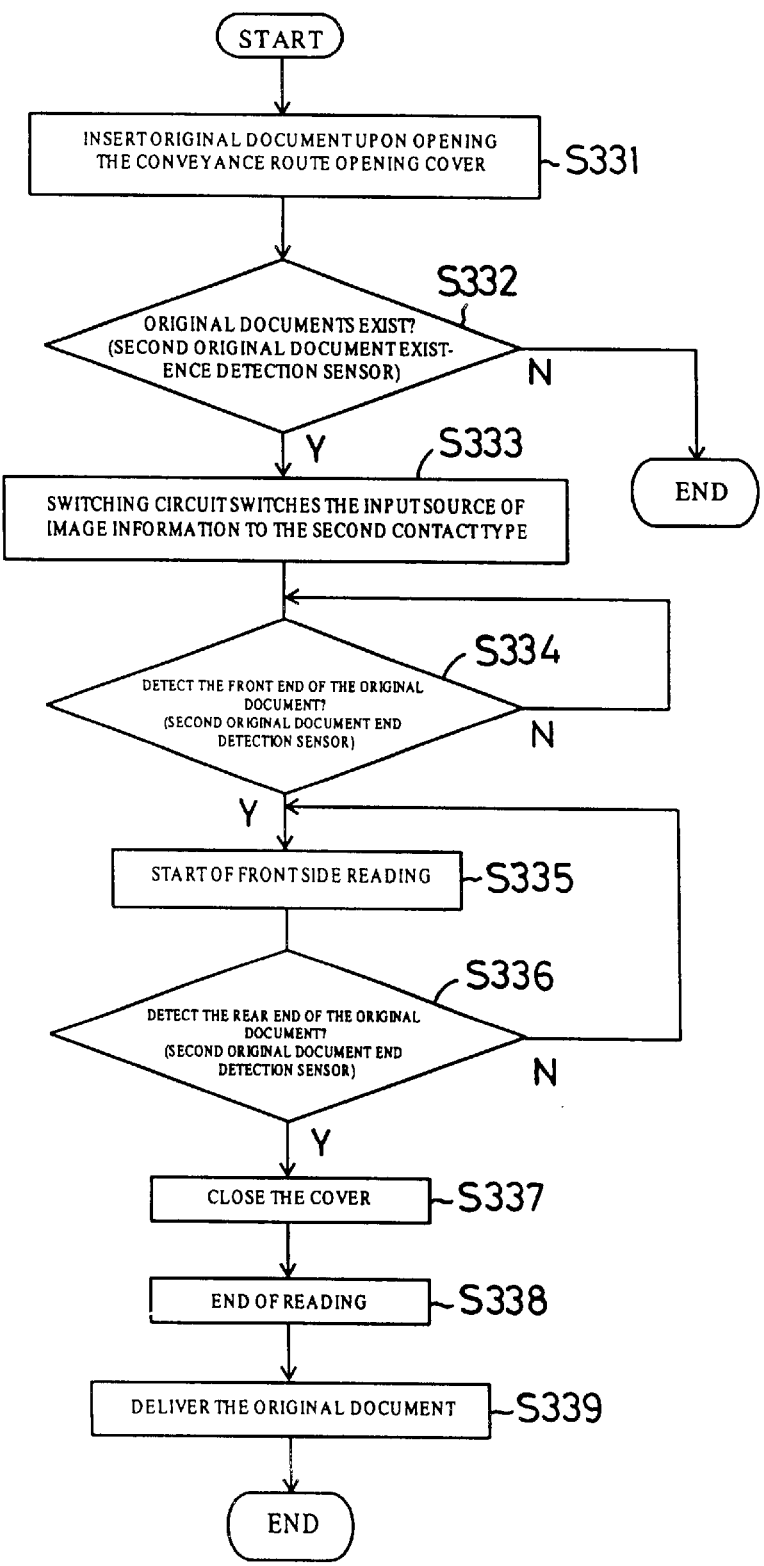
FIG. 28 is a flow chart showing operation flow in the image reading section according to another embodiment.
Figure 29:
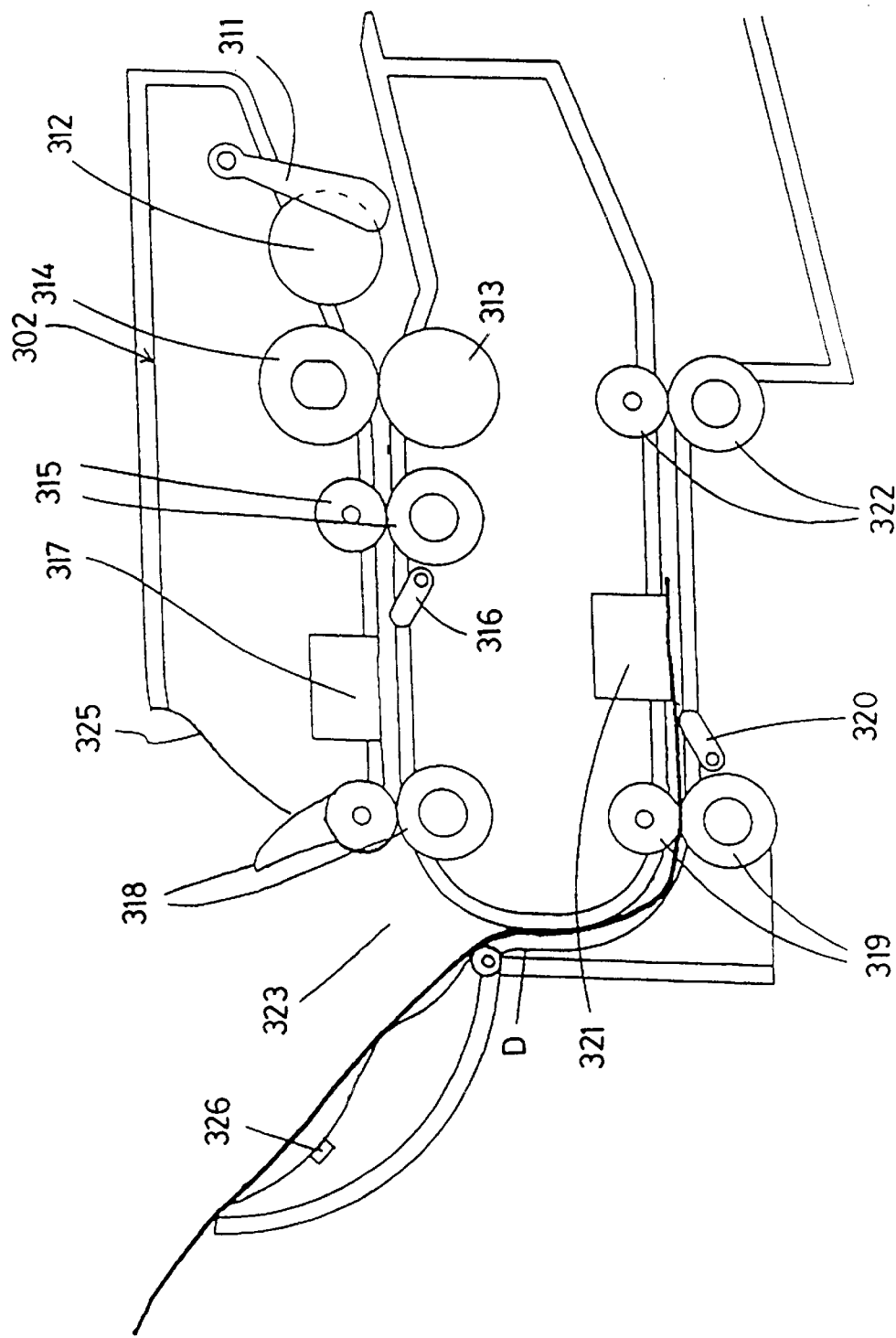
FIG. 29 is a cross section describing original document conveying operation in the image reading section according to another embodiment.

Referring to FIGS. 28, 29, the image reading apparatus according to fourth embodiment is described in detail. FIG. 28 is a flow chart showing operation flow in the image reading section according to this embodiment, and FIG. 29 is a cross section describing original document conveying operation in the image reading section according to this embodiment.

It is to be noted that in this embodiment, a structure of the image reading apparatus used in a facsimile machine is exemplified, but the structural outline of the entire apparatus is about the same as the embodiment above, so that a detailed description is omitted upon adding the same reference numbers to members having the same functions.

In this embodiment, the cover 324 is opened, and when the original document D is inserted from the opened original document conveyance route 323, the image information on the original document D can be read upon operation of the second contact, type image sensor 321. When the original document D is inserted from the opened original document conveyance route 323, since any original document separation means is not formed in front of the second contact type image sensor 321, the reading operation is done by manual feeding sheet by sheet. Accordingly, in a case of an original document (e.g., photographic original documents) in which the image surface (surface on a contact type image sensor) may receive scratches by the original document separation means, the original document D can be read without scratching the original document by reading the original document upon the manual feeding from the opening of the original document conveyance route 323 having no original document separation means.

Operation of the Apparatus

Hereinafter, based on a flowchart shown in FIG. 28, in reference with FIG. 29, operation of the image reading apparatus 302 according to the embodiment is described.

Where a user opens the cover 304, and when the original documents D are set on the cover 324 in a manner that sides to be read are faced up (S331), the second original document existence detection sensor 326 detects the original documents D (S332). The original documents D can be conveyed by this placement, and if the start bottom is pushed, the second conveyance roller pair 319 rotates to feed the original documents D toward the second contact type image sensor 321.

The switching circuit 333 switches to the second contact type image sensor 321 the input source of the image information to be transmitted to the image processing circuit 332 (S333).

When the front end of the original document D is detected by the second original document end detection sensor 320 (S334), the second contact type image sensor 321 starts reading on the image information on the reading side after prescribed time that a reading start position on the original document D reaches a reading reference position of the second contact type image sensor 321 passes.

When the second original document end detection sensor 320 detects the rear end of the original document D (S336), the cover 324 is closed by the cover opening and closing mechanism 337 (S337).

At the same time, after prescribed time that the reading start position on the original document D reaches the reading reference position of the second contact type image sensor 321 is measured, the second contact type image sensor 321 ends reading of the image information on the back side.

Then, the original document D is delivered to the original document delivery tray 305 by the delivery roller pair 322 (S339).

According to this embodiment, in addition to the effects of the embodiment above, the original document D inserted from the opened original document conveyance route 323 is set to the opened cover 324, and the original document (e.g., photographic original document) that otherwise may suffer from scratches by the original document separation means can be advantageously read without suffering scratches.

As described above, according to this invention, when the image information of the original document is read by the first reading means or the second reading means, the original document is delivered from or inserted in the original document conveyance route opened by opening the cover, so that the conveyance in substantially a linear manner of the original document and reading by a manual feeding done sheet by sheet can be selectively realized according to the kinds of the original documents.

The cover thus opened is made still in keeping the angle between 0° or more and 70° or less with respect to the horizon, so that there is an advantage that the cover is used for the stacking tray for delivered original documents or staking tray for inserted original documents.

More specifically, by stacking the original documents delivered from the opened original document conveyance route on the opened cover, the apparatus can enjoy the effect that the-original document having a relatively high rigidity (e.g., thick original document) can be conveyed easily.

The original document D inserted from the opened original document conveyance route 323 is set to the opened cover 324, and the original document (e.g., photographic original document) that otherwise may suffer from scratches by the original document separation means can be advantageously read without suffering scratches.

In this apparatus, conveyance route opening and closing means is formed to detect whether the cover is open, and when the cover is detected as open before the original document starts to be read, the apparatus prohibits the double side reading and displays the reading allowance for a single side or reading prohibition on the double sides, thereby informing the users that the apparatus can operate reading on the single side.

Fifth Embodiment

Hereinafter, referring to the drawings, a fifth embodiment of the image reading apparatus to which this invention applies is described in detail.

Hereinafter, referring to FIGS. 30 to 37, the fifth embodiment of the image reading apparatus to which this invention applies is described in detail. In this embodiment, a structure of the image reading apparatus used for a facsimile machine is exemplified. It is to be noted that the structure of the facsimile machine is substantially the same as the first, second embodiments, so that a detailed description is omitted (see, FIG. 1).

Figure 30:
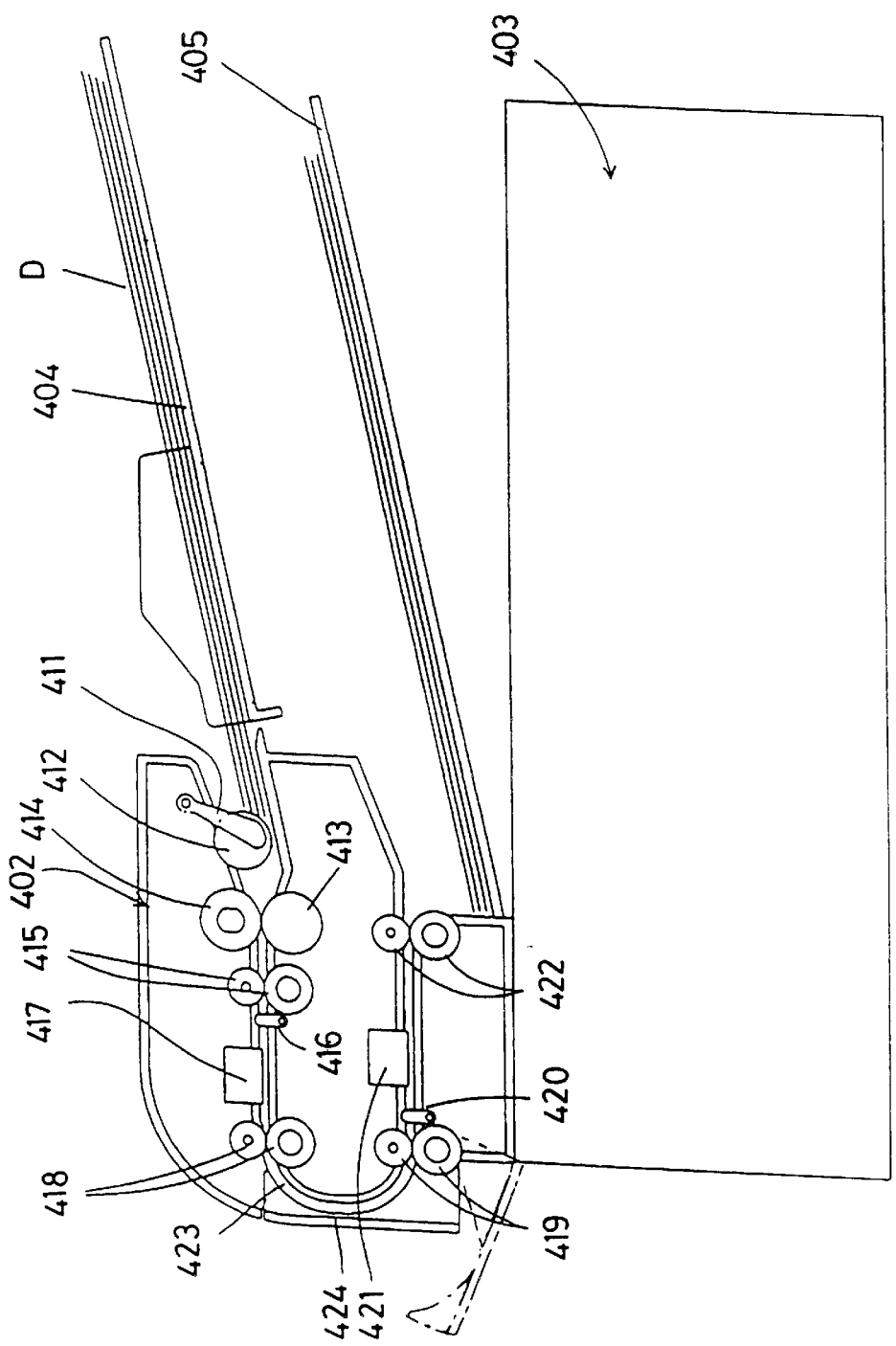
FIG. 30 is a schematic cross section showing an outline of an image reading section in another facsimile machine.

FIG. 30 is a schematic cross section showing a structural outline of an image reading apparatus 402 for the facsimile machine. In FIG. 30, 403 is a recording section, e.g. a laser beam printer; numeral 411 is an original document existence detection sensor for detecting whether the original documents D are set on the original document tray 404; numeral 412 is a pickup roller for feeding the set original documents D into the image reading section 402; numerals 413, 414 are a reverse roller and a separation roller for separating the plural original documents D to each sheet in co-operation with each other; numeral 415 is a feeding roller pair for feeding the separated original document D; numeral 416 is a first original document end detection sensor for detecting front and rear ends of the original document; numeral 417 is a first contact type image sensor (first reading means) for reading image information on a front side of the original document D; numerals 418, 419 are first conveyance roller pair (first conveying rotary body) and second conveyance roller pair (second conveying rotary body) for conveying the original documents D by sandwiching the documents; numeral 420 is a second original document end detection sensor for detecting front and rear ends of the original document D; numeral 421 is a second contact type image sensor (second reading means) for reading image information on a back side of the original document D; numeral 422 is a delivery roller pair for delivering the original documents D onto the original document tray 405; numeral 423 is a original document conveyance route; numeral 424 is an openable cover constituting a U-turn path portion of the original document conveyance route 423.

Figure 31:
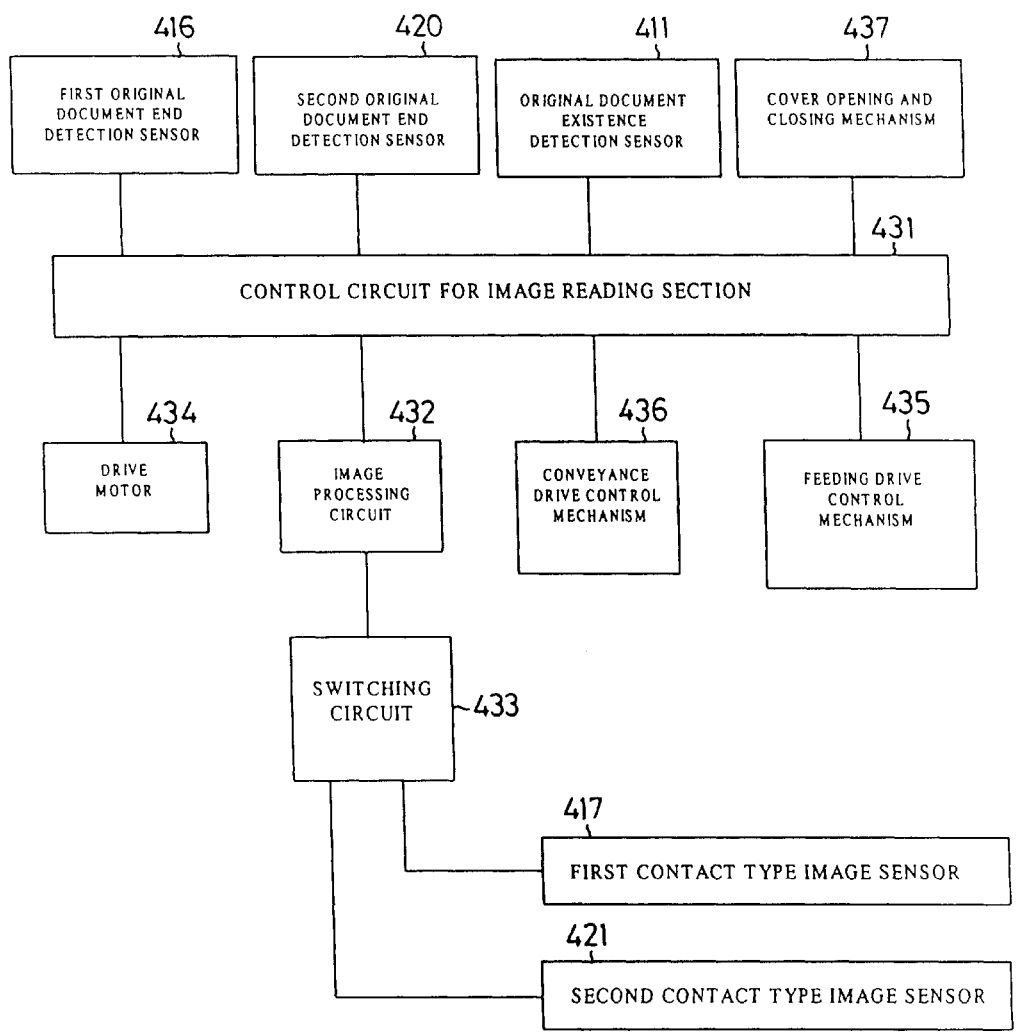
FIG. 31 is a block diagram showing an example of a control structure in the image reading section.

FIG. 31 is a block diagram showing an example of the controlling structure. In FIG. 31, numeral 431 is a control circuit for controlling the image reading section 402; numeral 432 is an image processing circuit (image processing means) for processing image information of the original documents D read by the first contact type image sensor 417 and the second contact type image sensor 421; numeral 433 is a switching circuit for switching to either of the first contact type image sensor 417 and the second contact type image sensor 421 the input source of the image information to be transmitted to the image processing circuit; numeral 434 is a drive motor for rotatively driving the feeding roller pair 415, the first conveyance roller pair 418, the second conveyance roller pair 419, and the delivery roller pair 422, which are constituting the original document feeding means; numeral 435 is a feeding drive control mechanism (feeding drive control means) constituted of a clutch, a solenoid, and so on for rotating and stopping the pickup roller 412, the reverse roller 413, the separation roller 414, and the feeding roller pair 415; numeral 436 is a drive controlling mechanism (drive control means) constituted of a clutch and a solenoid and the like for rotating and stopping the second conveyance roller pair 419; numeral 437 is a cover opening and closing mechanism (conveyance route opening means) constituted of a motor, a solenoid, a cam mechanism, and so on for opening and closing the cover 424. Numeral 411 is the original document existence sensor; numeral 416 is the first original document end detection sensor; numeral 420 is the second original document end detection sensor.

Figure 32:
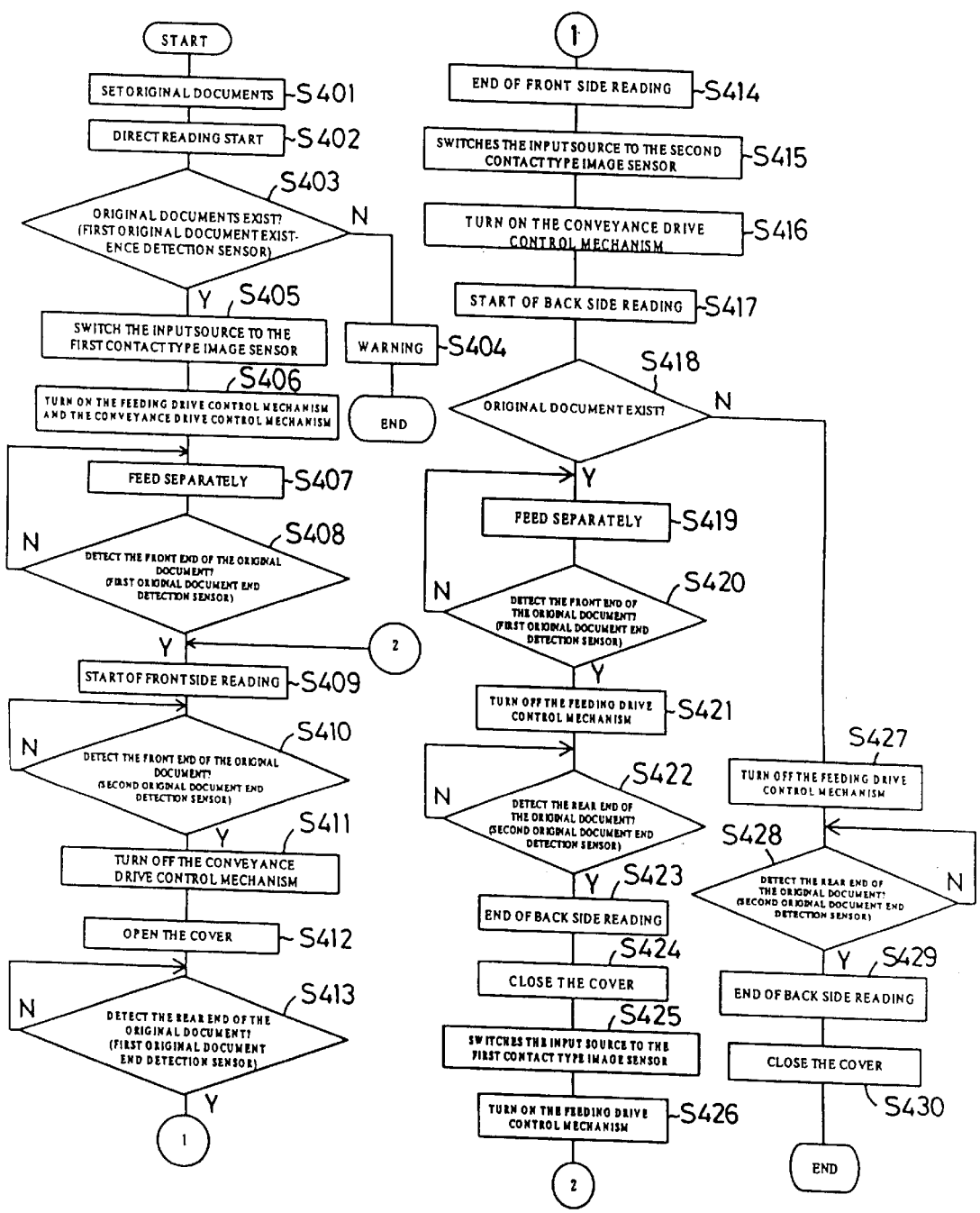
FIG. 32 is a flow chart showing operation flow in the image reading section.
Figure 33:
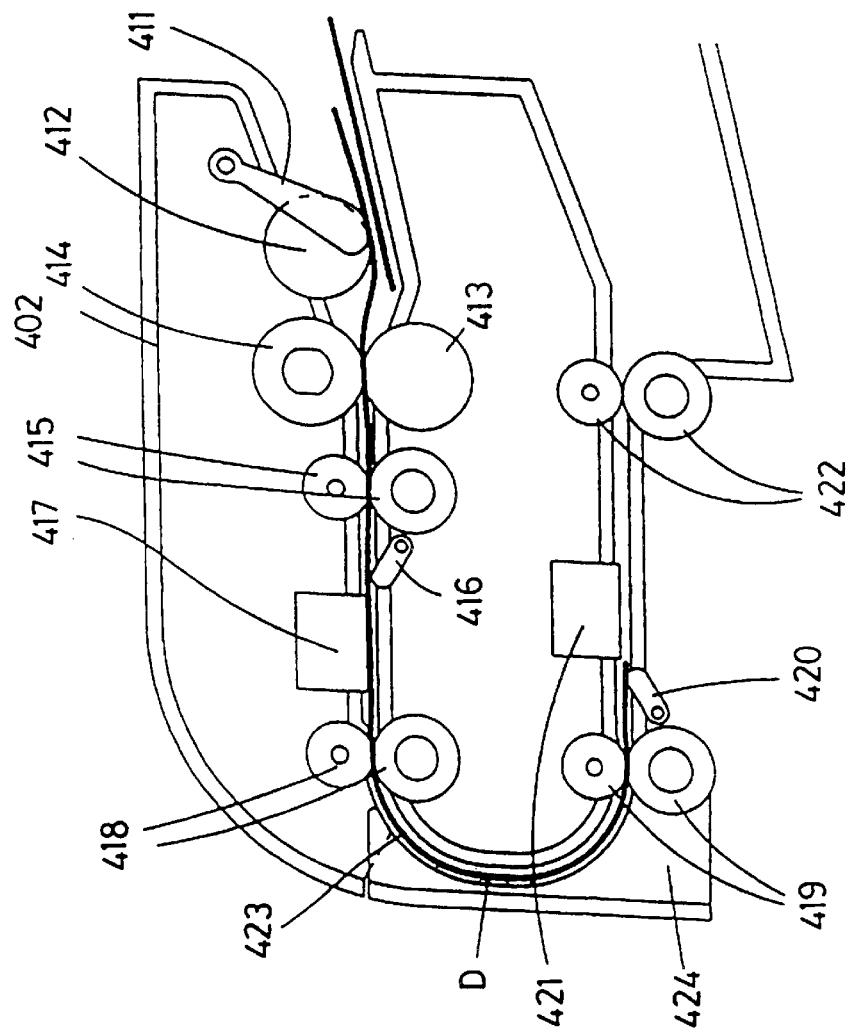
FIG. 33 is a cross section describing original document conveying operation in the image reading section.

Based on a flowchart shown in FIG. 32, referring to FIGS. 33 to 37, operation of the image reading section 402 is described.

A user sets the original documents D on the original document tray 404 in a manner that sides to be read are faced up (S401), and the user sets the prescribed reading conditions (resolution, density, etc) to direct beginning of reading (S402).

The original document existence detection sensor 411 monitors existence of the original documents D (S403). If the sensor detects the original document, the apparatus moves for reading operation, and if the sensor detects nothing, the apparatus gives a warning so and ends the operation (S404).

The switching circuit 433 switches to the first contact type image sensor 417 the input source of the image information to be transmitted to the image processing circuit 432 if the input source is not the first contact type image sensor 417.

The feeding drive control mechanism 435 and the conveyance drive control mechanism 436 enters the drive transmission state (ON state) at the same time as the drive motor 434 drives (S406).

The original documents D stacked on the original document tray 404 are fed by the pickup roller 412 and separated to each sheet by the reverse roller 413 and the separation roller 414 which are constituting the original document separation means (S407). When the separated original document D reaches the feeding roller pair 415, and when the front end is detected by the first original document end detection sensor 416 (S408), the first contact type image sensor 417 starts reading of the image information on the front side of the original document D after prescribed time that a reading start position on the original document D reaches a reading reference position of the first contact type image sensor 417 passes (S409).

Figure 34:
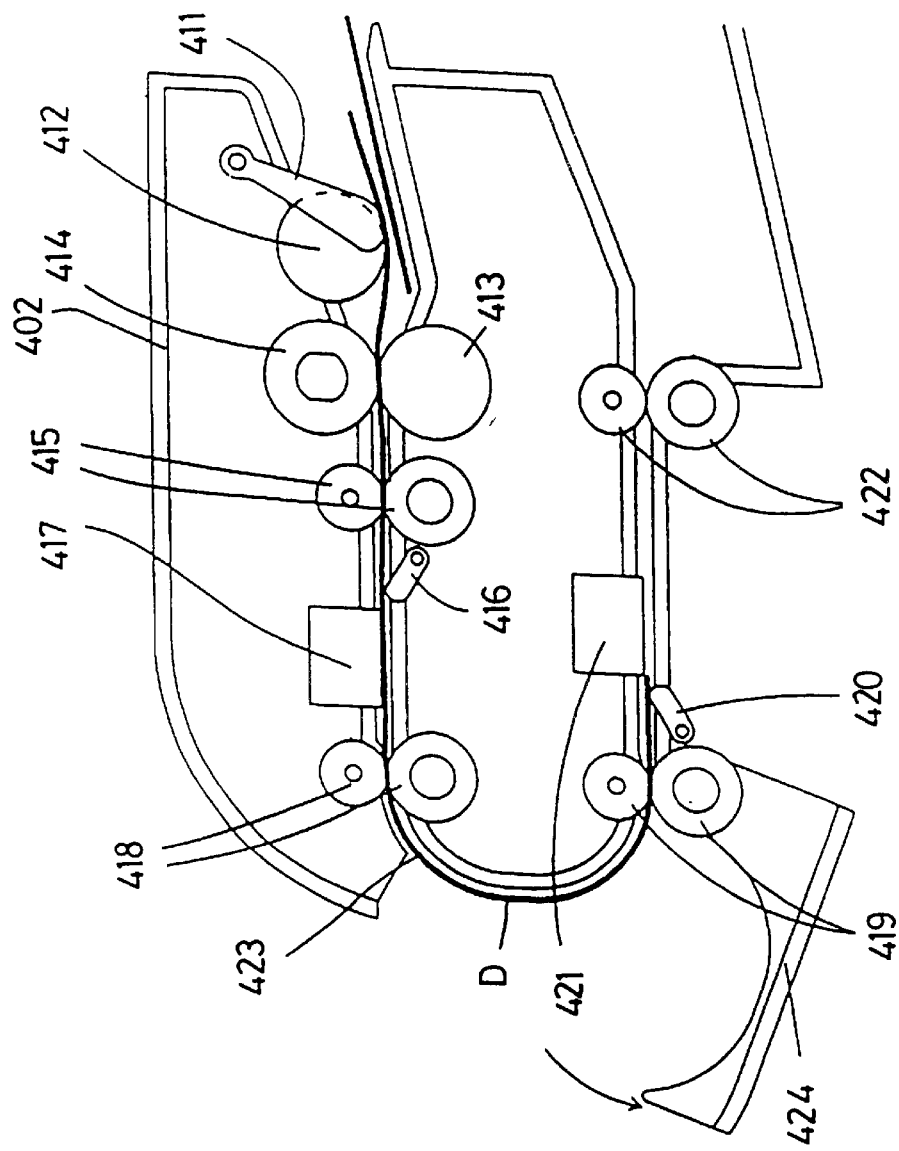
FIG. 34 is a cross section describing original document conveying operation in the image reading section.

The original document D reaches the first conveyance roller 418 and reaches the second conveyance roller pair 419 after sent to the U-turn portion 423 in the original document conveyance route. When the second original document end detection sensor 420 detects the front end of the original document D (S410, see FIG. 33), the second drive control mechanism 436 becomes the drive cutoff state (OFF state) and stops the rotation of the second conveyance roller pair 419 (S411), and the cover opening and closing mechanism 437 makes the cover 424 open (S412 as shown in FIG. 34). That is, a space of the U-turn path portion of the original document conveyance route 423 between the first conveyance roller pair 418 and the second conveyance roller pair 419 is widened.

Figure 35:
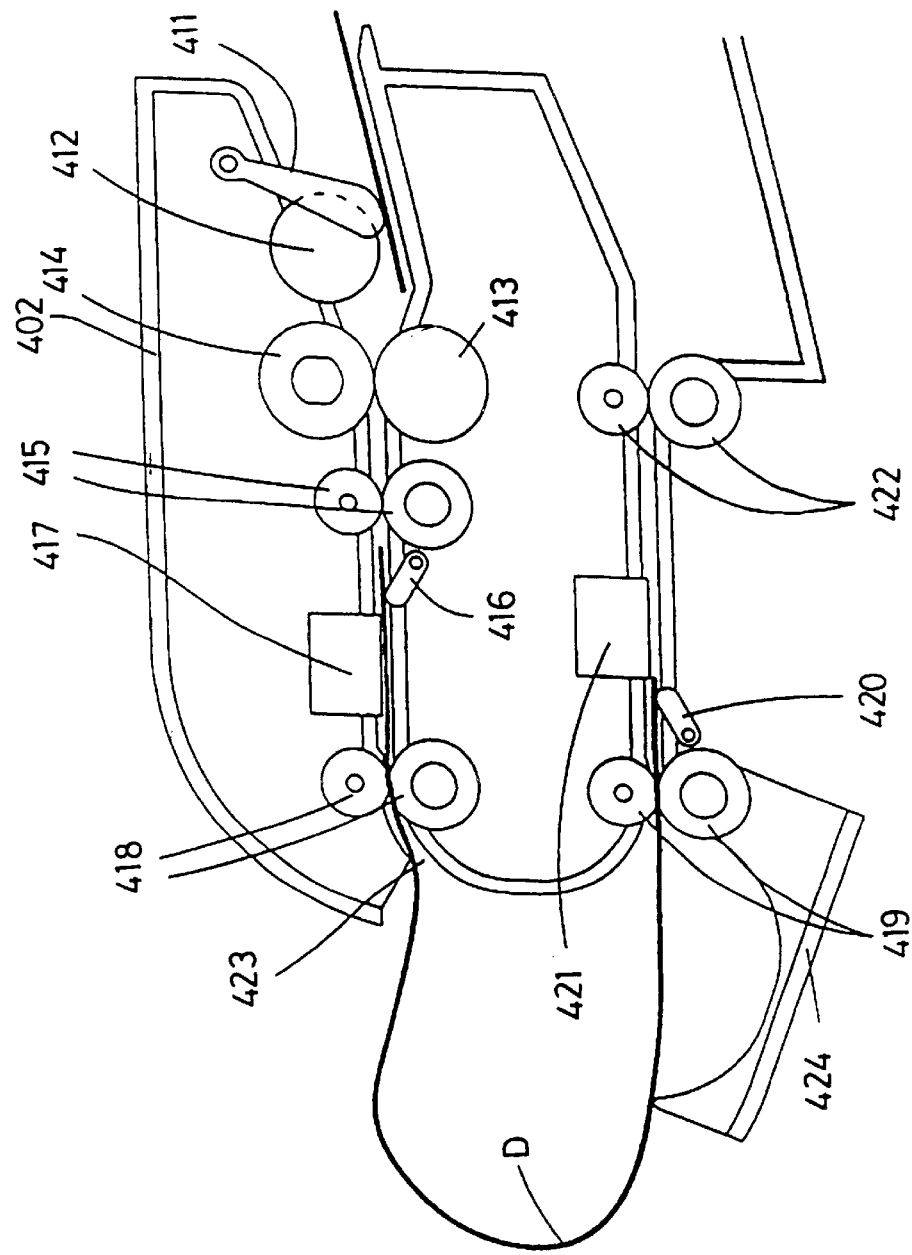
FIG. 35 is a cross section describing original document conveying operation in the image reading section.

At that time, although the second conveyance roller pair 419 holds and sandwiches the vicinity of the front end of the original document D, a looseness occurs in the original document D between the first conveyance roller pair 418 and the second conveyance roller pair 419 because the more upstream side from that point is continuously conveyed by the first conveyance roller pair 418. However, since the cover 424 is made open, the original document D goes as to extend to the outer side of the image reading apparatus 402 as shown in FIG. 35, and therefore, the original document D will not be jammed in the original document conveyance route.

Subsequently, the first original document end detection sensor 416 detects the rear end of the original document D (S413), and after prescribed time that the reading position on the original document D reaches the reading reference position of the first contact type image sensor 417 passes, the first contact type image sensor 417 finishes reading of the image information on the front side of the original document D (S414).

The switching circuit 433 switches to the second contact type image sensor 421 the input source of the image information to be transmitted to the image processing circuit 432 (S415) and the drive control mechanism 436 enters in the drive transmission state (ON state) and resumes the rotation of the second conveyance roller pair 419 (S416).

Figure 36:
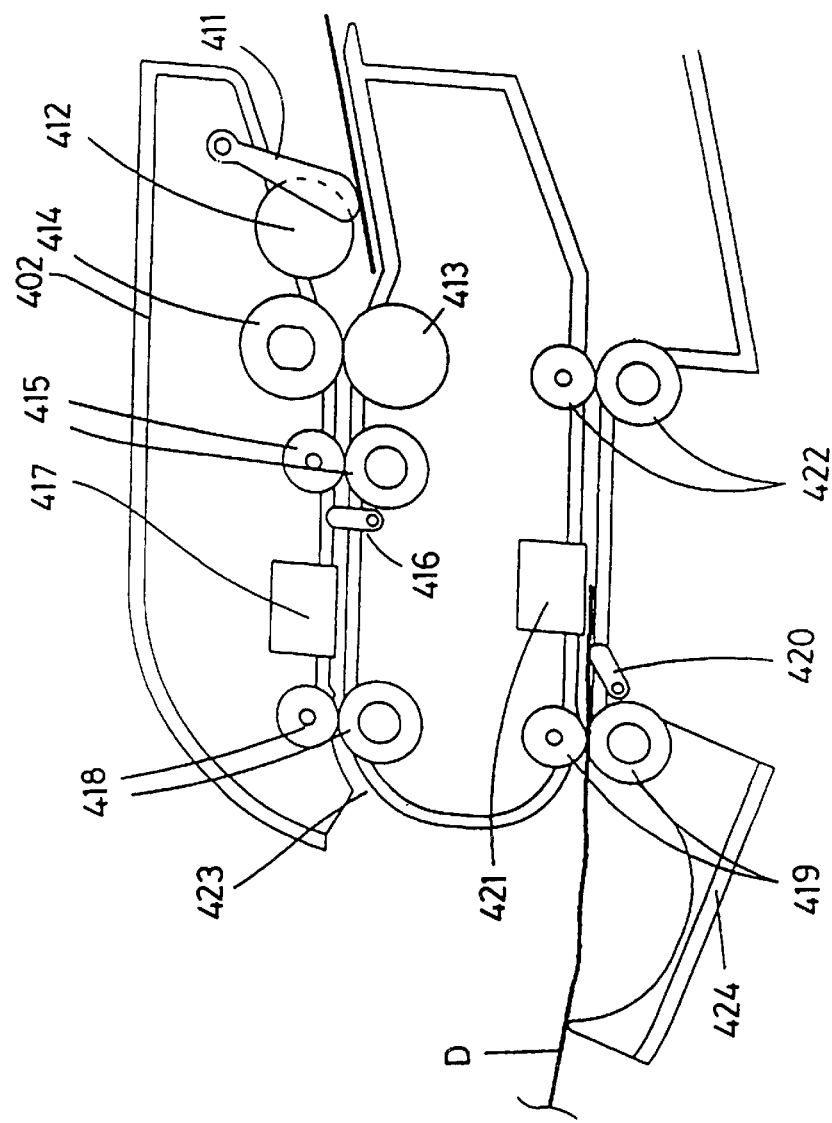
FIG. 36 is a cross section describing original document conveying operation in the image reading section.

After prescribed time that the reading position on the original document D reaches the reading reference position of the second contact type image sensor 419 passes, the second contact type image sensor 421 starts reading of the image information on the back side of the original document D (S417, see FIG. 36).

At that time, the original document existence detection sensor 411 monitors existence of the original document D (S418), and if the sensor detects the subsequent original document D, the operation goes to steps S491 or later, and if not detecting, the operation goes to steps S427 or later.

At step S418, while the original document existence detection sensor 411 detects the subsequent original document D, the subsequent original document D is separately fed sheet by sheet with the pickup roller 412 and the reverse roller 413 concurrently with reading operation of the previous original document D.

Figure 37:
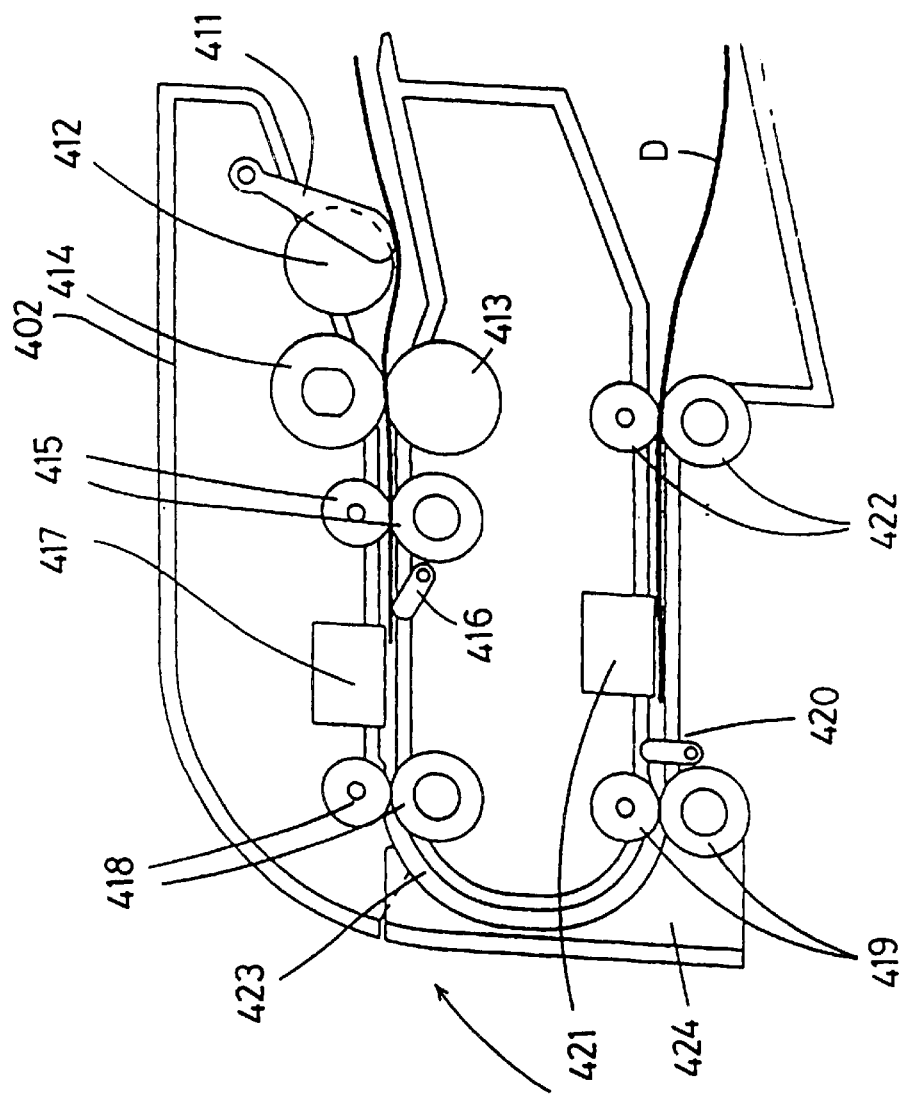
FIG. 37 is a cross section describing original document conveying operation in an image reading section.

Then, the subsequent original document D reaches the feeding roller pair 415, and when the first original document end detection sensor 416 detects the front end of the subsequent original document D, the feeding drive control mechanism 435 enters in the drive cutoff state (OFF state) and stops rotations of the pickup roller 412, the reverse roller 413, the separation roller 414, and the feeding roller pair 415 (S421, FIG. 37).

At the same time as the completion of the reading operation at step S423, the cover 424 is closed by the cover opening and closing mechanism 437, and the switching circuit 433 switches to the first contact type image sensor 417 the input source of the image information-to be transmitted to the image processing circuit 432 (S425). The feeding drive control mechanism 435 enters the drive transmission state (ON state), and the pickup roller 412, the reverse roller 413, the separation roller 414, and the feeding roller pair 415 are rotated again (S426), thereby starting reading of the image information on the front side of the subsequent original document D in returning to step S408. This makes shorter the time for original document conveyance other than the reading time, thereby reducing the total time for reading the plural original documents D.

It is to be noted that at step S418, if the original document existence detection sensor 411 does not detect the subsequent original document D, the feeding drive control mechanism 435 enters the drive cutoff state (OFF state), and the pickup roller 412, the reverse roller 413, the separation roller 414, and the feeding roller pair 415 are rotated (S417). When the second original document end detection sensor 420 detects the rear end of the original document D during reading (S428), after prescribed time that the reading start position on the original document D reaches the reading reference position of the second contact type image sensor 421 is measured, the second contact type image sensor 421 finishes reading of the image information on the back side of the original document D, and the original document D is delivered by the delivery roller pair 422 onto the delivery tray 405 (S429). Then, the cover opening and closing mechanism 437 closes the cover 424 (S430), thereby ending the reading operation.

It is to be noted that although in this embodiment the drive of the drive motor 434 is transmitted and cut off by the feeding drive control mechanism 435 and the conveyance drive control mechanism 436, the same result can be obtained where a first motor may rotate the pickup roller 412, the reverse roller 413, the separation roller 414, the feeding roller pair 415, and the first conveyance roller pair 418, while a second motor may rotate the second conveyance roller pair 419, and the delivery roller 422. In such a case, the operation can be illustrated by replacing the feeding drive control mechanism 435 in FIG. 31 with the first drive motor and replacing the conveyance drive control mechanism with the second drive motor.

As described above, according to this embodiment, the input source of the image information to be transmitted to the image processing circuit 432 is switched to the first contact type image sensor 417 so that the first contact type image sensor 417 starts reading of the image information of the subsequent original document at the same timing when the second contact type image sensor 421 ends reading of the image information of the previous original document; the feeding drive control mechanism 435 controls drive of the original document feeding means constituted of the pickup roller, the reverse roller 413, the separation roller 414, and the feeding roller pair 415. Therefore, the apparatus can shorten the time for original document conveyance other than the reading time, thereby reducing the total time for reading the plural original documents D.

In addition, the image information can be transmitted to a single image processing circuit 423 by switching the two contact type image sensors 417, 421 at the switching circuit 433, so that plurality of the image processing means is unnecessary, so that the electric circuit board can be made smaller, and so that the production costs will be reduced so much.

Where an apparatus having the reading function on one side as a standard function while the reading function on the double sides is made as an option, one image processing circuit can realize a standard form and an optional extra installation form, and therefore, the apparatus can be produced with lower costs in comparison with the structure having two image processing circuits.

Because the front end of the original document is stopped by the second conveyance roller pair 419 before the image information on the original document D is read by the second contact type image sensor 421, and because the original document conveyance route is opened, this apparatus can allow the looseness of the original document D occurring as a consequence that the rear end of the original document D is conveyed. Moreover, the first contact type image sensor 417 can read the image information on the rear end side of the original document D while the front end of the original document is stopped, and therefore, the distance between the first contact type image sensor 417 and the second contact type image sensor 421 can be made smaller, so that the apparatus can be made smaller in size.

After the front end of the original document is held by the second conveyance roller pair 419, the original document conveyance route 423 is made open and can be made closed right after the looseness of the original document D is gone, so that the apparatus can avoid improper conveyance as shown in the prior art No. 4 and can improve conveyance stability.

The apparatus also can read the original document D from the front end of the front and back sides of the original document, so that an image reversing means for reversing read image information or an original document reversing means for reversing the up and down sides of the original document would be unnecessary. This apparatus has faster reading throughput of the original documents in comparison with the apparatus requiring such an original document reversing means, can reduce the apparatus costs, and can make the structure of the apparatus simpler.

In addition, this apparatus has a structure that the looseness of the original document may go out of the apparatus as to escape from the apparatus by opening the original document conveyance route 423, so that the apparatus can be made smaller in size.

Sixth Embodiment

Figure 38:
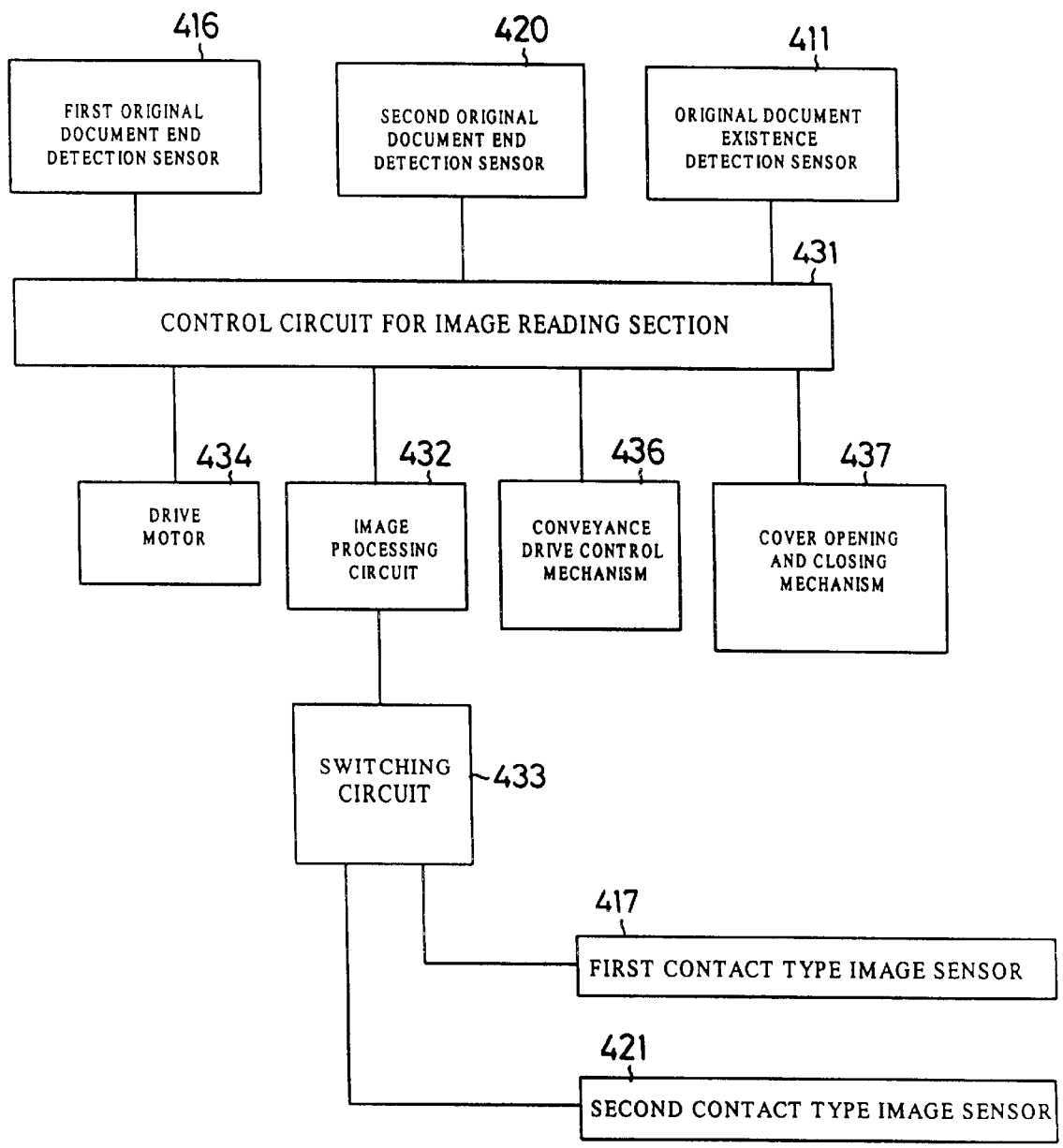
FIG. 38 is a block diagram showing an example of a control structure in the image reading section according to the sixth embodiment.
Figure 39:
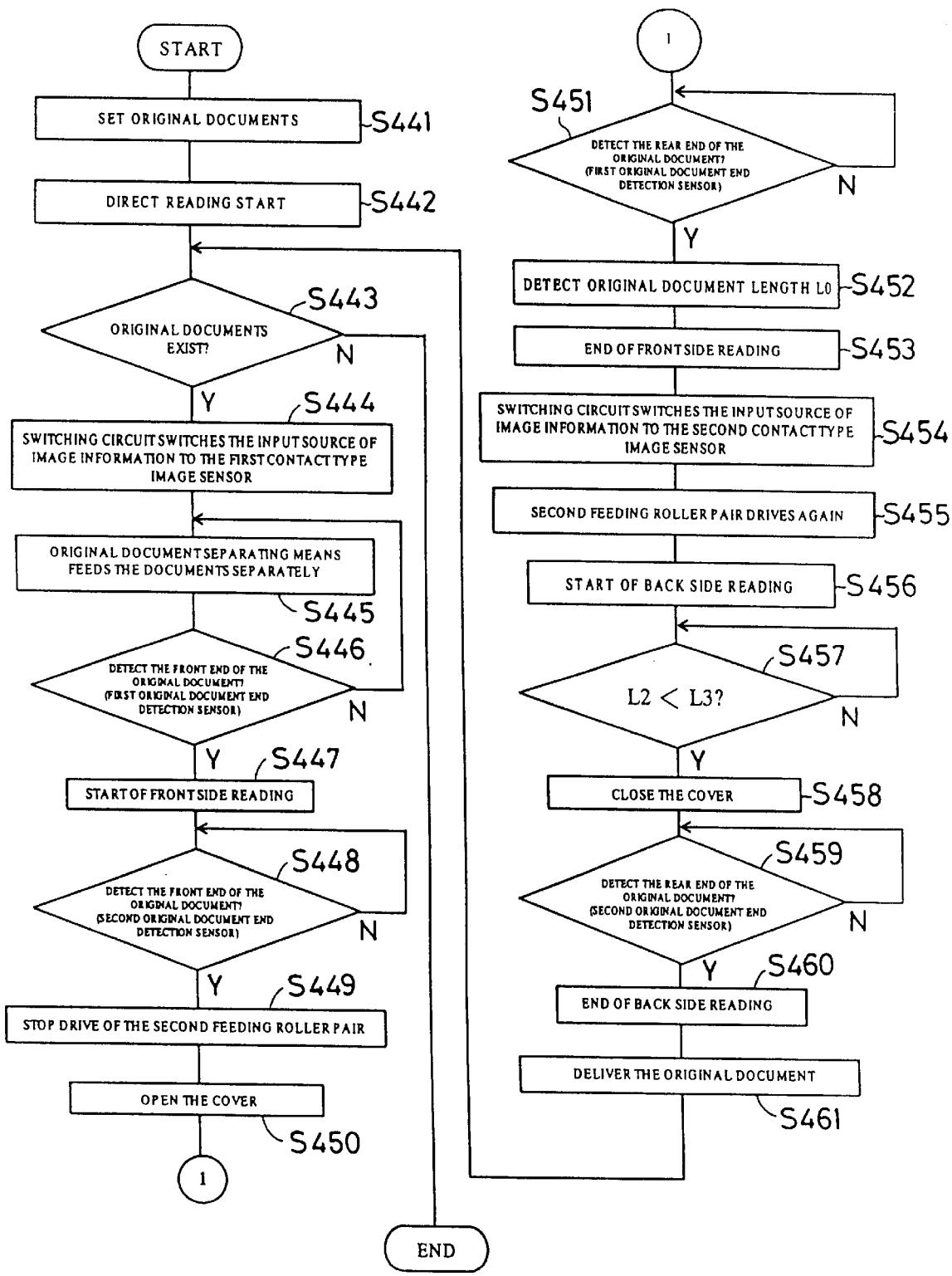
FIG. 39 is a flow chart showing operation flow in the image reading section according to the sixth embodiment.
Figure 40:
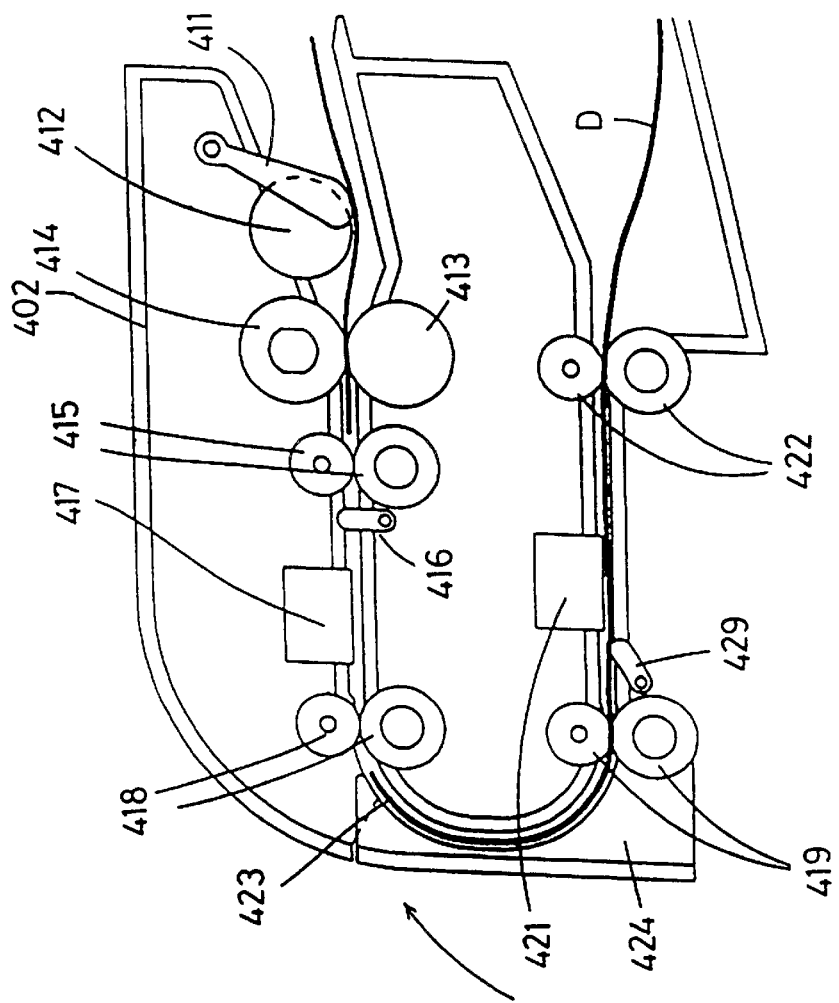
FIG. 40 is a cross section describing original document conveying operation in the image reading section according to the sixth embodiment.

Referring to FIGS. 38 to 40, the image reading apparatus according to the sixth embodiment is described in detail. In this embodiment, the structure of the image reading apparatus in the facsimile machine is exemplified. The outlined structure of the entire facsimile machine (see, FIG. 1) and the outlined structure of the image reading section (see, FIG. 30) are substantially the same as above described, and detailed description is omitted. The members having the same functions had the same reference numbers. Hereinafter, the control structure of the image reading apparatus according to this embodiment and its operation will be described orderly.

FIG. 38 is a block diagram showing an example of a control structure. In FIG. 38, numeral 431 is a control circuit for controlling the image reading section 402; numeral 432 is an image processing circuit (image processing means) for processing image information of the original documents D read by the first contact type image sensor 417 and the second contact type image sensor 421; numeral 433 is a switching circuit for switching to either of the first contact type image sensor 417 and the second contact type image sensor 421 the input source of the image information to be transmitted to the image processing circuit; numeral 434 is a drive motor for rotatively driving the feeding roller pair 415, the first conveyance roller pair 418, the second conveyance roller pair 419, and the delivery roller pair 422, which are constituting the original document feeding means; numeral 436 is a drive controlling mechanism (drive control means) constituted of a clutch and a solenoid and the like for rotating and stopping the second conveyance roller pair 419; numeral 437 is a cover opening and closing mechanism (conveyance route opening means) constituted of a motor, a solenoid, a cam mechanism, and so on for opening and closing the cover 424. Numeral 411 is the original document existence sensor; numeral 416 is the first original document end detection sensor; numeral 420 is the second original document end detection sensor.

Based on a flowchart shown in FIG. 39, referring to FIGS. 33 to 36, and 40, operation of the image reading section 402 is described.

A user sets the original documents D on the original document tray 404 in a manner that sides to be read are faced up (S441), and the user sets the prescribed reading conditions (resolution, density, etc) to direct beginning of reading (S442).

The original document existence detection sensor 411 monitors existence of the original documents D (S443). If the sensor detects the original document, the apparatus moves for reading operation, and if the sensor detects nothing, the apparatus gives a warning so and ends the operation (S444).

The switching circuit 433 switches to the first contact type image sensor 417 the input source of the image information to be transmitted to the image processing circuit 432 if the input source is not the first contact type image sensor 417.

The original documents D stacked on the original document tray 404 are fed by the pickup roller 412 and separated to each sheet by the reverse roller 413 and the separation roller 414 which are constituting the original document separation means (S445).

When the separated original document D reaches the feeding roller pair 415, and when the front end is detected by the first original document end detection sensor 416 (S446), the first contact type image sensor 417 starts reading of the image information on the front side of the original document D after prescribed time that a reading start position on the original document D reaches a reading reference position of the first contact type image sensor 417 passes (S447).

The original document D reaches the first conveyance roller 418 and reaches the second conveyance roller pair 419 after sent to the U-turn portion 423 in the original document conveyance route. When the second original document end detection sensor 420 detects the front end of the original document D (S448, see FIG. 33), the drive control mechanism 436 stops the rotation of the second conveyance roller pair 419 (S449), and the cover opening and closing mechanism 437 makes the cover 424 open (S450 as shown in FIG. 34). That is, a space of the U-turn path portion of the original document conveyance route 423 between the first conveyance roller pair 418 and the second conveyance roller pair 419 is widened.

At that time, although the second conveyance roller pair 419 holds and sandwiches the vicinity of the front end of the original document D, a looseness occurs in the original document D between the first conveyance roller pair 418 and the second conveyance roller pair 419 because the more upstream side from that point is continuously conveyed by the first conveyance roller pair 418. However, since the cover 424 is made open, the original document D goes as to extend to the outer side of the image reading apparatus 402 as shown in FIG. 35, and therefore, the original document D will not be jammed in the original document conveyance route.

Subsequently, when the first original document end detection sensor 416 detects the rear end of the original document D (S451), a length LO in the conveyance direction of the original document D is calculated (S452) from rotation amount, rotation time, and the like of the conveyance roller pair 415 between detection of the front end and the detection of the rear end, and at the same time, after prescribed time that the reading start position on the original document D reaches the reading reference position of the second contact type image sensor 421 is measured, the first contact type image sensor 417 finishes reading of the image information on the front side of the original document D (S453).

The switching circuit 433 switches to the second contact type image sensor 421 the input source of the image information to be transmitted to the image processing circuit 432 (S454) and the conveying drive control mechanism 436 resumes the rotation of the second conveyance roller pair 419 (S455).

After prescribed time that the reading start position on the original document D reaches the reading reference position of the second contact type image sensor 421 is measured, the second contact type image sensor 421 starts reading of the image information on the back side of the original document D (S456, see FIG. 36).

The original document length Li from the front end of the original document D to the second conveyance roller pair 419 during conveyance is easily calculated from the front end detection (S448) of the original document D by the second original document end detection sensor 420 and rotation amount, rotation time, and the like of the second conveyance roller pair 419. Therefore, by subtracting the original document length L1 from the original document length LO in the conveyance direction of the original document D as described above an original document length L2 from the second conveyance roller pair 419 to the rear end of the original document D during the conveyance can be obtained. If the length L2 of the original document D during this conveyance is detected as shorter than the original document conveyance route length L3 between the first conveyance roller pair 418 and the second conveyance roller pair 419 (S457), the cover 424 is made closed by the cover opening and closing mechanism 437, and the space of the U-turn path portion of the thus opened original document conveyance route 423 between the first conveyance roller pair 418 and the second conveyance roller pair 419 is resumed. This makes the timing for closing the cover 424 shortest, so that the time for making the subsequent original document D conveyable is made shorter (S458, FIG. 40).

When the rear end of the original document D is detected by the second original document end detection sensor 420 (S459), after prescribed time that the reading start position on the original document D reaches the reading reference position of the second contact type image sensor 421 is measured, the second contact type image sensor 419 finishes reading of the image information on the back side of the original document D (S460). Then, the original document D is delivered on the original document delivery tray 405 by the delivery roller pair 412 (S 461).

Steps of S443 to S460 are repeated until all original documents D on the original document tray 404 are gone, and when the first original document existence detector 411 detects that no original document exists, all reading operation ends.

As described above, according to this embodiment, when the original document length L2 from the second conveyance roller pair 419 to the rear end of the original document D during the conveyance is detected as shorter than the original document conveyance route length 13 between the first conveyance roller pair 418 and the second conveyance roller pair 419, the cover opening and closing mechanism 437 resumes the space in the original document conveyance route 423, so that the timing to contract the space at the U-turn path in the opened original document conveyance route 423, or namely, the timing for closing the cover 424 is made shortest, so that time for making the next original document D conveyable can be shortened, and so that the throughput can be faster.

In addition, Image information can be transmitted to a single image processing circuit 423 by switching the two contact type image sensors 417, 421 at the switching circuit 433, so that plurality of the image processing means is unnecessary, so that the electric circuit board can be made smaller, and so that the production costs will be reduced so much.

Where an apparatus having the reading function on one side as a standard function while the reading function on the double sides is made as an option, one image processing circuit can realize a standard form and an optional extra installation form, and therefore, the apparatus can be produced with lower costs in comparison with the structure having two image processing circuits.

Because the front end of the original document is stopped by the second conveyance roller pair 419 before the image information on the original document D is read by the second contact type image sensor 421, and because the original document conveyance route is opened, this apparatus can allow the looseness of the original document D occurring as a consequence that the rear end of the original document D is conveyed. Moreover, the first contact type image sensor 417 can read the image information on the rear end side of the original document D while the front end of the original document is stopped, and therefore, the distance between the first contact type image sensor 417 and the second contact type image sensor 421 can be made smaller, so that the apparatus can be made smaller in size.

After the front end of the original document is held by the second conveyance roller pair 419, the original document conveyance route 423 is made open and can be made closed right after the looseness of the original document D is gone, so that the apparatus can avoid improper conveyance as shown in the prior art No. 4 and can improve conveyance stability.

The apparatus also can read the original document D from the front end of the front and back sides of the original document, so that an image reversing means for reversing read image information or an original document reversing means for reversing the up and down sides of the original document would be unnecessary. This apparatus has faster reading throughput of the original documents in comparison with the apparatus requiring such an original document reversing means, can reduce the apparatus costs, and can make the structure of the apparatus simpler.

In addition, this apparatus has a structure that the looseness of the original document may go out of the apparatus as to escape from the apparatus by opening the original document conveyance route 423, so that the apparatus can be made smaller in size.

It is to be noted that although any of the above first to sixth embodiments are that opening and closing of the cover forming a portion of the casing makes a space allowing a looseness of the original document out of the apparatus, such a space can be formed in the casing.

What is claimed is:

1. An image reading apparatus comprising:
   first reading means for reading image information on one side of an original document;
   second reading means for reading image information on the other side of the original document;
   image processing means for processing the image information read by the first reading means and the second reading means; and
   switching means for switching between said first reading means and said second reading means for an input source of the image information to be transmitted to the image processing means, wherein said switching means switches from said first reading means to said second reading means after reading image information on one side of an original document is finished.

2. An image reading apparatus according to claim 1, wherein, in a case that the image information on the double sides of the original document is read, the first reading means read information on one side of the original document; and then the switching means switch to the second reading means the input source of the image information to be transmitted to the image processing means, and the second reading means read information on the other side of the original document.

3. The image reading apparatus according to claim 1 or 2, further comprising:
   first conveyance means located at a downstream side of the first reading means;
   second conveyance means located at an upstream side of the second reading means;
   conveyance driving control means for driving and stopping the second conveyance means while the original document is being conveyed; and
   conveyance route opening means for opening an conveyance route between the first conveyance means and the second conveyance means,
   wherein, after a front end of the original document conveyed by the first conveying rotary body is sandwiched by the second conveying rotary body, the conveyance route opening means work upon stopping of rotation of the second conveying rotary body by the conveyance driving control means.

4. The image reading apparatus according to claim 3, wherein, in a case that the image information on the double sides of the original document is read, the switching means switch to the first reading means the input source of the image information to be transmitted to the image processing means; upon stopping of the second conveyance means by the conveyance driving control means, the second conveyance means sandwich the front end of the original document and the conveyance route opening means open the conveyance route; after reading of one side of the original document, the conveyance driving control means drive the second conveyance means upon switching to the second reading means the input source of the image information to be transmitted to the image processing means by the switching means; and the second reading means start reading the other side of the original document.

5. The image reading apparatus according to claim 3, wherein the conveyance route opening means are structured to discharge the looseness of the original document outward of the apparatus by opening an exterior shell of the image reading apparatus which constitutes a part of the conveyance route between the first conveyance means and the second conveyance means.

6. An image reading apparatus comprising:
first reading means for reading image information on one side of an original document;
second reading means for reading image information on the other side of the original document;
image processing means for processing the image information read by the first reading means and the second reading means;
switching means for switching, to either of the first reading means and the second reading means, an input source of the image information to be transmitted to the image processing means;
original document conveying means having a first conveying rotary body disposed at least on a downstream side of the first reading means and a second conveying rotary body disposed at least on an upstream side of the second reading means;
first drive controlling means for driving and stopping the first conveying rotary body;
second drive controlling means for driving and stopping the second conveying rotary body;
conveyance route opening means for widening a space in the original document conveyance route located between the first conveying rotary body and the second conveying rotary body; and
operation controlling means for widening a space in the conveyance route located between the first conveying rotary body and the second conveying rotary body by conveyance route opening means upon stopping of rotation of the second conveying rotary body by the second drive controlling means after a front end of the original document conveyed by the first conveying rotary body is sandwiched by the second conveying rotary body and for switching to the second reading means the input source of the image information to be transmitted to the image processing means by the switching means after the first reading means finishes reading of the image information on the one side of the original document to cause the second reading means to read image information on the other side of the original document where the first drive controlling means stops the rotation of the first conveying rotary body and where the second drive controlling means rotates the second conveying rotary body and to render the second reading means read the image information on the other side of the original document.

7. The image reading apparatus according to claim 6, further comprising looseness detecting means for detecting looseness of the original document between the first conveying rotary body and the second conveying rotary body, wherein the operation controlling, after the looseness detecting means detects the looseness of the original document, resumes by the conveyance route opening means restoring the space in the conveyance route located between the first conveying rotary body and the second conveying rotary body to an original state and then causing conveying of the remaining original documents continuously.

8. The image reading apparatus according to claim 6 or 7, wherein the conveyance route opening means discharges the looseness of the original document between the first conveying rotary body and the second conveying rotary body out of the apparatus.

9. An image forming apparatus comprising:
first reading means for reading image information on one side of an original document;
second reading means for reading image information on the other side of the original document;
image processing means for processing the image information read by the first reading means and the second reading means;
switching means for switching, to either of the first reading means and the second reading means, an input source of the image information to be transmitted to the image processing means;
original document conveying means having a first conveying rotary body disposed at least on a downstream side of the first reading means and a second conveying rotary body disposed at least on an upstream side of the second reading means;
drive controlling means for driving and stopping the second conveying rotary body;
an original document conveyance route for conveying the original document by turning the original document around between the first conveying rotary body and the second conveying rotary body; and
conveyance route opening and closing means for opening and closing an openable cover which constitutes a portion of the original document conveyance route,
wherein the original document is delivered from or placed on the original document conveyance route which is opened by opening the cover when image information of the original document is read by the first reading means or the second reading means.

10. The image reading apparatus according to claim 9, wherein the opened cover is immobilized in keeping an angle equal to or greater than 0° and equal to or less than 70° with respect to the horizon in order to convey in substantially a linear manner the original document whose image information is read by the first reading means and the second reading means.

11. The image reading apparatus according to claim 9 or 10, wherein the original document delivered from the opened original document conveyance route is stacked on the opened cover.

12. The image reading apparatus according to claim 9 or 10, wherein the original document to be inserted into the opened original document conveyance route is set on the opened cover.

13. The image reading apparatus according to claim 10, further comprising conveyance route opening and closing detecting means for detecting as to whether the cover is open, wherein reading on the double side is prohibited when the detecting means detects that the cover is opened before the start of reading of the original document, and further comprising displaying means for displaying information of reading prohibition on double sides or reading allowance on a single side.

14. An image reading apparatus comprising:
first reading means for reading image information on one side of an original document;
second reading means for reading image information on the other side of the original document;
original document feeding means disposed on an upstream side of the first reading means for feeding sheet by sheet the original document of plural sheets;
image processing means for processing the image information read by the first reading means and the second reading means;
switching means for switching, to either of the first reading means and the second reading means, an input source of the image information to be transmitted to the image processing means;

feeding drive controlling means for driving and stopping the original document feeding means;

original document conveying means having a first conveying rotary body disposed at least on a downstream side of the first reading means and a second conveying rotary body disposed at least on an upstream side of the second reading means;

conveying drive controlling means for driving and stopping the second conveying rotary body;

conveyance route opening means for opening an conveyance route by widening the space in the conveyance route located between the first conveying rotary body and the second conveying rotary body upon stopping rotation of the second conveying rotary body by the conveying drive controlling means after a front end of the original document conveyed by the first conveying rotary body is sandwiched by the second conveying rotary body; and operation controlling means for switching by the switching means to the first reading means, the input source of the image information to be transmitted to the image processing means so as to start reading image information on the subsequent original document by the first reading means at substantially the same time as completion of reading the image information of the previous original document by the second reading means, and for controlling the drive of the original document feeding means by the feeding drive controlling means.

15. An image reading apparatus comprising:

first reading means for reading image information on one side of an original document;

second reading means for reading image information on the other side of the original document;

image processing means for processing the image information read by the first reading means and the second reading means;

switching means for switching, to either of the first reading means and the second readings means, an input source of the image information to be transmitted to the image processing means;

original document conveying means having a first conveying rotary body disposed at least on a downstream side of the first reading means and a second conveying rotary body disposed at least on an upstream side of the second reading means;

original document length detecting means for detecting an original document length from the second conveying rotary body to a rear end of the original document which is being conveyed;

conveying drive controlling means for driving and stopping the second conveying rotary body; and conveyance route opening means for opening an conveyance route by widening a space in the conveyance route located between the first conveying rotary body and the second conveying rotary body upon stopping rotation of the second conveying rotary body by the conveying drive controlling means after a front end of the original document conveyed by the first conveying rotary body is sandwiched by the second conveying rotary body; and operation controlling means for resuming by the conveyance route opening means the space in the conveyance route located between the first conveying rotary body and the second conveying rotary body to an original state when the original document length detecting means detects that the original document length from the second conveying rotary body to the rear end of the original document which is being conveyed is shorter than a length of the original document conveyance route between the first conveying rotary body and the second conveying rotary body.

16. The image reading apparatus according to claim 15, wherein the original document length detecting means includes a first original document end detecting means disposed in an upstream side of the first conveying rotary body for detecting passage of an end of the original document and a second original document end detecting means disposed in a downstream side of the second conveying rotary body for detecting passage of an end of the original document.

17. The image reading apparatus according to claim 14, 15 or 16, wherein the operation controlling means, when the image information on the double sides of the original document is read, switches to the first reading means by the switching means the input source of the image information to be transmitted to the image processing means to render the first reading means read image information on one side of the original document and render the image processing means process the images, wherein the conveying drive controlling means stops rotation of the second conveying rotary body so that during reading of the one side the front end of the original document may not be conveyed to a reading position of the second reading means, and the conveyance route opening means absorbs, by widening the space in the conveyance route located between the first conveying rotary body and the second conveying rotary body, looseness of the original document between the first conveying rotary body and the second conveying rotary body created due to the stopped rotation, and wherein, after the first reading means finishes reading of the image information on the one side of the original document, the switching means switches to the second reading means the input source of the image information to be transmitted to the image processing means to render the second reading means read image information on the other side of the original document where the conveying drive controlling means rotates the second conveying rotary body and render the image processing means process the images.

18. The image reading apparatus according to claim 14, 15 or 16, wherein the conveyance route opening means is structured to discharge the looseness of the original document between the first conveying rotary body and the second conveying rotary body out of the apparatus.

19. An image reading apparatus comprising:

first reading means for reading image information on one side of an original document;

second reading means for reading image information on the other side of the original document;

image processing means for processing the image information read by the first reading means and the second reading means;

switching means for switching, to either of the first reading means and the second reading means, an input source of the image information to be transmitted to the image processing means;

first conveyance means located at downstream side of the first reading means;

second conveyance means located at upstream side of the second reading means;

conveyance driving control means for driving and stopping the second conveyance means during the original document is conveyed; and conveyance route opening means for opening an conveyance route between the first conveyance means and the second conveyance means;

wherein after a front end of the original document conveyed by the first conveying rotary body is sandwiched by the second conveying rotary body, the conveyance route opening means work upon stopping of rotation of the second conveying rotary body by the conveyance driving control means.

20. An image reading apparatus according to claim 19, wherein, in a case that the image information on the double sides of the original document is read, the first reading means read information on one side of the original document; and then the switching means switch to the second reading means the input source of the image information to be transmitted to the image processing means, and the second reading means read information on the other side of the original document.

* * * * *

UNITED STATES PATENT AND TRADEMARK OFFICE
CERTIFICATE OF CORRECTION

PATENT NO. : 6,678,076 B1
DATED : January 13, 2004
INVENTOR(S) : Kazuhiko Hasegawa et al.

It is certified that error appears in the above-identified patent and that said Letters Patent is hereby corrected as shown below:

Drawings,
Sheet 12, line F12, "LOOSEN?" should read -- LOOSE ? --.
Sheet 23, line F23, "SENSOR" should read -- SENSOR) --.

Column 1,
Line 10, "particularly;" should read -- particularly, --.

Column 2,
Line 14, "most" should read -- mostly --;
Line 32, "document;image" should read -- document; image --; and
Line 64, "an" should read -- a --.

Column 3,
Line 34, "me," should read -- means, --.

Column 8,
Line 36, "as fed" should read -- as being fed --.

Column 10,
Line 21, "after sent" should read -- after being sent --; and
Line 51, "on" (first occurrence) should be deleted.

Column 13,
Line 33, "body:" should read -- body; --.

Column 15,
Line 22, "that" should be deleted;
Line 27, "sides" should read -- side --; and
Line 63, "after sent" should read -- after being sent --.

Column 17,
Line 19, "pickup roller 312;" should read -- pickup roller 312, --;
Line 39, "realized" should read -- be realized --;
Line 44, "staking" should read -- stacking --;
Line 48, "staked" should read -- stacked --; and
Line 57, "advantages" should read -- advantage --.

UNITED STATES PATENT AND TRADEMARK OFFICE
CERTIFICATE OF CORRECTION

PATENT NO. : 6,678,076 B1
DATED : January 13, 2004
INVENTOR(S) : Kazuhiko Hasegawa et al.

It is certified that error appears in the above-identified patent and that said Letters Patent is hereby corrected as shown below:

Column 18,
Line 62, "contact," should read -- contact --.

Column 19,
Line 67, "staking" should read -- stacking --.

Column 20,
Line 4, "the-original" should read -- the original --; and
Line 59, "a" should read -- an --.

Column 21,
Line 64, "after sent" should read -- after being sent --; and
Line 64, "U-turn" should read -- U-turn --.

Column 24,
Line 50, "had" should read -- have --.

Column 25,
Line 17, "etc)" should read -- etc. ) --; and
Line 44, "after sent" should read -- after being sent --.

Column 26,
Line 25, "length Li" should read -- length L1 --; and
Line 58, "(S 461)" should read -- (S461) --.

Column 27,
Line 2, "length 13" should read -- length L3 --; and
Line 12, "Image" should read -- image --.

Column 29,
Line 45, "means read" should read -- means to read --.

UNITED STATES PATENT AND TRADEMARK OFFICE
CERTIFICATE OF CORRECTION

PATENT NO. : 6,678,076 B1
DATED : January 13, 2004
INVENTOR(S) : Kazuhiko Hasegawa et al.

It is certified that error appears in the above-identified patent and that said Letters Patent is hereby corrected as shown below:

Column 31,
Lines 12 and 56, "an" should read -- a --.

Column 32,
Line 24, "means read" should read -- means to read --;
Line 26, "means process" should read -- means to process --;
Line 43, "means read" should read -- means to read --;
Line 47, "means process" should read -- means to process --; and
Line 65, "at downstream" should read -- at a downstream --.

Column 33,
Line 4, "during" should read -- while --;
Line 6, "an" should read -- a --; and
Line 8, "means;" should read -- means, --.

Signed and Sealed this

Thirty-first Day of August, 2004

JON W. DUDAS
*Director of the United States Patent and Trademark Office*